US012786783B2

(12) United States Patent
Hofmann et al.

(10) Patent No.: US 12,786,783 B2
(45) Date of Patent: Nov. 3, 2026

(54) AD-HOC RADIO BEARER AND INLINE SIGNALLING WITH LAYER ARRANGEMENT

(71) Applicant: Apple Inc., Cupertino, CA (US)

(72) Inventors: Christian Hofmann, Munich (DE); Panagiotis Botsinis, Munich (DE); Sameh M. Eldessoki, Munich (DE); Tarik Tabet, San Jose, CA (US)

(73) Assignee: Apple Inc., Cupertino, CA (US)

( * ) Notice: Subject to any disclaimer, the term of this patent is extended or adjusted under 35 U.S.C. 154(b) by 429 days.

(21) Appl. No.: 18/302,717

(22) Filed: Apr. 18, 2023

(65) Prior Publication Data

US 2023/0379753 A1 Nov. 23, 2023

Related U.S. Application Data

(60) Provisional application No. 63/344,977, filed on May 23, 2022.

(51) Int. Cl.
*H04W 28/02* (2009.01)
*H04W 84/18* (2009.01)

(52) U.S. Cl.
CPC ... *H04W 28/0273* (2013.01); *H04W 28/0268* (2013.01); *H04W 84/18* (2013.01)

(58) Field of Classification Search
CPC ......... H04W 28/0268; H04W 28/0263; H04W 28/0273
See application file for complete search history.

(56) References Cited

U.S. PATENT DOCUMENTS

| | | | |
|---|---|---|---|
| 11,265,755 B2 | 3/2022 | Han et al. | |
| 11,516,829 B2 | 11/2022 | Teyeb et al. | |
| 11,825,333 B2 | 11/2023 | Pan | |
| 2013/0170399 A1 | 7/2013 | Stahlin et al. | |
| 2016/0088617 A1* | 3/2016 | Goldhamer | H04L 1/1896 370/330 |
| 2016/0212661 A1* | 7/2016 | Basu Mallick | H04W 36/0235 |
| 2018/0324631 A1 | 11/2018 | Jheng et al. | |
| 2020/0068427 A1 | 2/2020 | Turtinen et al. | |
| 2020/0100156 A1* | 3/2020 | Liu | H04W 28/0268 |
| 2020/0145904 A1 | 5/2020 | Kim et al. | |
| 2020/0245184 A1 | 7/2020 | Jin et al. | |
| 2020/0351198 A1* | 11/2020 | Majmundar | H04L 43/0805 |

(Continued)

FOREIGN PATENT DOCUMENTS

| | | |
|---|---|---|
| CN | 102595599 A | 7/2012 |
| CN | 108141784 A | 6/2018 |
| CN | 114503722 A | 5/2022 |
| WO | 2022074121 A1 | 4/2022 |

OTHER PUBLICATIONS

Final Office Action issued in U.S. Appl. No. 18/314,709, dated Dec. 2, 2025 in 25 pages.

(Continued)

*Primary Examiner* — Huy D Vu
*Assistant Examiner* — Bao G Nguyen
(74) *Attorney, Agent, or Firm* — Kilpatrick Townsend & Stockton LLP

(57) ABSTRACT

The present application relates to devices and components including apparatus, systems, and methods to provide ad-hoc radio bearers with different layer arrangements and headers for the layers.

20 Claims, 23 Drawing Sheets

(56) References Cited

U.S. PATENT DOCUMENTS

| | | | | |
|---|---|---|---|---|
| 2020/0396789 | A1 | 12/2020 | Hori et al. | |
| 2021/0037425 | A1 | 2/2021 | Kainulainen et al. | |
| 2022/0322419 | A1 | 10/2022 | Jeon et al. | |
| 2022/0338050 | A1 | 10/2022 | Liu et al. | |
| 2023/0098258 | A1 * | 3/2023 | Fan | H04W 28/0268 370/329 |
| 2023/0180148 | A1 | 6/2023 | Kung et al. | |
| 2023/0262814 | A1 | 8/2023 | Agiwal et al. | |
| 2023/0276391 | A1 * | 8/2023 | Qiao | H04L 43/0858 370/350 |
| 2023/0389106 | A1 | 11/2023 | Orsino et al. | |
| 2024/0015781 | A1 | 1/2024 | Jacobson et al. | |
| 2024/0056874 | A1 | 2/2024 | Fu et al. | |
| 2024/0163934 | A1 | 5/2024 | Freda et al. | |
| 2024/0334358 | A1 | 10/2024 | Comsa et al. | |
| 2024/0357666 | A1 | 10/2024 | Kim | |
| 2025/0016885 | A1 * | 1/2025 | Wu | H04W 76/12 |
| 2025/0167946 | A1 | 5/2025 | Lim et al. | |
| 2025/0212290 | A1 | 6/2025 | Tsai et al. | |
| 2025/0234245 | A1 | 7/2025 | Wang et al. | |

OTHER PUBLICATIONS

3GPP TS 38.321 V17.0.0, 3rd Generation Partnership Project; Technical Specification Group Radio Access Network; NR; Medium Access Control (MAC) protocol specification (Release 17), Mar. 2022, 233 pages.

Technical Specification entitled: "ETSI, LTE; 5G; Evolved Universal Terrestrial Radio Access (E-UTRA) and NR; Service Data Adaptation Protocol (SDAP) specification", 3Generation Partnership Project Technical Specification 37.324 version 16.2.0 Release 16, Nov. 2020 in 19 pages.

Non-Final Office Action issued in U.S. Appl. No. 18/314,709, dated Aug. 13, 2025 in 22 pages.

Non-Final Office Action issued in U.S. Appl. No. 18/320,483, dated Aug. 22, 2025 in 25 pages.

Office Action issued in China Application No. CN202310585660.X, dated Apr. 23, 2026 in 17 pages.

Non-Final Office Action issued in U.S. Appl. No. 18/314,709, dated May 13, 2026 in 26 pages.

Final Office Action issued in U.S. Appl. No. 18/320,483, dated Feb. 24, 2026 in 29 pages.

* cited by examiner

AD-HOC RADIO BEARER AND INLINE SIGNALLING WITH LAYER ARRANGEMENT

CROSS-REFERENCE TO RELATED APPLICATIONS

This application claims priority to U.S. provisional application No. 63/344,977, entitled "Ad-Hoc Radio Bearer and Inline Signalling with Layer Arrangement," filed on May 23, 2022, the disclosure of which is incorporated by reference herein in its entirety for all purposes.

TECHNICAL FIELD

The present application relates to the field of wireless technologies and, in particular, to ad-hoc radio bearers with different layer arrangements and headers for the layers.

BACKGROUND

Third Generation Partnership Project (3GPP) networks provide for communication of data between user equipment and network elements (such as base stations). The data is transported by data radio bearers between the user equipment and network elements. Generally, the data radio bearers are configured with a certain configuration and change of the configuration is avoided during operation due to challenges, such as latency.

DETAILED DESCRIPTION

Figure 1:
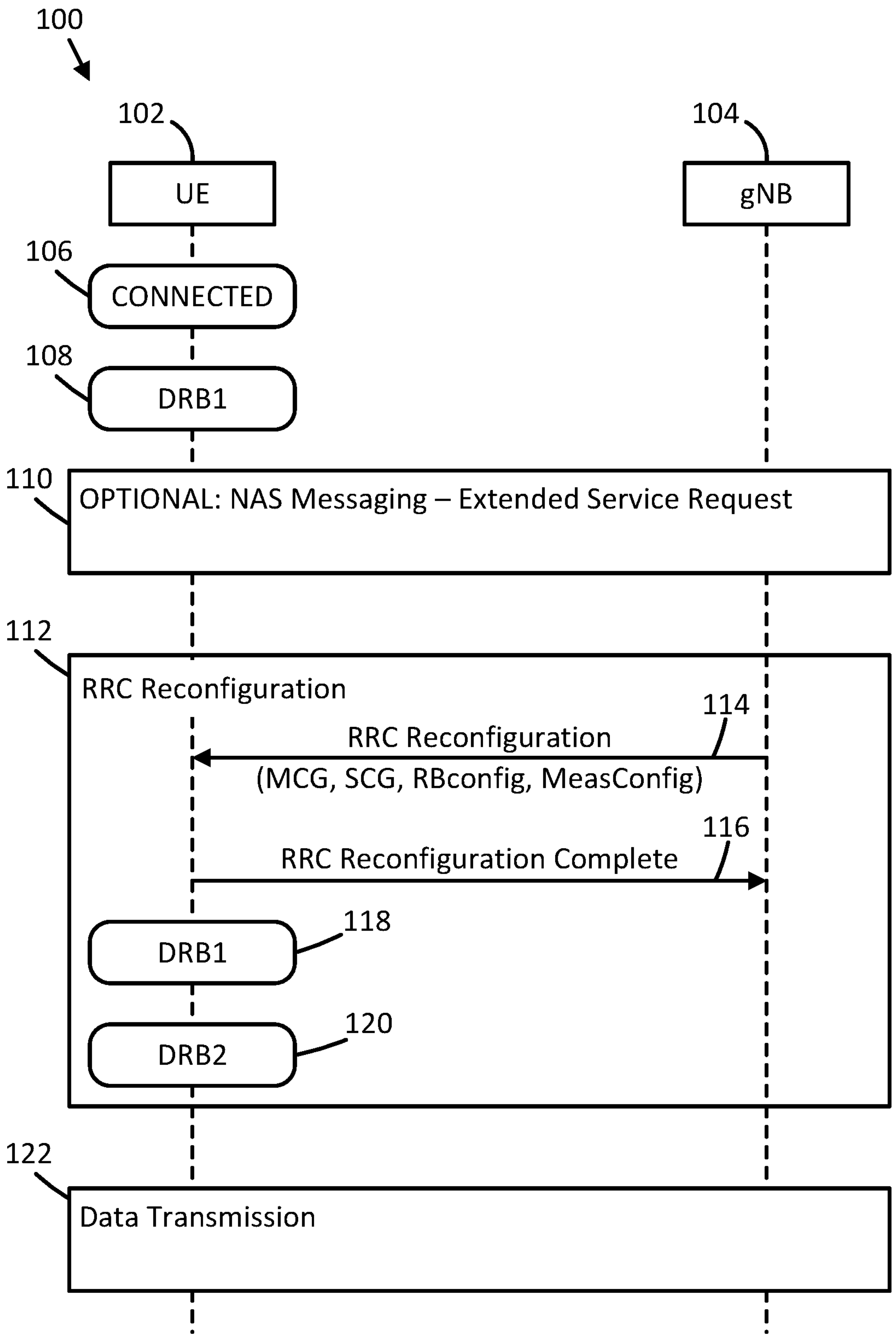
FIG. 1 illustrates an example signal diagram of a radio bearer (RB) reconfiguration in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A/B" and "A or B" mean (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radiofrequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services.

The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

The term "base station" may refer to nodeBs. For example, "base station" may refer to a nodeB, an evolved nodeB (eNB), and/or a next generation nodeB (gNB).

In legacy Third Generation Partnership Project (3GPP) networks, data is exchanged between user equipments (UEs) and base stations using radio bearers. The legacy radio bearers generally have defined configurations with each of the configurations having certain settings. However, a configuration for a radio bearer during operation may not be ideal for the data being transferred and it may be beneficial to change the configuration of the data bearer.

In order for a change to a configuration of a data bearer to be made during operation, both the UE and the base station exchanging the data will know the configuration of the data bearer such that data can be properly exchanged (including proper header encoding and/or decoding, and proper ciphering and/or deciphering). Making both the UE and the base station aware of the configuration of the data bearer involves communication between the UE and the base station. In legacy approaches, reconfiguration of the data radio bearer requires a service request be exchanged via non-access stratum (NAS) signalling and an execution of a radio resource control (RRC) reconfiguration in UL. For DL in legacy approaches, reconfiguration of the data radio bearer requires RRC reconfiguration be signalled by base station to the UE. The RRC configurations can include large amounts of information, which can cause the reconfiguration of the data radio bearer to be quite expensive signalling. This potentially needed NAS signalling and RRC reconfiguration can have an impact on latency and UE power consumption.

Accordingly, the approaches described herein can result in a reduction of latency and UE power consumption when reconfiguring a radio bearer.

INTRODUCTION

In sixth generation (6G), due to new services/quality of service (QoS) requirements it is anticipated that more radio bearers (RBs) with different settings may be required compared to fourth generation (4G)/fifth generation (5G) where 1 default bearer for internet and 1-2 bearers for voice over long term evolution (VoLTE)/voice over new radio (VoNR) for internet protocol multimedia subsystem (IMS) signalling and voice data is very common. Services and their requirements on the radio bearers may be more dynamic with their needs over time, hence the setup/reconfiguration and release approaches described herein may be leaner than in the legacy approaches.

In legacy approaches, in the UL a Service Request is required via non-access stratum (NAS) signalling and the execution of radio resource control (RRC) reconfiguration. The RRC reconfigurations can get huge as they contain physical layer (PHY) config (master cell group (MCG)/secondary cell group (SCG)), layer 2 (L2) config, Measurement config, so it can become quite expensive signalling, with many, also big, messages to be exchanged. This has an impact on the latency and the user equipment (UE) power consumption.

Figure 24:
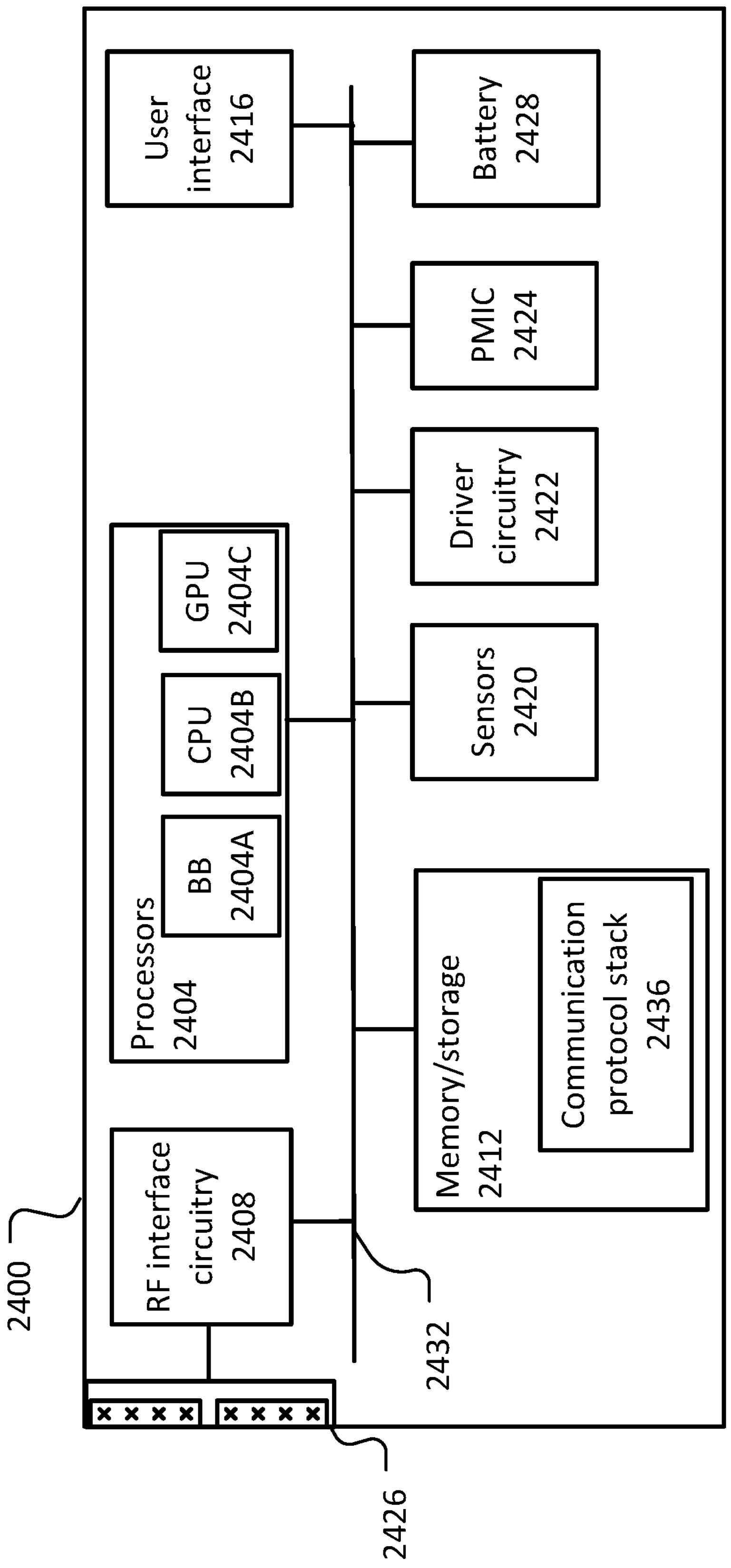
FIG. 24 illustrates an example user equipment (UE) in accordance with some embodiments.
Figure 25:
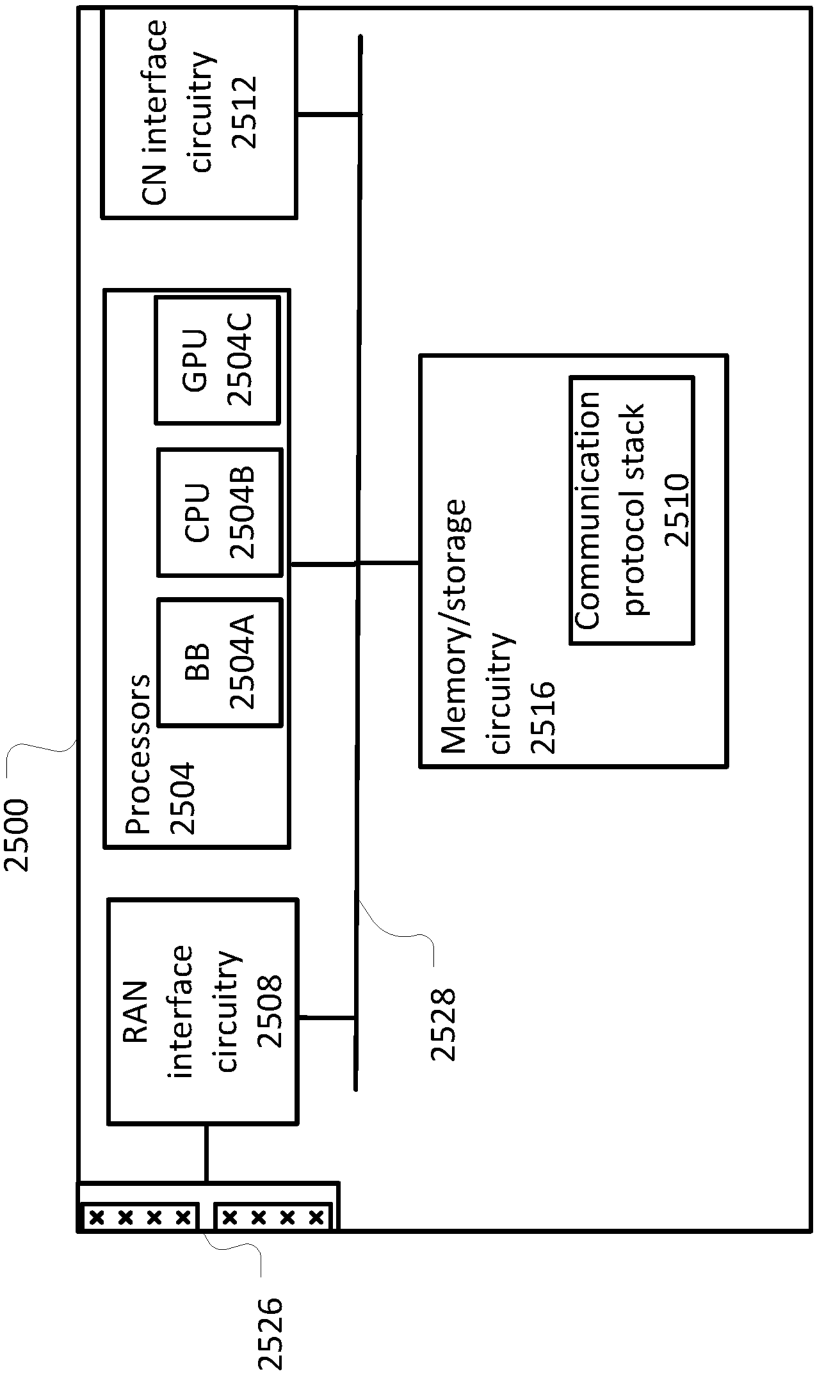
FIG. 25 illustrates an example next generation nodeB (gNB) in accordance with some embodiments.

FIG. 1 illustrates an example signal diagram 100 of an RB reconfiguration in accordance with some embodiments. In particular, the signal diagram 100 illustrates example signals that may be exchanged to affect a reconfiguration of an RB for communication between a UE 102 and a base station 104 (shown as a next generation nodeB (gNB)) in the illustrated embodiment. The UE 102 may include one or more of the features of the UE 2400 (FIG. 24) and the base station 104 may include one or more of the features of the gNB 2500 (FIG. 25).

The UE 102 may be connected to the base station 104 in 106. The connection between the UE 102 and the base station 104 may allow signals to be exchanged between the UE 102 and the base station 104. In the illustrated embodiment, the UE 102 and the base station 104 may be configured to operate with a first data radio bearer (DRB) 108 (which is illustrated at DRB 1) in the illustrated embodiment at the initiation of the signalling shown in the signal diagram 100.

The UE 102 and/or the base station 104 may determine that a configuration of the RBs for transmission of data between the UE 102 and the base station 104 is to be reconfigured. If the UE determines that a reconfiguration of the RBs is to be performed, then the UE 102 may execute a service request 110 (shown as an extended service request in the illustrated embodiment) via NAS messaging between the UE 102 and the base station 104 to request the network to change the RRC configuration. The network can trigger an RRC reconfiguration towards the UE based on the service request 110. In some embodiments, the NAS messaging may indicate settings for a target second RB configuration that require a second RB and/or settings for a target second RB configuration for which reconfiguration is to be performed that indicates that an RB requires reconfiguration. The service request may be optional in some instances.

The UE 102 and the base station 104 may then perform an RRC reconfiguration 112 to reconfigure the DRB. In particular, the base station 104 may transmit an RRC reconfiguration message 114 to the UE 102. The RRC reconfiguration message 114 may include information related to a master cell group (MCG) a secondary cell group (SCG), an RB configuration, a measurement configuration, or some combination thereof. This information included in the RRC reconfiguration message 114 may be relatively large, which may affect latency and/or power consumption of the UE 102.

The UE 102 may reconfigure the RBs on the UE side based on the RRC reconfiguration message 114. The UE 102 may respond with an RRC reconfiguration complete message 116 once the UE 102 has completed reconfiguration of the RBs on the UE side. In the illustrated embodiment, the reconfiguration may result in reconfiguration of a first DRB 118 and setup of a second DRB 120. The base station 104 may receive the RRC reconfiguration complete message 116. In response to receiving the RRC reconfiguration complete message 116, the base station 104 may reconfigure the RBs based on the information within the RRC reconfiguration message 114.

Once both the UE 102 and the base station 104 have completed reconfiguration, the UE 102 and the base station 104 will be able to properly transmit data between the UE 102 and the base station 104 via the second DRB 120. For example, data transmission 122 is shown between the UE 102 and the base station 104 in the illustrated embodiment.

Approach #1: Ad-Hoc Radio Bearers and Inline Signalling Via Service Data Adaptation Protocol (SDAP)

A first approach related to ad-hoc radio bearers and inline signalling may include a modification to the SDAP layer. The approach is to move SDAP layer below radio link control (RLC) and use SDAP labels and optional header extensions as identifiers for ad-hoc setup/reconfiguration/release of predefined/preconfigured RBs. SDAP layer in new radio (NR) does the QoS to DRB mapping and QoS flow identifier (QFI) labelling in SDAP headers for every packet. As long as SDAP is on top of package data convergence protocol (PDCP) it is impossible to signal ad-hoc RB configurations inline with SDAP since the receiver needs to properly decode at RLC/PDCP level.

Figure 2:
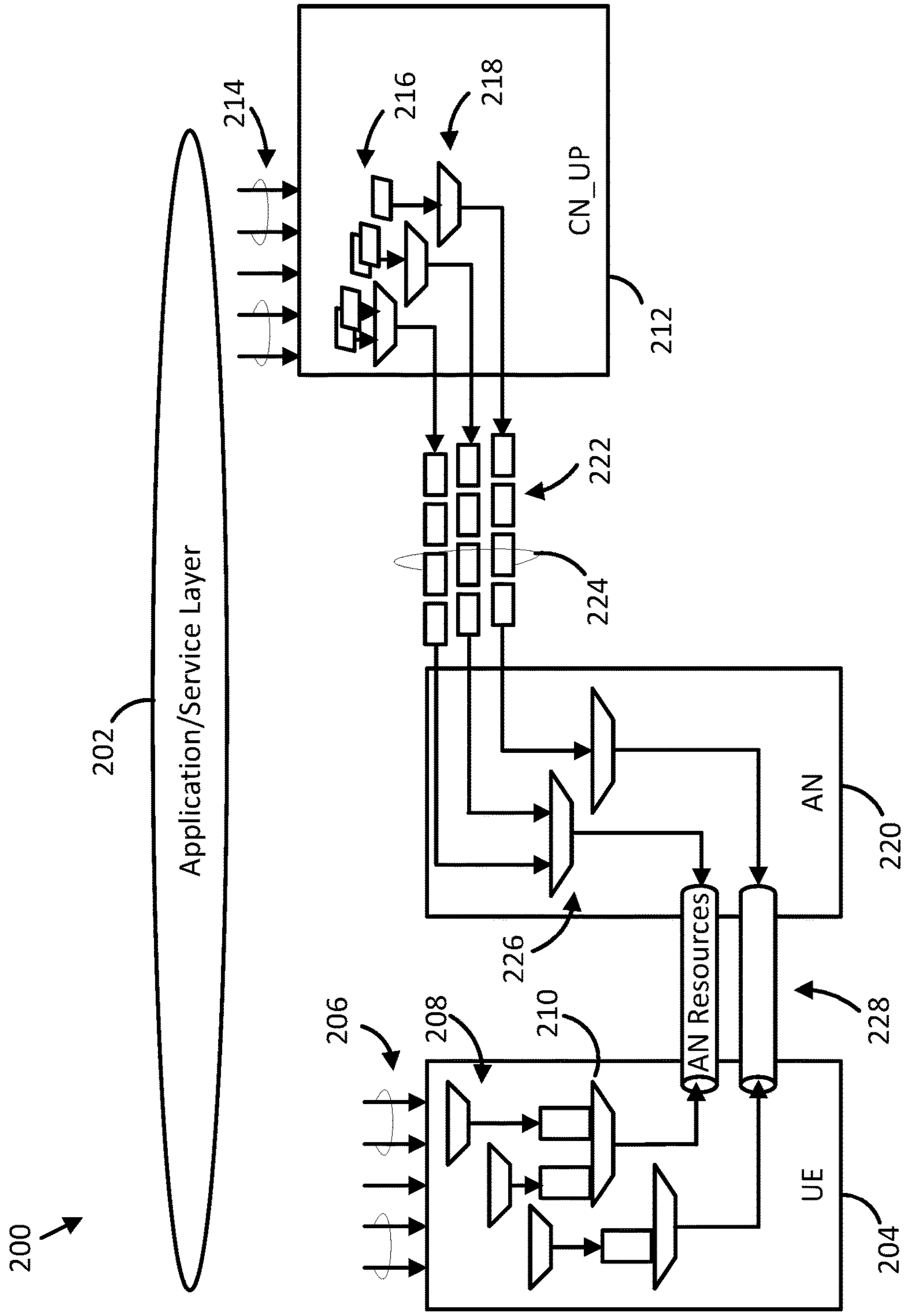
FIG. 2 illustrates an example quality of service (QoS) framework in accordance with some embodiments.

FIG. 2 illustrates an example QoS framework 200 in accordance with some embodiments. For example, the QoS framework 200 may be part of a network that can implement the ad-hoc radio bearers and inline signalling.

The QoS framework 200 may include an application/service layer 202. The application/service layer 202 may comprise hardware and/or software that may execute applications and/or provide services.

The QoS framework 200 may further include a UE 204. The UE 204 may include one or more of the features of the UE 2400 (FIG. 24). The UE 204 may be coupled to the application/service layer 202. The UE 204 may receive data from applications and/or services being executed by the application/service layer 202. For example, the UE 204 may receive data packets 206 from the application/service layer 202 in the illustrated example.

The UE 204 may include one or more NAS filters 208. The NAS filters 208 may be utilized for mapping packets to QoS flows and applying marking. For example, the NAS filters 208 may receive the data packets 206, and may map the data packets 206 to QoS flows and apply marking.

The UE 204 may further include one or more mapping elements 210. The mapping elements 210 may perform mapping flows to DRBs. The mapping elements 210 may receive the QoS flows related to the data packets 206 from the NAS filters 208 and map the QoS flows to DRBs in the illustrated embodiment.

The QoS framework 200 may include a core network user plane (CN_UP) 212. The CN_UP 212 may be coupled to the application/service layer 202. The CN_UP 212 may receive data from applications and/or services being executed by the application/service layer 202. For example, the CN_UP 212 may receive data packets 214 from the application/service layer 202 in the illustrated embodiment.

The CN_UP 212 may include one or more packet filters 216. The packet filters 216 may classify packets to service data flows (SDFs). For example, the packet filters may receive the data packets 214, and may classify the data packets 214 to SDFs.

The CN_UP 212 may include one or more NAS filters 218. The NAS filters 218 may be utilized for mapping packets to QoS flows and applying marking. For example, the NAS filters 218 may receive the data packets 214, and may map the data packets 214 to QoS flows and apply marking.

The QoS framework 200 may include an access network (AN) 220. The AN 220 may include one or more base stations, such as the gNB 2500 (FIG. 25). The AN 220 may be coupled to the CN_UP 212. The AN 220 may exchange packets with the CN_UP 212. In the illustrated embodiment, the AN 220 may receive packets 222 from the CN_UP 212 via a protocol data unit (PDU) session 224 established between the AN 220 and the CN_UP 212. The packets 222 received may be marked with QoS flow ID.

The AN 220 may include one or more mapping elements 226. The mapping elements 226 may map flows to DRBs. The mapping elements 226 may receive the QoS flows related to the packets 222 and map the QoS flows to the DRBs in the illustrated embodiment.

The AN 220 may further be coupled to the UE 204. The UE 204 and the AN 220 may exchange data via the DRBs. For example, the UE 204 and the AN 220 may exchange data via AN resources 228 providing for communication between the UE 204 and the AN 220.

Figure 3:
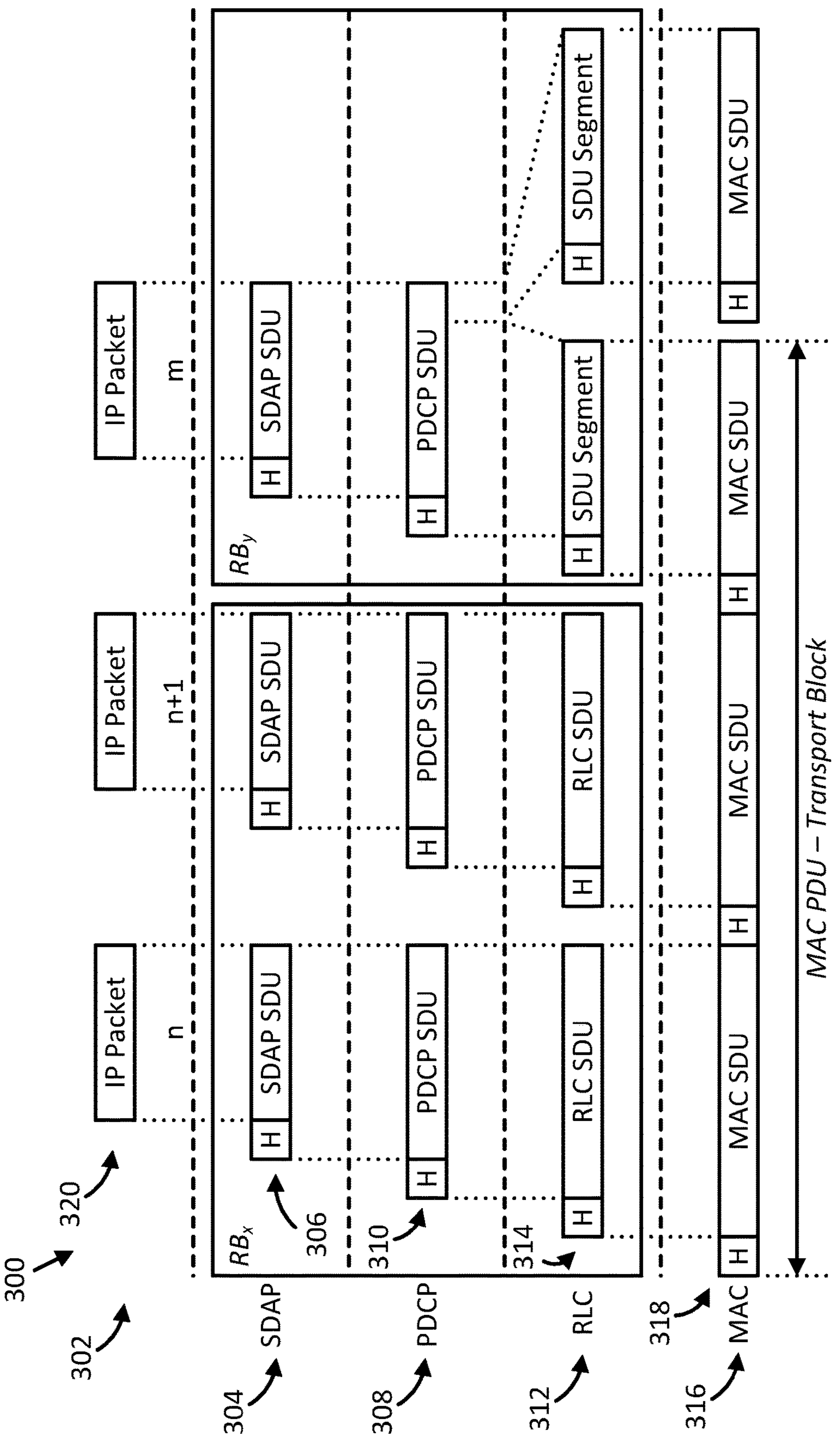
FIG. 3 illustrates an example layer arrangement in accordance with some embodiments.

FIG. 3 illustrates an example layer arrangement 300 in accordance with some embodiments. For example, the layer arrangement 300 may illustrate an arrangement of network layers that act upon internet protocol (IP) packets.

The layer arrangement 300 may include one or more IP packets 320 that can be processed by the layers of network. The layer arrangement 300 may include an SDAP layer 304. The SDAP layer 304 may be a top layer and may receive the IP packets 320. The SDAP layer 304 may produce one or more SDAP protocol data units (PDUs) 306. The SDAP layer 304 may further apply SDAP headers to SDAP SDUs (the headers being indicated by an H block at the beginning of the SDAP SDUs), producing SDAP PDUs 306 as a result.

The layer arrangement 300 may include a PDCP layer 308. The PDCP layer 308 may be located below the SDAP layer 304. The PDCP layer 308 may receive the SDAP PDUs 306 from the SDAP layer 304 and produce PDCP PDUs 310. The PDCP layer 308 may further apply PDCP headers to the PDCP SDUs (the headers being indicated by an H block at the beginning of the PDCP SDUs), producing PDCP PDUs 310 as a result.

The layer arrangement 300 may include an RLC layer 312. The RLC layer 312 may be located below the PDCP layer 308. The RLC layer 312 may receive the PDCP PDUs 310 from the PDCP layer 308 and produce RLC PDUs 314. The RLC layer 312 may further apply RLC headers to RLC SDUs (the headers being indicated by an H block at the beginning of the RLC SDUs), producing RLC PDUs 314 as a result.

The layer arrangement 300 may include a medium access control (MAC) layer 316. The MAC layer 316 may be located below the RLC layer 312. The MAC layer 316 may receive the RLC PDUs 314 from the RLC layer 312 and produce MAC PDUs 318. The MAC layer 316 may further apply MAC headers to MAC SDUs (the headers being indicated by an H block at the beginning of the MAC SDUs), producing MAC PDUs 318 as a result.

Figure 4:
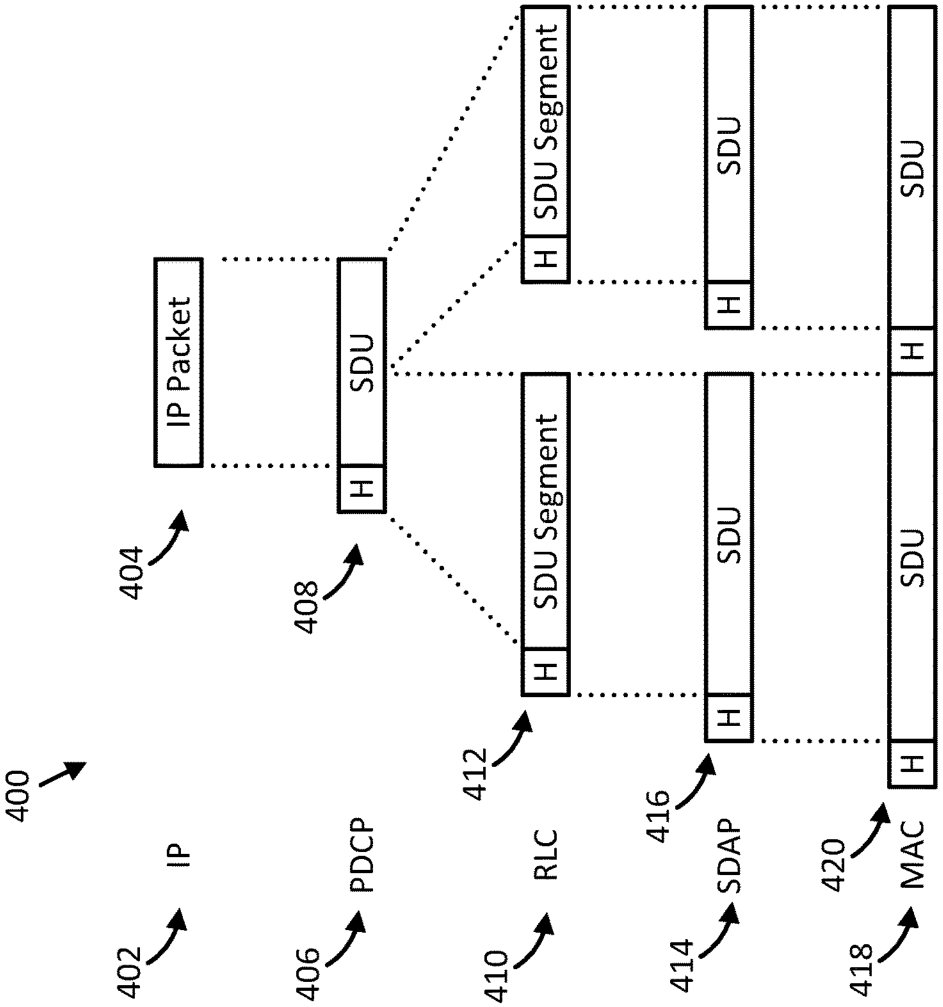
FIG. 4 illustrates an example layer arrangement with modified service data adaptation protocol (SDAP) layer in accordance with some embodiments.

FIG. 4 illustrates an example layer arrangement 400 with modified SDAP layer in accordance with some embodiments. For example, the layer arrangement 400 shows the SDAP layer below the RLC layer.

The layer arrangement 400 may include an IP layer 402. The IP layer 402 may produce one or more IP packets 404 that can be processed by the layers of network.

The layer arrangement 400 may include a PDCP layer 406. The PDCP layer 406 may be located below the IP layer 402. The PDCP layer 406 may receive the IP packets 404 from the IP layer 402 and produce PDUs 408. The PDCP layer 406 may further apply PDCP headers to the SDUs (the headers being indicated by an H block at the beginning of the SDUs), producing PDCP PDUs 408 as a result.

The layer arrangement 400 may include an RLC layer 410. The RLC layer 410 may be located below the PDCP layer 406. The RLC layer 410 may receive the PDUs 408 from the PDCP layer 406 and produce SDU segments 412. The RLC layer 410 may further apply RLC headers to the SDU segments 412 (the headers being indicated by an H block at the beginning of the SDU segments 412), producing RLC PDUs as a result. In other instances, segmentation of the PDUs 408 may not be required and the RLC headers may be applied without segmentation of the PDUs 408. For example, segmentation may be omitted when the resulting RLC PDUs can fit into a single transmission.

The layer arrangement 400 may include an SDAP layer 414. The SDAP layer 414 may be located below the RLC layer 410. The SDAP layer 414 may receive PDUs from the RLC layer 410 (containing an SDU segment) and produce PDUs 416. The SDAP layer 414 may further apply SDAP headers to the SDUs (the headers being indicated by an H block at the beginning of the SDUs), producing SDAP PDUs as a result.

The layer arrangement 400 may include a MAC layer 418. The MAC layer 418 may be located below the SDAP layer 414. Accordingly, the SDAP layer 414 may be located between the RLC layer 410 and the MAC layer 418. The MAC layer 418 may receive the PDUs 416 from the SDAP layer 414 and produce PDUs 420. The MAC layer 418 may further apply MAC headers to the SDUs (the headers being indicated by an H block at the beginning of the SDUs), producing MAC PDUs as a result.

Figure 17:
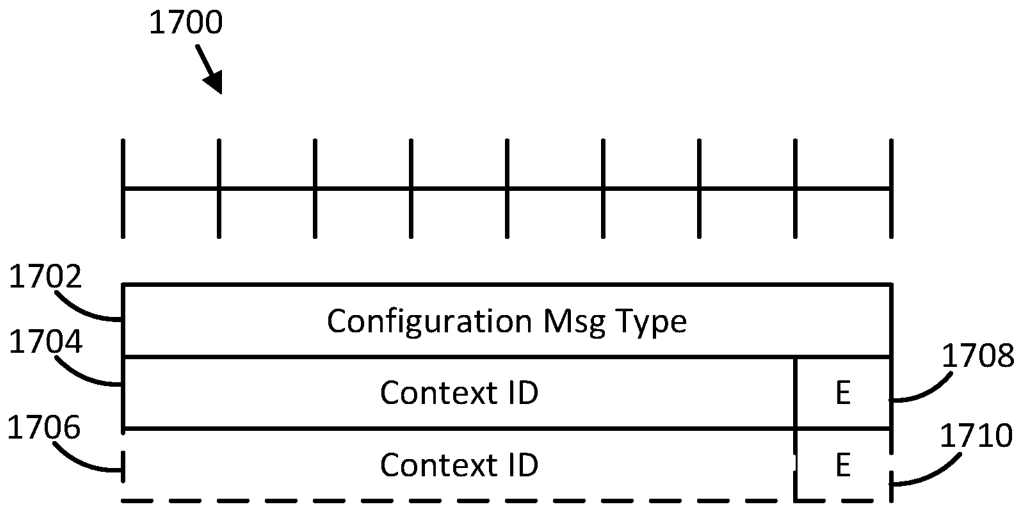
FIG. 17 illustrates an example layer 2 configuration (L2C) header in accordance with some embodiments.

The approach 1 is to split the SDAP functionality and move the labelling and SDAP header part below RLC. The SDAP header is created after RLC PDU creation and by adding a context ID within the SDAP header a required ad-hoc bearer establishment can be indicated towards the RX side. On the RX side the SDAP header can be decoded and ad-hoc bearers could be established before the QoS Flow is handed over to RLC. FIG. 4 and FIG. 17 show the difference in the flow between the legacy NR status and the approach 1 for UL transmission.

Figure 5:
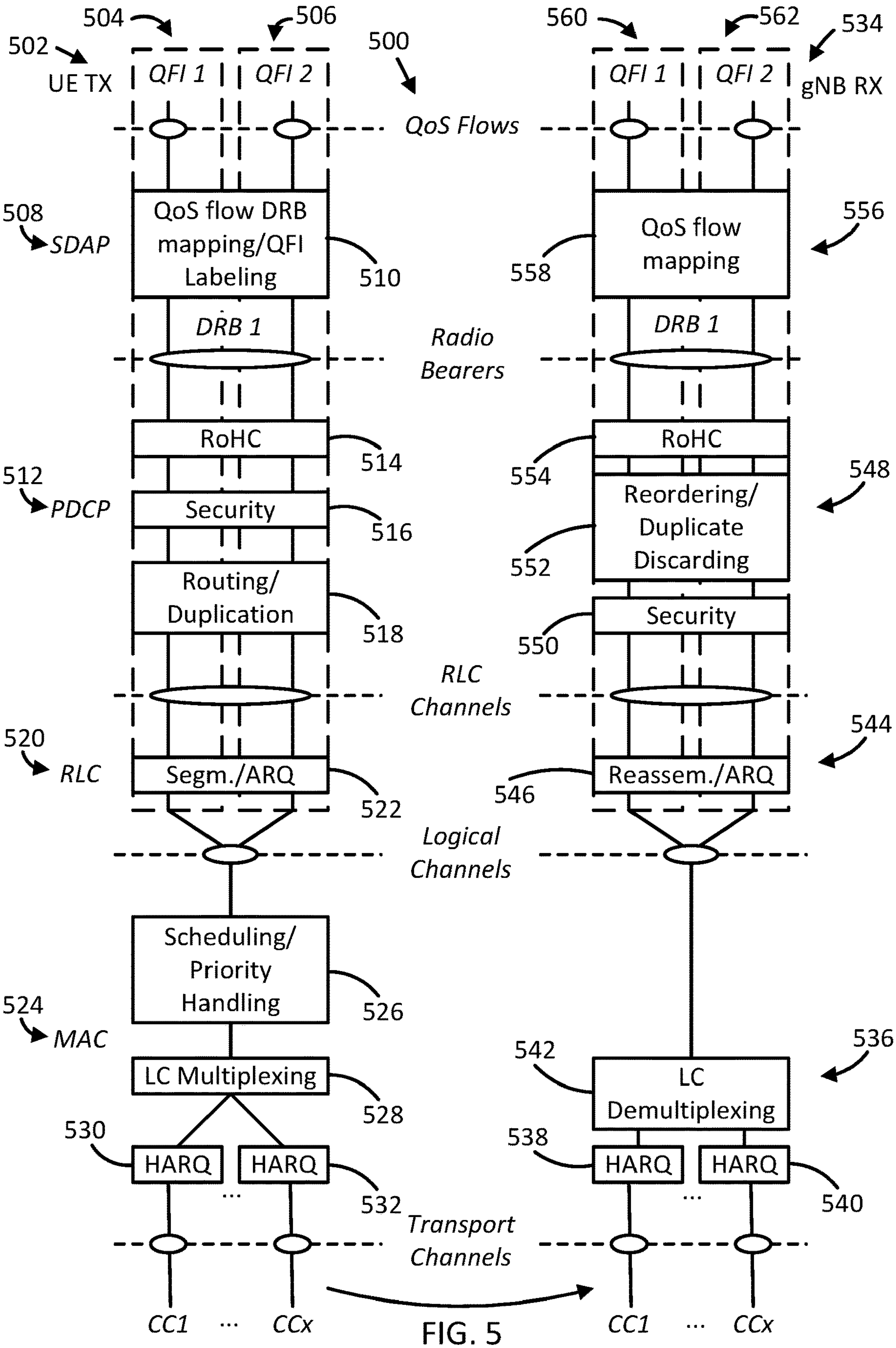
FIG. 5 illustrates an example QoS flow in accordance with some embodiments.

FIG. 5 illustrates an example QoS flow 500 in accordance with some embodiments. In particular, the QoS flow 500 illustrates QoS flow for transmissions from a UE (such as the UE 204 (FIG. 2) and/or the UE 2400 (FIG. 24)) to a base station (such as the gNB 2500 (FIG. 25)). As the UE is initiating the process of the transmission, the UE may be the originating device and the base station may be the receiving device in the illustrated example. It should be understood that the base station may be the originating device and the UE may be the receiving device in some other instances, where the base station may perform the operations described in relation to the UE in the illustrated example and the UE may perform the operations described in relation to base station in these other instances.

The QoS flow 500 may include a UE transmission flow 502. The UE transmission flow 502 illustrates an example QoS flow of QoS flow packets for transmission from the UE. In the illustrated embodiment, the UE transmission flow 502 may include a first QFI 504 and a second QFI 506. The first QFI 504 and the second QFI 506 may be mapped to corresponding QoS flows.

The UE transmission flow 502 may include an SDAP layer 508. The SDAP layer 508 may be a top layer of the UE transmission flow 502. The SDAP layer 508 may receive the QoS flows from the first QFI 504 and the second QFI 506. The SDAP layer 508 may perform QoS flow DRB mapping and QFI labelling with the QoS flows, as indicated by 510. In the illustrated embodiment, the SDAP layer 508 may map the QoS flows to a first DRB (labeled DRB 1).

The UE transmission flow 502 may include a PDCP layer 512. The PDCP layer 512 may be located below the SDAP layer 508. The PDCP layer 512 may receive the DRBs from the SDAP layer 508 and perform one or more operations with the DRBs. For example, the PDCP layer 512 may receive data for the first DRB from the SDAP layer 508 and perform operations with the first DRB. The PDCP layer 512 may perform operations such as robust header compression (RoHC) 514, security operations 516, and/or routing/duplication operations 518. The PDCP layer 512 may route the DRB data to RLC channels.

The UE transmission flow 502 may include an RLC layer 520. The RLC layer 520 may be located below the PDCP layer 512. The RLC layer 520 may receive the RLC channels from the PDCP layer 512. The RLC layer 520 may produce RLC PDUs and segment PDUs in 522. Further, the RLC layer 520 may further provide automatic repeat request in 522. The RLC layer 520 may map the SDUs to logical channels.

The UE transmission flow 502 may include a MAC layer 524. The MAC layer 524 may be located below the RLC layer 520. The MAC layer 524 may receive the LCs from the RLC layer 520. The MAC layer 524 may perform one or more operations with the LCs. In the illustrated embodiment, the MAC layer 524 may perform a scheduling/priority handling operation 526, a logical channel (LC) multiplexing operation 528, and a first hybrid automatic repeat request (HARQ) operation 530 and a second HARQ operation 532 with the LCs. The MAC layer 524 may direct the LC to component carriers (CCs) for transmission to a base station.

The QoS flow 500 may further include a base station reception flow 534. The base station reception flow 534 may illustrate QoS flow of QoS flow packets received by a base station from a UE. In the particular embodiment, the base station reception flow 534 illustrates an example QoS flow of QoS flow packets received from the UE transmission flow 502. In particular, the UE transmission flow 502 may provide signals via the CCs on transport channels to the base station reception flow 534.

The base station reception flow 534 may include a MAC layer 536. The MAC layer 536 may be a bottom layer of the base station reception flow 534. The MAC layer 536 may receive the CCs from the UE transmission flow 502 and may perform one or more operations with the CCs. In the illustrated embodiment, the MAC layer 536 may perform one or more HARQ operations corresponding to the CCs (a first HARQ operation 538 and a second HARQ operation 540 shown in the illustrated example), and an LC demultiplexing operation 542 with the CCs. The MAC layer 536 may map the CCs to LCs and produce RLC PDUs.

The base station reception flow 534 may include an RLC layer 544. The RLC layer 544 may be located above the MAC layer 536. The RLC layer 544 may receive the RLC PDUs from the MAC layer 536 and may perform one or more operations with the RLC PDUs. In the illustrated embodiment, the RLC layer 544 may reassemble the RLC SDUs in 546 and send the reassembled RLC SDUs of an RLC channel towards PDCP. Further, the RLC layer may perform automatic repeat request operations in 546.

The base station reception flow 534 may include a PDCP layer 548. The PDCP layer 548 may be located above the RLC layer 544. The PDCP layer 548 may receive the PDCP PDUs from the RLC layer 544. The PDCP layer 548 may perform one or more operations on the PDCP PDUs. The PDCP layer 548 may perform operations, such as security operations 550, reordering/duplicate discarding operations 552, and/or RoHC operations 554, to the PDCP PDUs. The PDCP layer 548 may route the RLC channels to one or more DRBs. In the illustrated embodiment, the PDCP layer 548 may route the RLC channels to a DRB, labeled DRB 1.

The base station reception flow 534 may include an SDAP layer 556. The SDAP layer 556 may be located above the PDCP layer 548. Further, the SDAP layer 556 may be the top layer of the base station reception flow 534. The SDAP layer 556 may receive the DRBs from the PDCP layer 548. The SDAP layer 556 may perform one or more operations on the DRBs. For example, the SDAP layer 556 may perform a QoS flow mapping operation 558. The QoS flow mapping operation 558 may map each of the DRBs to the proper one of a first QFI 560 or a second QFI 562.

Figure 6:
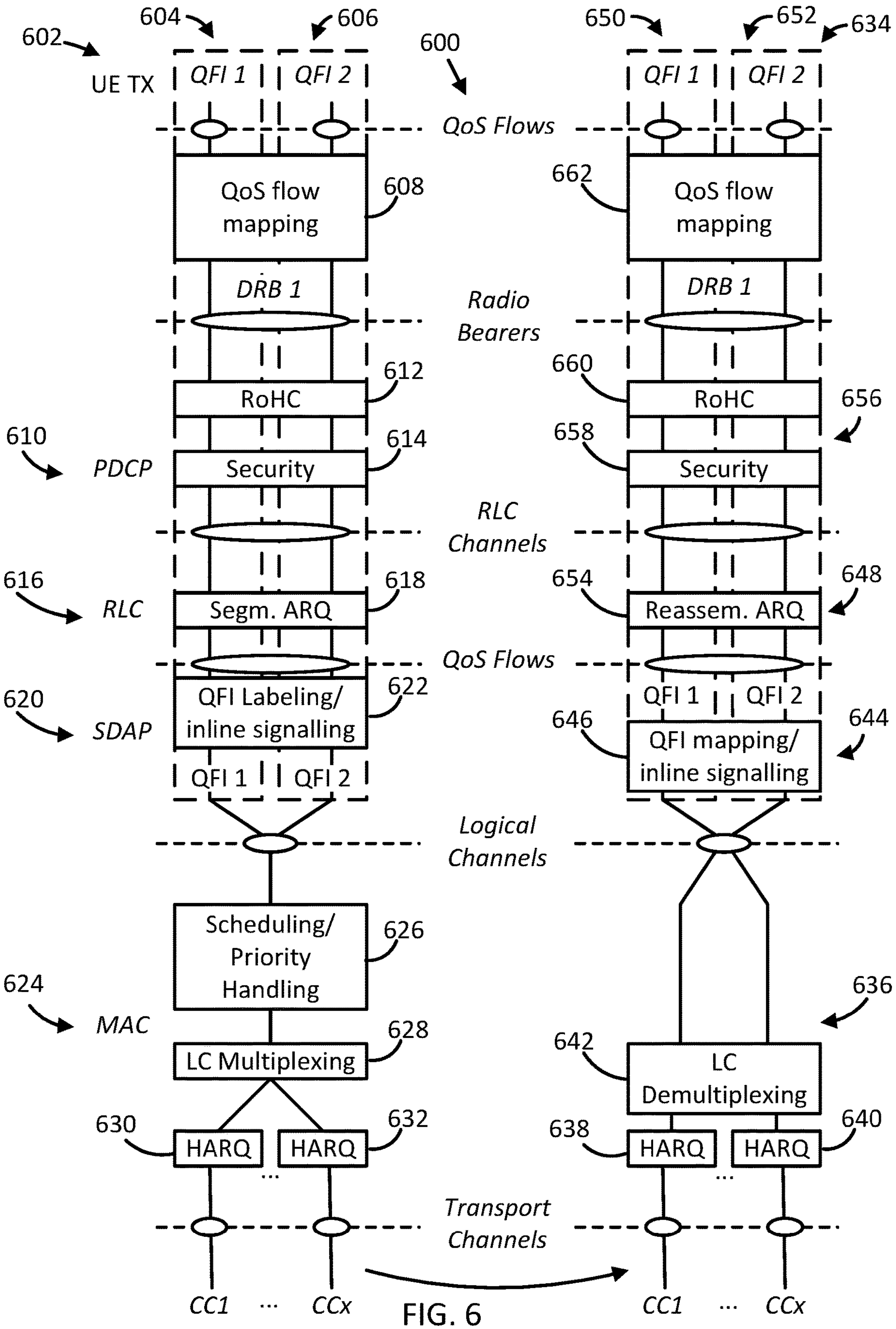
FIG. 6 illustrates another example QoS flow in accordance with some embodiments.

FIG. 6 illustrates another example QoS flow 600 in accordance with some embodiments. In particular, the QoS flow 600 illustrates QoS flow for transmissions from a UE (such as the UE 204 (FIG. 2) and/or the UE 2400 (FIG. 24)) to a base station (such as the gNB 2500 (FIG. 25)). It should be understood that the base station may be the originating device and the UE may be the receiving device in some other instances, where the base station may perform the operations described in relation to the UE in the illustrated example and the UE may perform the operations described in relation to base station in these other instances.

The QoS flow 600 may differ from the QoS flow 500 (FIG. 5) in that the SDAP layer may be moved below the RLC layer. In particular, the originating device may perform QFI labelling and inline signalling and the receiving device may perform QFI mapping and inline signalling below the RLC layer. Having the SDAP layer below the RLC layer in the ad-hoc radio bearer and/or inline signalling approaches may allow for the transmissions between the originating device and the receiving device to be mapped to the correct DRB and correctly decoded. This will be described further throughout the description of the QoS flow 600.

The QoS flow 600 may include a UE transmission flow 602. The UE transmission flow 602 illustrates an example QoS flow of QoS flow packets for transmission from the UE. In the illustrated embodiment, the UE transmission flow 602 may include a first QFI 604 and a second QFI 606. The first QFI 604 and the second QFI 606 may be mapped to corresponding QoS flows. For example, the UE transmission flow 602 may include a QoS flow mapping operation 608 that maps the first QFI 604 and the second QFI 606 to the corresponding QoS flows. The QoS flow mapping operation 608 may be performed above the layers described below. The QoS flow mapping operation 608 may map the first QFI 604 and the second QFI 606 to corresponding DRBs. For example, the QoS flow mapping operation 608 may map the first QFI 604 and the second QFI 606 to a first DRB (labelled DRB 1) in the illustrated embodiment.

The UE transmission flow 602 may include a PDCP layer 610. The PDCP layer 610 may be a top layer of the UE transmission flow 602. The PDCP layer 610 may receive the DRBs from the QoS flow mapping operation 608 and perform one or more operations with the DRBs. For example, the PDCP layer 610 may receive the first DRB and perform operations with the first DRB. The PDCP layer 610 may perform operations such as robust header compression (RoHC) 612 and/or security operations 614. The PDCP layer 610 may route the DRB to RLC channels.

The UE transmission flow 602 may include an RLC layer 616. The RLC layer 616 may be located below the PDCP layer 610. The RLC layer 616 may receive the RLC channels from the PDCP layer 610. The RLC layer 616 may produce RLC PDUs and segment the SDUs in 618. Further, the RLC layer 616 may further provide automatic repeat request in 618.

The UE transmission flow 602 may include an SDAP layer 620. The SDAP layer 620 may be located below the RLC layer 616. Further, the SDAP layer 620 may be located between the RLC layer 616 and a MAC layer 624. The SDAP layer 620 may receive the RLC PDUs from the RLC layer 616. The SDAP layer 620 may perform QFI labelling and/or QFI inline signalling operations with the QoS flows, as indicated by 622. Having the QFI labelling and inline signalling operations below the RLC layer 616 may allow proper labelling and DRB configuration information to be applied to the transmissions for changes that may be due to ad-hoc DRB operations. For example, ad-hoc DRB operations may result in the QoS flow mapping operation 608 to be changed, which could result in different QFIs going toward different operations at the receiving side. Having the QFI labelling and inline signalling operations below the RLC layer 616 may assure that the QFI are mapped correctly. The SDAP layer 620 may map the SDAP PDUs to LCs.

The UE transmission flow 602 may include a MAC layer 624. The MAC layer 624 may be located below the SDAP layer 620. The MAC layer 624 may receive the LCs from the SDAP layer 620. The MAC layer 624 may perform one or more operations with the LCs. In the illustrated embodiment, the MAC layer 624 may perform a scheduling/priority handling operation 626, an LC multiplexing operation 628, and one or more HARQ operations corresponding to the CCs (a first HARQ operation 630 and a second HARQ operation 632 shown in the illustrated example) with the LCs. The MAC layer 624 may direct the LC to component carriers (CCs) for transmission to a base station.

The QoS flow 600 may further include a base station reception flow 634. The base station reception flow 634 may illustrate QoS flow of QoS flow packets received by a base station from a UE. In the particular embodiment, the base station reception flow 634 illustrates an example QoS flow of QoS flow packets received from the UE transmission flow 602. In particular, the UE transmission flow 602 may provide signals via the CCs on transport channels to the base station reception flow 634.

The base station reception flow 634 may include a MAC layer 636. The MAC layer 636 may be a bottom layer of the base station reception flow 634. The MAC layer 636 may receive the CCs from the UE transmission flow 602 and may perform one or more operations with the CCs. In the illustrated embodiment, the MAC layer 636 may perform one or more HARQ operations corresponding to the CCs (a first HARQ operation 638 and a second HARQ operation 540 shown in the illustrated example), and an LC demultiplexing operation 642 with the CCs. The MAC layer 636 may map the CCs to LCs and deliver MAC SDUs towards SDAP.

The base station reception flow 634 may include an SDAP layer 644. The SDAP layer 644 may be located above the MAC layer 636. Further, the SDAP layer 644 may be located below an RLC layer 648. Accordingly, the SDAP layer 644 may be located between the RLC layer 648 and the MAC layer 636. The SDAP layer 644 may receive the LCs from the MAC layer 636. The SDAP layer 644 may perform one or more operations on the LCs. For example, the SDAP layer 644 may perform a QoS flow mapping and/or inline signalling operation 646. The QoS flow mapping operation and/or inline signalling operation 646 may map each of the LCs to the proper one of a first QFI 650 or a second QFI 652. Further, the SDAP layer 644 may direct the LCs to the proper DRB. The SDAP layer 644 may output the LCs to QoS flows. By having the SDAP layer 644 below the RLC layer 648 and directing the LC to the proper QFI and/or DRB may provide for proper decoding in the instance of ad-hoc radio bearer approaches. Having the SDAP layer 644 above the PDCP layer 656 or the RLC layer 648 may result in improper decoding of the LCs.

The base station reception flow 634 may include an RLC layer 648. The RLC layer 648 may be located above the SDAP layer 644. The RLC layer 648 may receive the QoS flows from the SDAP layer 644 and may perform one or more operations with the QoS flows. In the illustrated embodiment, the RLC layer 648 may reassemble the RLC PDUs in 654 to produce PDCP PDUs and map the reassembled PDCP PDUs to RLC channels. Further, the RLC layer may perform automatic repeat request operations in 654.

The base station reception flow 634 may include a PDCP layer 656. The PDCP layer 656 may be located above the RLC layer 648. The PDCP layer 656 may receive the PDCP PDUs from the RLC layer 648. The PDCP layer 656 may perform one or more operations on the PDCP PDUs. The PDCP layer 656 may perform operations, such as security operations 658 and/or RoHC operations 660, to the PDCP PDUs. The PDCP layer 656 may route the RLC channels to one or more DRBs. In the illustrated embodiment, the PDCP layer 656 may route the RLC channels to a first DRB, labeled DRB 1.

The base station reception flow 634 may include a QoS flow mapping operation 662. The QoS flow mapping operation 662 may be located above the PDCP layer 656. The QoS flow mapping operation 662 may receive the first DRB from the PDCP layer 656. Further, the QoS flow mapping operation 662 may map the DRBs to QoS flows.

Figure 7:
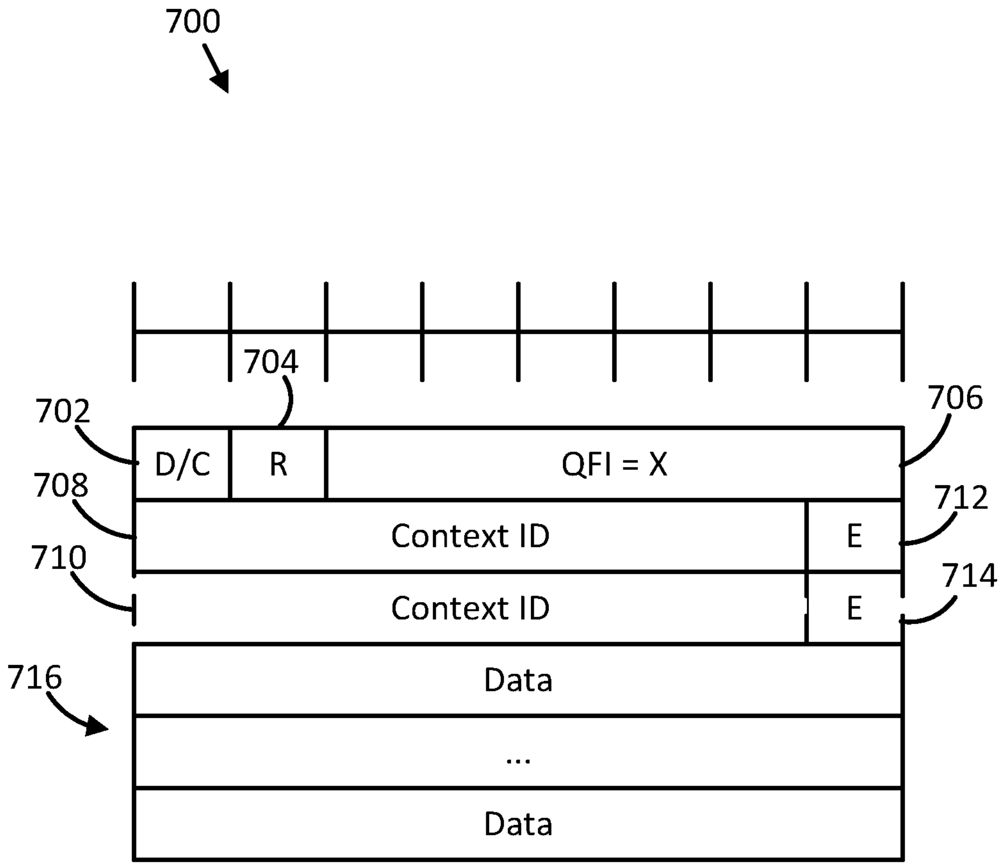
FIG. 7 illustrates an example SDAP header that may be utilized for data radio bearer (DRB) setup, reconfiguration, and/or release in accordance with some embodiments.
Figure 8:
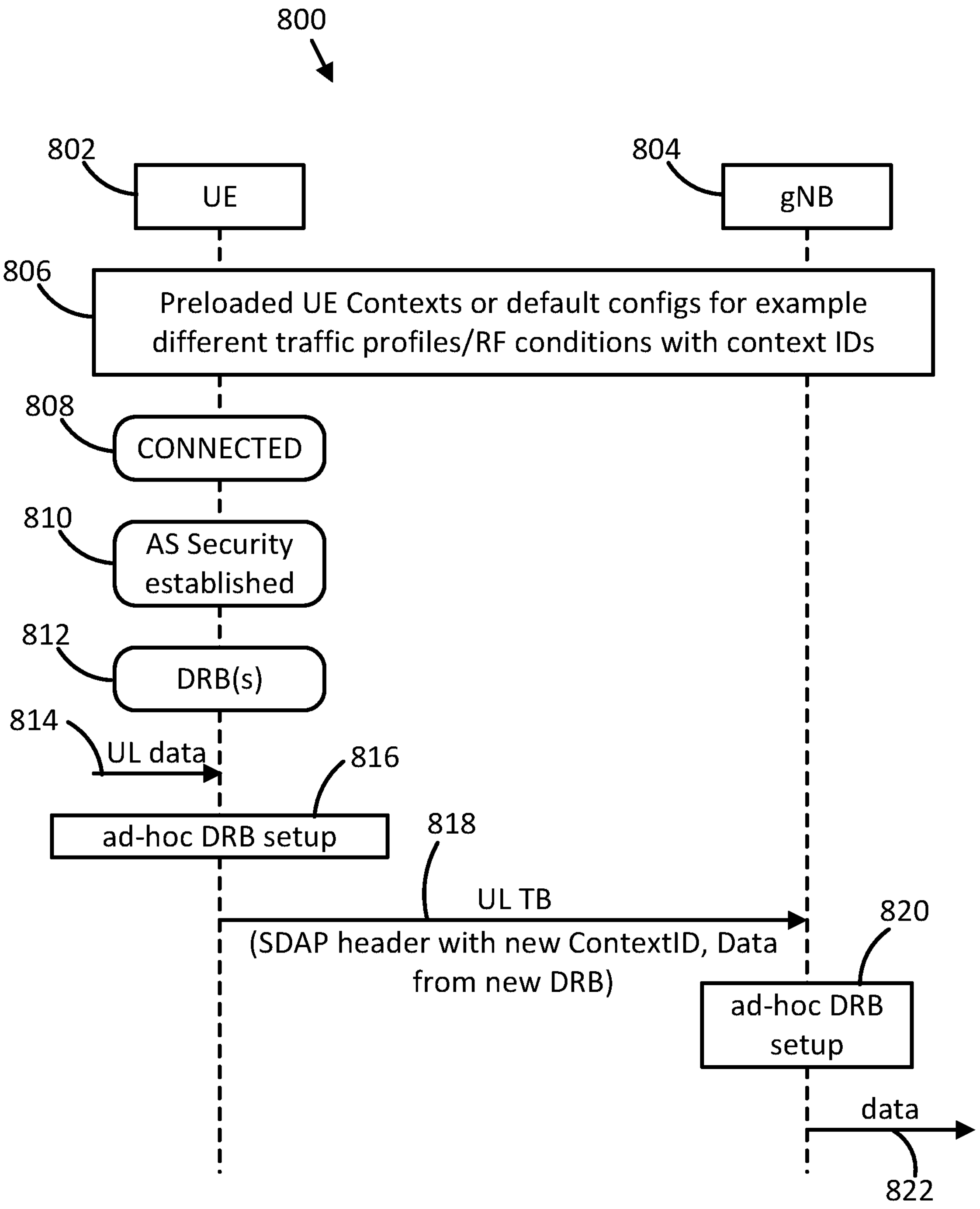
FIG. 8 illustrates an example signal diagram corresponding to the SDAP header of FIG. 7 in accordance with some embodiments.

FIG. 7 and FIG. 8 illustrate a UL example in accordance with some embodiments. FIG. 7 illustrates an example SDAP header 700 that may be utilized for DRB setup, reconfiguration, and/or release in accordance with some embodiments. FIG. 8 illustrates an example signal diagram 800 corresponding to the SDAP header 700 of FIG. 7 in accordance with some embodiments. The illustrated example shows an example setup of an ad-hoc DRB in accordance with some embodiments.

The DRB setup example may occur between a UE 802 and a base station 804. The UE 802 may include one or more of the features of the UE 204 (FIG. 2) and/or the UE 2400 (FIG. 24), and the base station 804 may include one or more of the features of the gNB 2500 (FIG. 25). In the illustrated example, the UE 802 may originate the DRB setup of example 1 and the base station 804 may receive information from the UE 802 for configuration of the DRB. The UE 802 and the base station 804 may have preloaded UE contexts and/or default configurations stored as indicated by 806. The preloaded UE contexts and/or default configurations may be for different traffic profiles and/or RF conditions. Further, the preloaded UE contexts and/or default configurations may include Context IDs. The UE 802 may be connected to the base station 804 as indicated by 808. Further, the UE 802 may have access stratum (AS) security established, as illustrated by 810. The UE 802 may have one or more DRBs 812 configured. In some embodiments, the one or more DRBs 812 may comprise a best effort type bearer.

The UE 802 may be operating an application or providing a service which may generate UL data 814, or may receive the UL data 814 from an application or a service. For example, the UE 802 receives packets of QoS Flow ID=X. Accordingly, the UL data 814 may comprise packets of QoS flow ID equal to X in the illustrated embodiment. The UE 802 may determine a configuration for a DRB to carry the UL data 810 based on the UL data 814. For example, the UE 802 may determine the configuration for the DRB based on QoS requirements, application end-to-end latency, privacy/security needs, small/medium/large amounts of data, congestion based, using transmission (TX)/reception (RX) window information on different levels, offloading capabilities, and/or radio frequency (RF) conditions like cell edge, packet loss rates related to the UL data 716. These elements utilized for determining the configuration may be referred to as configuration considerations throughout this disclosure.

To ensure the required QoS the UE 802 may decide to setup a new ad-hoc DRB. For example, the UE 802 may decide to setup a new ad-hoc DRB to meet the configuration determined for the DRB. The UE 802 may perform an ad-hoc DRB setup 816 to setup the new ad-hoc DRB. The UE 802 may map the data belonging to QFI=X already to the new DRB. For example, the UE 802 may map the UL data 814 to the DRB setup by the ad-hoc DRB setup 816.

The UE 802 may generate the SDAP header 700 to indicate the DRB setup to the base station 804. The SDAP header 700 illustrates an example SDAP header for DRB setup/reconfiguration/release in accordance with some embodiments. The UE 802 may transmit the SDAP header 700 to the base station 804 to indicate the configuration of the new ad-hoc DRB setup by the ad-hoc DRB setup 816. The UE 802 may apply the SDAP header 700 at an SDAP layer (such as the SDAP layer 620 (FIG. 6)). For example, at SDAP layer (below RLC) the UE 802 may add the SDAP header 700 indicating the QFI=X and new Context ID(s) to indicate the establishment of ad-hoc bearer(s) of this context(s) before this packet can be decoded properly.

The SDAP header 700 may include a data/control field 702. The data/control field 702 may indicate whether the transmission that includes the SDAP header 700 is a data transmission or a control transmission. For example, D/C in the illustrated example may be Data/Control. The SDAP header 700 may be a data transmission in the illustrated example. For example, the SDAP header 700 may be a Data PDU. The SDAP header 700 may further include a reserved field 704. For example, R may indicate reserved. The reserved field 704 may be unused and reserved for possible future use.

The SDAP header 700 may include a QFI field 706. The QFI field 706 may indicate an RB to which a QFI is to be mapped. In the instances where an ad-hoc DRB is setup and/or configured, a value of the QFI field 706 may be set to indicate the ad-hoc DRB. The value of QFI field 706 may be a QoS Flow Indicator. The QFI field 706 may indicate to a receiving device of the SDAP header 700 to which RB the data in the transmission is to be directed. As the SDAP header 700 is for a DRB, the QFI field 706 may indicate to which DRB the data is to be transmitted. In the illustrated embodiment, the QFI field 706 may be set to a value of X to indicate that the data is to be directed to a DRB corresponding to the QoS flow indicator of X.

The SDAP header 700 may include one or more context ID fields. For example, the SDAP header 700 includes a first context ID field 708 and a second context ID field 710 in the illustrated embodiment. The context ID fields may indicate preconfigured DRB settings to be utilized for a DRB to be setup, reconfigured or released. For example, Context ID may indicate ID of the preconfigured DRB settings to be used. UEs and base stations within a network may be preconfigured with DRB settings for different configurations, where a context ID within a context field may indicate one of the preconfigured configurations with preconfigured DRB settings. Each of the context ID fields may correspond to a DRB to be setup, reconfigured or released. For example, the first context ID field 708 may correspond to a first DRB to be setup, reconfigured or released and the second context ID field 710 may correspond to a second DRB to be setup, reconfigured or released.

The SDAP header 700 may include one or more extension flags. For example, the SDAP header 700 includes a first extension flag 712 and a second extension flag 714 in the illustrated embodiment. Each of the extension flags may correspond to a corresponding context ID field. For example, the first extension flag 712 corresponds to the first context ID field 708 and the second extension flag 714 corresponds to the second context ID field 710 in the illustrated embodiment. The extension flags may indicate whether another context ID field follows the corresponding context ID field. For example, the first extension flag 712 indicates whether another context ID field follows the corresponding first context ID field 708 and the second extension flag 714 indicates whether another context ID field follows the corresponding second context ID field 710 in the illustrated embodiment. In some embodiments, Extension Flag value of 0 indicates SDAP header ends and/or no context ID fields follow the corresponding context ID field and an Extension Flag value of 1 indicates Another Context ID octet is following. In the illustrated embodiment, the second context ID field 710 and the second extension flag 714 are indicated in dashed lines to indicate the inclusion of the second context ID field 710 and the second extension flag 714 being included in the SDAP header 700 may depend on a value of the first extension flag 712.

In the illustrated embodiment, the SDAP header 700 is illustrated with data 716. The SDAP header 700 may be transmitted in a same TB as the data 716. For example, the data 716 may comprise the UL data 814 and the UL data 814 may be transmitted in a same TB as the SDAP header 700.

The UE 802 may transmit the SDAP header 700 with the UL data 814 on a UL TB 818 to the base station 804. The UL data 814 may be arranged and/or encoded in accordance with the configuration corresponding to the value of the one of the context IDs for the DRB indicated in the SDAP header 700 when transmitted in the UL TB 818. Accordingly, the SDAP header 700 may indicate the configuration of the DRB transporting the UL data 716. The indication of the configuration of the DRB may be transported in the same UL TB 818 as the data to which the configuration of the DRB is to apply.

The base station 804 may receive the UL TB 818 from the UE 802. The base station 804 may receive the UL TB 818 on a MAC layer (such as the MAC layer 636 (FIG. 6)), and may demultiplex and map the UL TB 818 according to the RB configuration. For example, when the base station 804 (illustrated as a next generation NodeB (gNB)) receives the packet on MAC layer it may demultiplex and map it according to the current RB configuration. The base station 804 may identify the SDAP header 700 within the UL TB 818 and determine the configuration for the DRB from the SDAP header 700. In the illustrated example, the base station 804 may determine that the DRB is to be configured with the configuration corresponding to the one of the context IDs indicated in the SDAP header 700.

The base station 804 may perform an ad-hoc DRB setup 820 to configure the base station side with the determined configuration. As the UL TB 818 was transmitted via the newly setup ad-hoc DRB setup at the UE side. The newly setup ad-hoc bearer may not be mapped to an LC when the UL TB 818 is provided to the base station 804. According, the UL TB 818 may be provided to an SDAP layer (such as the SDAP layer 644 (FIG. 6)) of the base station 804 without an LC indicated. The SDAP layer may decode the SDAP header 700 and perform the ad-hoc DRB setup 820. For example, since this packet was transmitted via a newly established ad-hoc bearer there is no mapping to LC available, the packet may be given to SDAP without LC and SDAP can continue the decoding of the SDAP header and setup the receiving side of the ad-hoc DRB(s) according to the indicated Context ID(s). After that the SDAP layer can forward the data correctly. The base station 804 may retrieve the determined configuration from memory to configure the DRB via the ad-hoc DRB setup 820.

The base station 804 may utilize the configuration of the DRB to process the UL data 814 received in the UL TB 818. For example, the base station 804 may decode the UL TB 818 in accordance with the configuration of the DRB to produce data 822. The base station 804 may provide the data 822 to another of the network elements, such as the core network.

Figure 9:
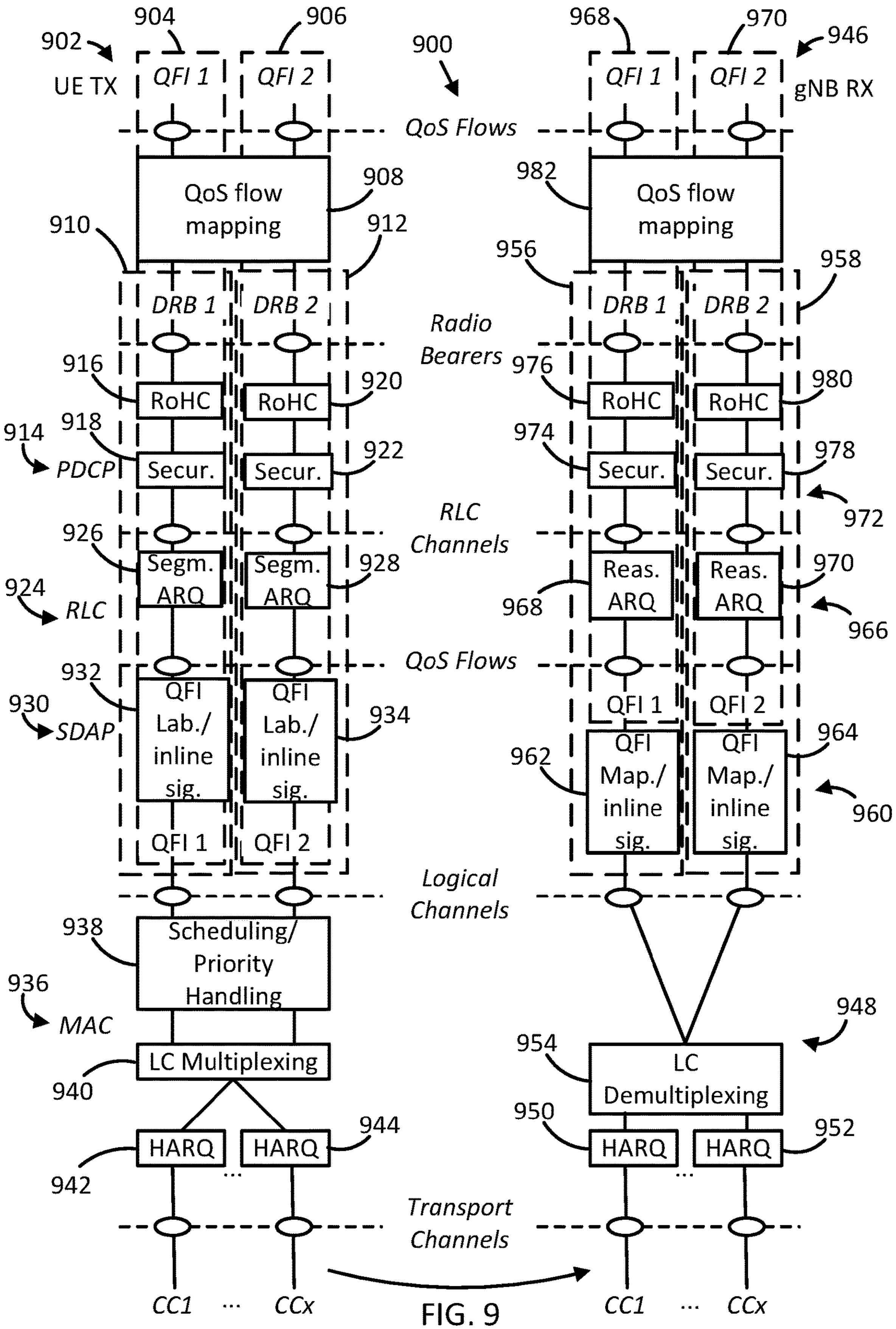
FIG. 9 illustrates another example QoS flow in accordance with some embodiments.

FIG. 9 illustrates another example QoS flow 900 in accordance with some embodiments. In particular, the QoS flow 900 illustrates QoS flow for transmissions from a UE (such as the UE 204 (FIG. 2) and/or the UE 2400 (FIG. 24)) to a base station (such as the gNB 2500 (FIG. 25)). The QoS flow 900 may be a QoS flow after an ad-hoc radio bearer or multiple ad-hoc radio bearers have been setup, such as described in relation to FIG. 8. It should be understood that the base station may be the originating device and the UE may be the receiving device in some other instances, where the base station may perform the operations described in relation to the UE in the illustrated example and the UE may perform the operations described in relation to base station in these other instances.

The QoS flow 900 may include a UE transmission flow 902. The UE transmission flow 902 illustrates an example QoS flow of QoS flow packets for transmission from the UE. In the illustrated embodiment, the UE transmission flow 902 may include a first QFI 904 and a second QFI 906. The first QFI 904 and the second QFI 906 may be mapped to corresponding QoS flows. For example, the UE transmission flow 902 may include a QoS flow mapping operation 908 that maps the first QFI 904 and the second QFI 906 to the corresponding QoS flows. The QoS flow mapping operation 908 may be performed above the layers described below.

The QoS flow mapping operation 908 may map the first QFI 904 and the second QFI 906 to corresponding DRBs. The illustrated embodiment includes a first DRB 910 (labelled DRB 1) and a second DRB 912 (labelled DRB 2). In some of the embodiments, one or more of the DRBs may have been setup by an ad-hoc DRB setup. For example, the second DRB 912 may have been setup by an ad-hoc DRB setup (such as the ad-hoc DRB setup 816 (FIG. 8)). The QoS flow mapping operation 908 may map the first QFI 904 to the first DRB 910 and the second QFI 906 to the second DRB 912 in the illustrated embodiment.

The UE transmission flow 902 may include a PDCP layer 914. The PDCP layer 914 may be a top layer of the UE transmission flow 902. The PDCP layer 914 may receive the DRBs from the QoS flow mapping operation 908 and perform one or more operations with the DRBs. For example, the PDCP layer 914 may receive the first DRB 910 and the second DRB 912, and may perform operations with the first DRB 910 and the second DRB 912. The PDCP layer 914 may perform operations such as RoHC and/or security operations. Separate operations may be performed for the first DRB 910 and the second DRB 912, where the operations may be the same or different for the first DRB 910 and the second DRB 912. For example, a first RoHC 916 and a first security operation 918 may be applied to the first DRB 910, and a second RoHC 920 and a second security operation 922 may be applied to the second DRB 912. The PDCP layer 914 may route the DRBs to corresponding RLC channels.

The UE transmission flow 902 may include an RLC layer 924. The RLC layer 924 may be located below the PDCP layer 914. The RLC layer 924 may receive the RLC channels from the PDCP layer 914. The RLC layer 924 may produce RLC PDUs with the RLC channels and segment the SDUs. Further, the RLC layer 924 may further provide automatic repeat request. The operations performed by the RLC layer 924 may be performed in 926 for the first DRB 910 and 928 for the second DRB 912.

The UE transmission flow 902 may include an SDAP layer 930. The SDAP layer 930 may be located below the RLC layer 924. Further, the SDAP layer 930 may be located between the RLC layer 924 and a MAC layer 936. The SDAP layer 930 may receive the RLC PDUs from the RLC layer 924. The SDAP layer 930 may perform QFI labelling and/or QFI inline signalling operations with the QoS flows. For example, the QFI labelling and/or QFI inline signalling operations 932 may be applied to the first QFI 904, and QFI labelling and/or QFI inline signalling operations 934 may be applied to the second QFI 906. Having the QFI labelling and inline signalling operations below the RLC layer may allow proper labelling and DRB configuration information to be applied to the transmissions for changes that may be due to ad-hoc DRB operations. For example, ad-hoc DRB operations may result in the QoS flow mapping operation 908 to be changed, which could result in different QFIs going toward different operations at the receiving side. Having the QFI labelling and inline signalling operations below the RLC layer 924 may assure that the QFI are mapped correctly. The SDAP layer 930 may map the RLC PDUs to LCs.

The UE transmission flow 902 may include a MAC layer 936. The MAC layer 936 may be located below the SDAP layer 930. The MAC layer 936 may receive the LCs from the SDAP layer 930. The MAC layer 936 may perform one or more operations with the LCs. In the illustrated embodiment, the MAC layer 936 may perform a scheduling/priority handling operation 938, an LC multiplexing operation 940, and one or more HARQ operations corresponding to the CCs (a first HARQ operation 942 and a second HARQ operation 944 shown in the illustrated example) with the LCs. The MAC layer 936 may direct the LC to component carriers (CCs) for transmission to a base station.

The QoS flow 900 may further include a base station reception flow 946. The base station reception flow 946 may illustrate QoS flow of QoS flow packets received by a base station from a UE. In the particular embodiment, the base station reception flow 946 illustrates an example QoS flow of QoS flow packets received from the UE transmission flow 902. In particular, the UE transmission flow 902 may provide signals via the CCs on transport channels to the base station reception flow 946.

The base station reception flow 946 may include a MAC layer 948. The MAC layer 948 may be a bottom layer of the base station reception flow 946. The MAC layer 948 may receive the CCs from the UE transmission flow 902 and may perform one or more operations with the CCs. In the illustrated embodiment, the MAC layer 948 may perform one or more HARQ operations corresponding to the CCs (a first HARQ operation 950 and a second HARQ operation 952 shown in the illustrated example) a first HARQ operation 950 and a second HARQ operation 952, and an LC demultiplexing operation 954 with the CCs. The MAC layer 948 may map the CCs to LCs and produce SDAP PDUs.

The base station reception flow 946 may include an SDAP layer 960. The SDAP layer 960 may be located above the MAC layer 948. Further, the SDAP layer 960 may be located below an RLC layer 966. Accordingly, the SDAP layer 960 may be located between the RLC layer 966 and the MAC layer 948. The SDAP layer 960 may receive the LCs from the MAC layer 948. The SDAP layer 960 may map the LCs to the proper DRBs. For example, the SDAP layer 960 may map some of the data to a first DRB 956 (labelled DRB 1) and some of the data to a second DRB 958 (labelled DRB 2) based on information from an SDAP header (such as the SDAP header 700 (FIG. 7)).

The SDAP layer 960 may perform one or more operations on the LCs. For example, the SDAP layer 960 may perform QoS flow mapping and/or inline signalling operations. A first QoS flow mapping operation and/or inline signalling operation 962 and a second QoS flow mapping operation and/or inline signalling operation 964 may map each of the LCs to the proper one of a first QFI 968 or a second QFI 970. Further, the SDAP layer 960 may direct the LCs to the proper DRB. For example, the SDAP layer 960 may direct a portion of the LCs to the first DRB 956 and a portion of the LCs to the second DRB 958 based on an SDAP header (such as the SDAP header 700 (FIG. 7)). The SDAP layer 960 may output the LCs to QoS flows. By having the SDAP layer 960 below the RLC layer 966 and directing the LC to the proper QFI and/or DRB may provide for proper decoding in the instance of ad-hoc radio bearer approaches. Having the SDAP layer 960 above the PDCP layer 972 or the RLC layer 966 may result in improper decoding of the LCs.

The base station reception flow 946 may include an RLC layer 966. The RLC layer 966 may be located above the SDAP layer 960. The RLC layer 966 may receive the QoS flows from the SDAP layer 960 and may perform one or more operations with the QoS flows. In the illustrated embodiment, the RLC layer 966 may reassemble the RLC SDUs in 968 and 970 to produce PDCP PDUs and map the reassembled PDCP PDUs to RLC channels. Further, the RLC layer 966 may perform automatic repeat request operations in 968 and 970.

The base station reception flow 946 may include a PDCP layer 972. The PDCP layer 972 may be located above the RLC layer 966. The PDCP layer 972 may receive the PDCP PDUs from the RLC layer 966. The PDCP layer 972 may perform one or more operations on the PDCP PDUs. For example, the PDCP layer 972 may perform operations, such as security operations and/or RoHC operations, to the PDCP PDUs. The PDCP layer 972 may perform first security operations 974 and first RoHC 976 on the first DRB 956, and may perform second security operations 978 and second RoHC 980 on the second DRB 958. The PDCP layer 972 may route the RLC channels to one or more DRBs. In the illustrated embodiment, the PDCP layer 972 may route the RLC channels to one or more DRBs. In the illustrated embodiment, the PDCP layer 972 may route the RLC channels to the first DRB 956 and the second DRB 958 accordingly.

The base station reception flow 946 may include a QoS flow mapping operation 982. The QoS flow mapping operation 982 may be located above the PDCP layer 972. The QoS flow mapping operation 982 may receive the first DRB from the PDCP layer 972. Further, the QoS flow mapping operation 982 may map the DRBs to QoS flows.

Figure 10:
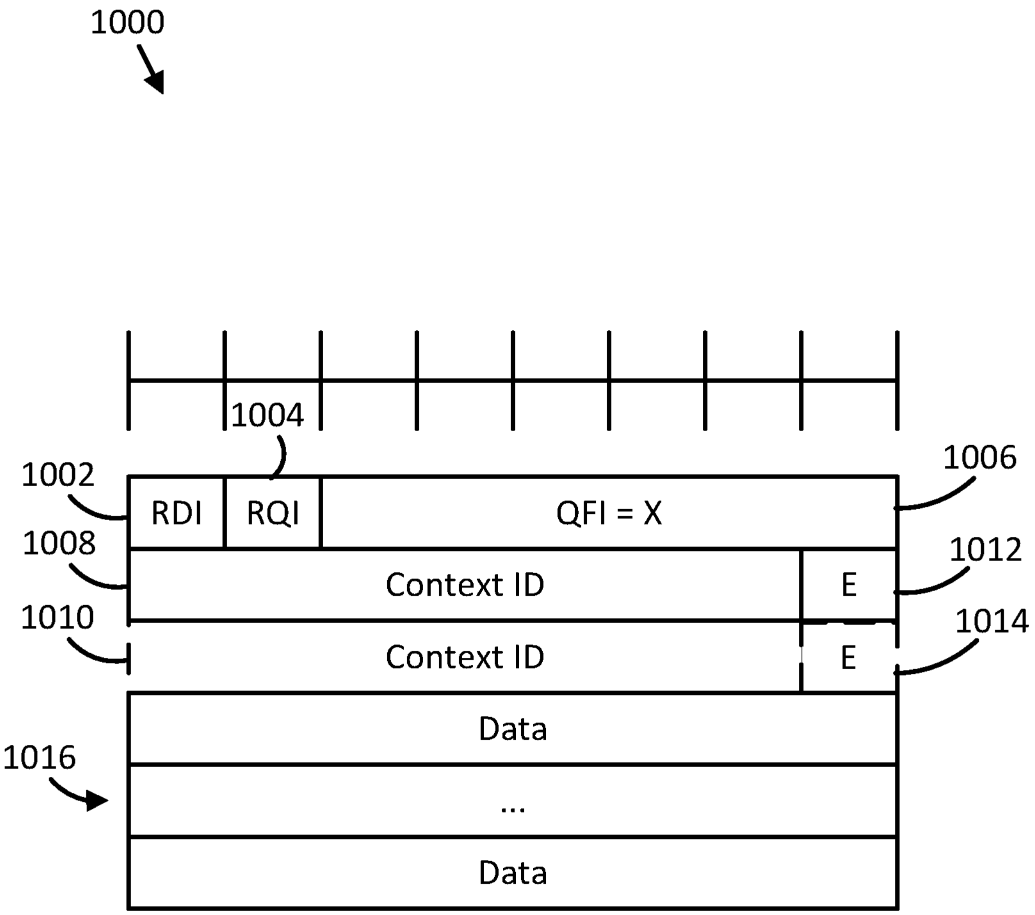
FIG. 10 illustrates an example SDAP header that may be utilized for DRB setup, reconfiguration, and/or release in accordance with some embodiments.
Figure 11:
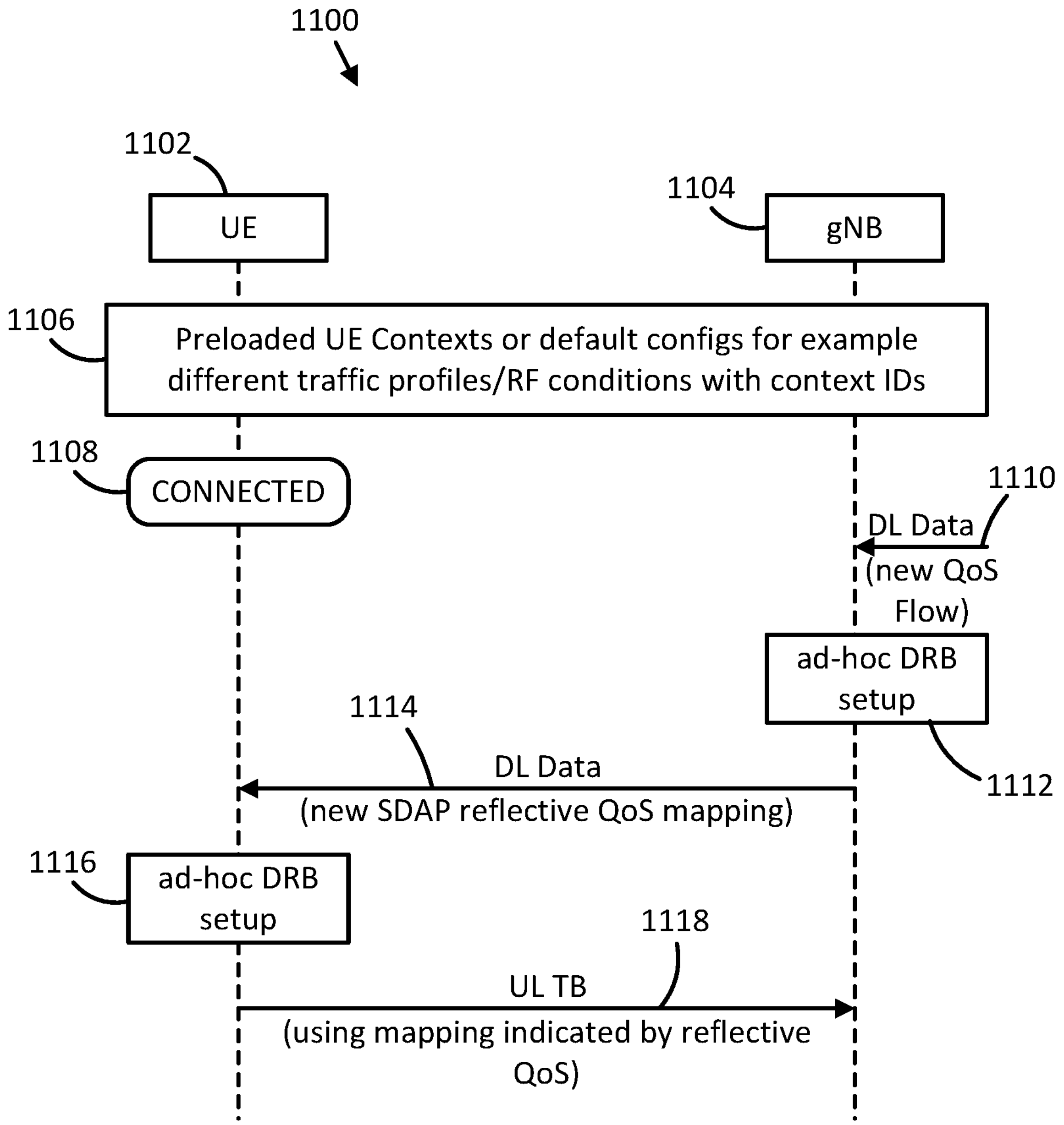
FIG. 11 illustrates an example signal diagram corresponding to the SDAP header of FIG. 10 in accordance with some embodiments.

FIG. 10 and FIG. 11 illustrate a downlink (DL) example in accordance with some embodiments. FIG. 10 illustrates an example SDAP header 1000 that may be utilized for DRB setup, reconfiguration, and/or release in accordance with some embodiments. FIG. 11 illustrates an example signal diagram 1100 corresponding to the SDAP header 1000 of FIG. 10 in accordance with some embodiments. The illustrated example shows an example setup of an ad-hoc DRB in accordance with some embodiments.

The DRB setup example may occur between a UE 1102 and a base station 1104. The UE 1102 may include one or more of the features of the UE 204 (FIG. 2) and/or the UE 2400 (FIG. 24), and the base station 1104 may include one or more of the features of the gNB 2500 (FIG. 25). In the illustrated example, the base station 1104 may originate the DRB setup and the UE 1102 may receive information from the base station 1104 for configuration of the DRB. The UE 1102 and the base station 1104 may have preloaded UE contexts and/or default configurations stored as indicated by 1106. The preloaded UE contexts and/or default configurations may be for different traffic profiles and/or RF conditions. Further, the preloaded UE contexts and/or default configurations may include Context IDs. The UE 1102 may be connected to the base station 1104 as indicated by 1108.

The base station 1104 may receive DL data 1110 to be provided to the UE 1102. The DL data 1110 may have an indication of a QoS flow ID, which is shown as X in the illustrated embodiment. The base station 1104 may determine to setup an ad-hoc DRB to ensure the QoS for the DL data 1110. For example, the base station 1104 (shown as a gNB in the illustrated embodiment) receives a packet with QoS Flow ID X, to ensure the required QoS the base station 1104 may decide to setup a new ad-hoc DRB and indicate that to the UE 1102 via SDAP by adding Context ID information into the extended SDAP header (such as the SDAP header 1000). The base station 1104 may determine a configuration for a DRB to carry the DL data 1110 based on the DL data 1110. For example, the base station 1104 may determine the configuration for the DRB based on the configuration considerations.

To ensure the required QoS, the base station 1104 may decide to setup a new ad-hoc DRB. For example, the base station 1104 may decide to setup a new ad-hoc DRB to meet the configuration determined for the DRB. The base station 1104 may perform an ad-hoc DRB setup 1112 to setup the new ad-hoc DRB. The base station 1104 may map the data belonging to QFI=X already to the new DRB. For example, the base station 1104 may map the DL data 1110 to the DRB setup by the ad-hoc DRB setup 1112.

The base station 1104 may generate the SDAP header 1000 to indicate the DRB setup to the UE 1102. The SDAP header 1000 illustrates an example SDAP header for DRB setup/reconfiguration/release in accordance with some embodiments. The base station 1104 may transmit the SDAP header 1000 to the UE 1102 to indicate the configuration of the new ad-hoc DRB setup by the ad-hoc DRB setup 1112. The base station 1104 may apply the SDAP header 1000 at an SDAP layer (such as the SDAP layer 620 (FIG. 6)). For example, at SDAP layer (below RLC) the base station 1104 may add the SDAP header 1200 indicating the QFI=X and new Context ID(s) to indicate the establishment of ad-hoc bearer(s) of this context(s) before this packet can be decoded properly.

The SDAP header 1000 may include a reflective QoS flow to DRB mapping indication (RDI) field 1002. The RDI field 1002 may indicate whether the UE 1102 is to update QoS flow to DRB mapping for uplink. For example, the RDI field 1002 may be set with a value of 1 to indicate that the UE 1102 is to update the QoS flow to DRB mapping for uplink, and may be set with a value of 0 to indicate that the UE 1102 is not to update the QoS flow to DRB mapping in some embodiments.

The SDAP header 1000 may include a reflective QoS indication (RQI) field 1004. The RQI field 1004 may indicate whether the UE 1102 is to update service data flow to QoS mapping rules for uplink. For example, the RQI field 1004 may be set with a value of 1 to indicate that the UE 1102 is to update the service data flow to QoS mapping rules, and may be set with a value of 0 to indicate that the UE 1102 is not to update the service data flow to QoS mapping rules.

The SDAP header 1000 may include a QFI field 1006. The QFI field 1006 may indicate an RB to which a QFI is to be mapped. In the instances where an ad-hoc DRB is setup and/or configured, a value of the QFI field 1006 may be set to indicate the ad-hoc DRB. The value of QFI field 1006 may be a QoS Flow Indicator. The QFI field 1006 may indicate to a receiving device of the SDAP header 1000 to which RB the data in the transmission is to be directed. As the SDAP header 1000 is for a DRB, the QFI field 1006 may indicate to which DRB the data is to be transmitted. In the illustrated embodiment, the QFI field 1006 may be set to a value of X to indicate that the data is to be directed to a DRB corresponding to the QoS flow indicator of X.

The SDAP header 1000 may include one or more context ID fields. For example, the SDAP header 1000 includes a first context ID field 1008 and a second context ID field 1010 in the illustrated embodiment. The context ID fields may indicate preconfigured DRB settings to be utilized for a DRB to be setup, reconfigured or released. For example, Context ID may indicate ID of the preconfigured DRB settings to be used. UEs and base stations within a network may be preconfigured with DRB settings for different configurations, where a context ID within a context field may indicate one of the preconfigured configurations with preconfigured DRB settings. Each of the context ID fields may correspond to a DRB to be setup, reconfigured or released. For example, the first context ID field 1008 may correspond to a first DRB to be setup, reconfigured or released and the second context ID field 1010 may correspond to a second DRB to be setup, reconfigured or released.

The SDAP header 1000 may include one or more extension flags. For example, the SDAP header 1000 includes a first extension flag 1012 and a second extension flag 1014 in the illustrated embodiment. Each of the extension flags may correspond to a corresponding context ID field. For example, the first extension flag 1012 corresponds to the first context ID field 1008 and the second extension flag 1014 corresponds to the second context ID field 1010 in the illustrated embodiment. The extension flags may indicate whether another context ID field follows the corresponding context ID field. For example, the first extension flag 1012 indicates whether another context ID field follows the corresponding first context ID field 1008 and the second extension flag 1014 indicates whether another context ID field follows the corresponding second context ID field 1010 in the illustrated embodiment. In some embodiments, Extension Flag value of 0 indicates SDAP header ends and/or no context ID fields follow the corresponding context ID field and an Extension Flag value of 1 indicates another Context ID octet is following. In the illustrated embodiment, the second context ID field 1010 and the second extension flag 1014 are indicated in dashed lines to indicate the inclusion of the second context ID field 1010 and the second extension flag 1014 being included in the SDAP header 1000 may depend on a value of the first extension flag 1012.

In the illustrated embodiment, the SDAP header 1000 is illustrated with data 1016. The SDAP header 1000 may be transmitted in a same transmission as the data 1016. For example, the data 1016 may comprise the DL data 1110 and the DL data 1110 may be transmitted in a same transmission as the SDAP header 1000.

The base station 1104 may transmit the SDAP header 1000 with the DL data 1110 in a transmission 1114 to the UE 1102. The DL data 1110 may be arranged and/or encoded in accordance with the configuration corresponding to the value of the one of the context IDs for the DRB indicated in the SDAP header 1000 when transmitted in the transmission 1114. Accordingly, the SDAP header 1000 may indicate the configuration of the DRB transporting the DL data 1110. The indication of the configuration of the DRB may be transported in the same transmission 1114 as the data to which the configuration of the DRB is to apply.

The UE 1102 may receive the transmission 1114 from the base station 1104. The UE 1102 may receive the transmission 1114 on a MAC layer (such as the MAC layer 636 (FIG. 6)), and may demultiplex and map the transmission 1114 according to the RB configuration. The UE 1102 may identify the SDAP header 1200 within the transmission 1114 and determine the layer 2 (L2) configuration for the DRB from the SDAP header 1200. The UE 1102 may establish a corresponding ad-hoc DRB to properly decode the transmission. For example, upon reception and decoding of the SDAP header, the UE 1102 may determine based on context ID which L2 configuration to apply and can establish the corresponding ad-hoc DRB in order to properly decode the packet further. Reflective QoS may still work, the UE can derive the UL filters based on the indicated QFI in the received packet. In the illustrated example, the UE 1102 may determine that the DRB is to be configured with the configuration corresponding to the one of the context IDs indicated in the SDAP header 1000.

The UE 1102 may perform an ad-hoc DRB setup 1116 to configure the UE side with the determined configuration. An SDAP layer (such as the SDAP layer 620 (FIG. 6)) may decode the SDAP header 1000 and perform the ad-hoc DRB setup 1116. The UE 1102 may retrieve the determined configuration from memory to configure the DRB via the ad-hoc DRB setup 1116.

The UE 1102 may utilize the configuration of the DRB to process the DL data 1110 received in the transmission 1114.

For example, the UE 1102 may decode the DL data 1110 in accordance with the configuration of the DRB.

The UE 1102 may utilize the configuration of the DRB for transmissions of one or more TBs. For example, the UE 1102 may encode transmissions to be transported to the base station 1104 in accordance with the configuration. In the illustrated example, the UE 1102 may transmit a UL TB 1118 to the base station 1104. The UE 1102 may utilize the configuration and/or mapping indicated by the reflective QoS for transmission of the UL TB 1118. The UE 1102 may determine the configuration for the ad-hoc DRB and/or the mapping indicated by the reflective QoS from the SDAP header 1000.

The modified SDAP layer may provide one or more benefits. For example, legacy SDAP protocol can be reused and enhanced. SDAP header enhancements can carry delta configuration items for inline configuration (e.g., "enable ciphering", "reordering timer to X ms"). Delta configurations are applicable for the RB/LC that carries them inline (such as presented by FIG. 12) and reconfigure individual parameters, or during ad-hoc bearer setup to change some parameters of the preloaded DRB configuration right from the start (such as presented by FIG. 13). Further, the modified SDAP layer may avoid bloat of MAC layer by avoiding introduction of new functionality and new MAC CEs. QoS Flow IDs and 5G QoS can be reused. Reflective QoS can be reused.

Figure 12:
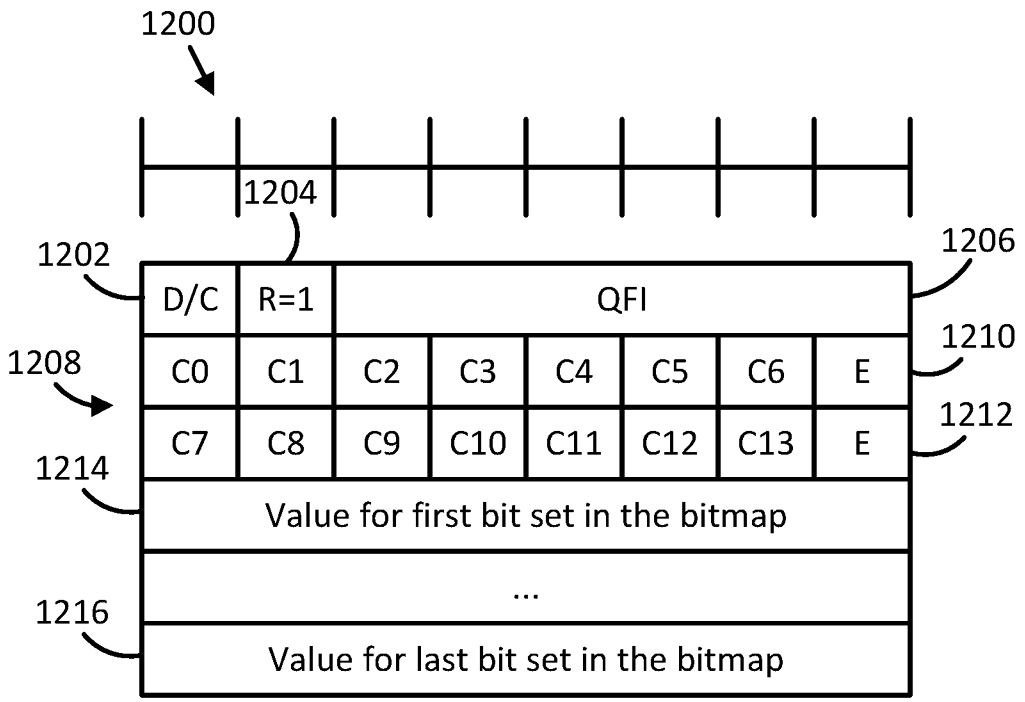
FIG. 12 illustrates an example SDAP header with delta configuration in accordance with some embodiments.

FIG. 12 illustrates an example SDAP header 1200 with delta configuration in accordance with some embodiments. For example, SDAP header 1200 may be with Delta Configuration. The SDAP header 1200 may be applied to data and transmitted in a TB (such as the UL TB 818 (FIG. 8)) and/or a transmission (such as the transmission 1114 (FIG. 11)).

The SDAP header 1200 may include a data/control field 1202. For example, D/C may refer to data/control. The data/control field 1202 may indicate whether the SDAP header 1200 is for data or control transmissions. The data/control field 1202 may indicate whether the SDAP header 1200 is attached to data or control information.

The SDAP header 1200 may further include a reserved field 1204. For example, R may refer to reserved and may be set to 1, thereby indicating delta configuration.

The SDAP header 1200 may include a QFI field 1206. The QFI field 1206 may indicate an RB to which a QFI is to be mapped. In the instances where an ad-hoc DRB is setup and/or configured, a value of the QFI field 1206 may be set to indicate the ad-hoc DRB. The value of QFI field 1206 may be a QoS Flow Indicator. The QFI field 1206 may indicate to a receiving device of the SDAP header 1200 to which RB the data in the transmission is to be directed.

The SDAP header 1200 may include one or more parameter fields 1208. The parameter fields 1208 may form a bitmap in some embodiments. The SDAP header 1200 includes parameter fields 1208 C0 through C13 in the illustrated embodiment. For example, each of the parameter fields 1208 may be associated with a corresponding parameter, where a parameter field can indicate whether the corresponding parameter is to be configured or reconfigured. For example, C0 . . . C6 may comprise a bitmap indicating the presence of certain parameters, e.g., C0 may indicate PDCP T-Reordering, if set to "1" it requires 1 octet for the timer value in milliseconds (ms). C1 may indicate RLC T-Reassembly, if set to "1" it requires 1 octet for the timer value in ms. C2 may indicate RLC acknowledged mode (AM), if set to "1" it requires 1 octet for sequence number (SN) Size.

The SDAP header 1200 may include one or more extension flags. For example, the SDAP header 1200 includes a first extension flag 1210 and a second extension flag 1212 in the illustrated embodiment. Each of the extension flags may correspond to a corresponding set of parameter fields 1208. In some examples, the parameter fields 1208 may be grouped into sets of seven parameter fields, where one set is one row of the bitmap. The first extension flag 1210 corresponds to parameter fields C0 through C6 and the second extension flag 1212 corresponds to parameter fields C7 through C13 in the illustrated embodiment. The extension flags may indicate whether additional parameter fields follow the corresponding set of parameter fields. For example, the first extension flag 1210 indicates whether additional parameter fields follow the corresponding parameters C0 through C6 and the second extension flag 1212 indicates whether additional parameter fields follow the corresponding parameters C7 through C13 in the illustrated embodiment. In some embodiments, Extension Flag value of 0 indicates bitmap ends and/or no additional parameter fields follow the corresponding parameter fields and an Extension Flag value of 1 indicates another bitmap octet is following.

The SDAP header 1200 may further include one or more value fields. For example, the SDAP header 1200 includes a first value field 1214 and a second value field 1216 in the illustrated embodiment. Each of the value fields may be associated with a corresponding parameter field. In some embodiments, each of the value fields included in the SDAP header 1200 may correspond to a parameter field to be configured or reconfigured. The value fields may be arranged in order, such that the first value field in the SDAP header 1200 corresponds to the first parameter field to be configured or reconfigured. For example, the first value field 1214 may correspond to a first parameter field to be configured or reconfigured and the second value field 1216 may correspond to a last parameter field in the illustrated embodiment.

While 14 parameter fields and two extension flags are shown in the illustrated embodiment, it should be understood that more or less parameter fields and extension flags may be included in the SDAP header 1200 in other embodiments. For example, there may be one or more parameter fields and extension flags in other embodiments. The extension flags may indicate whether additional parameters fields and additional extension flags are included within the SDAP header 1200.

Figure 13:
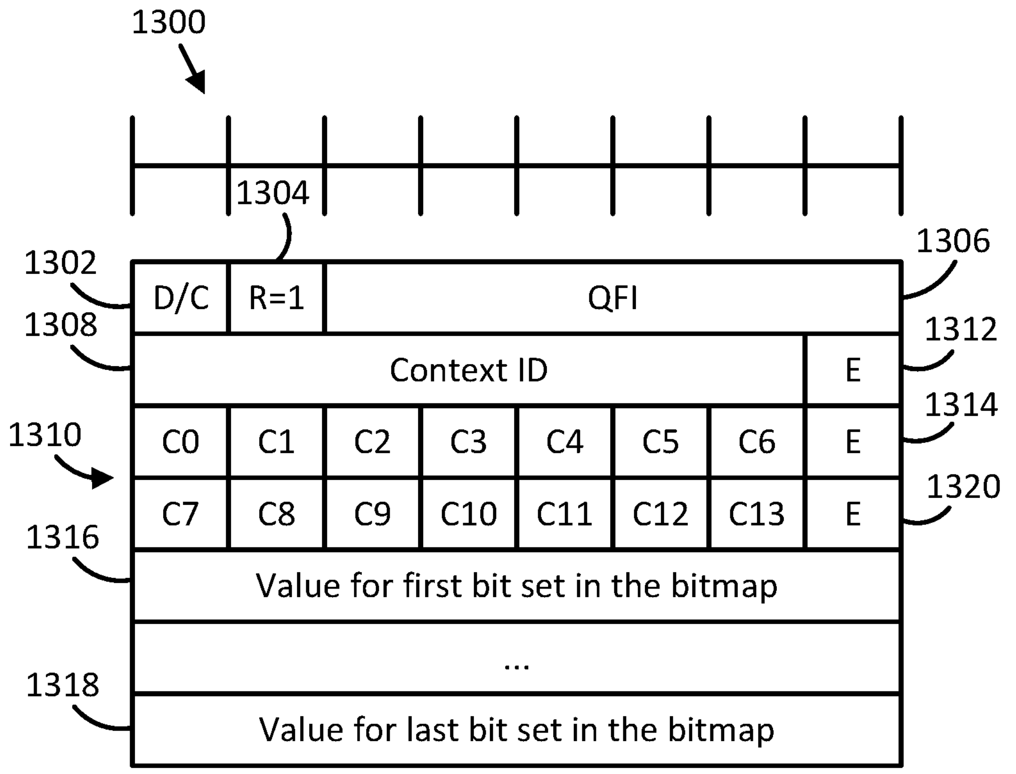
FIG. 13 illustrates an example SDAP header with delta configuration in accordance with some embodiments.

FIG. 13 illustrates an example SDAP header 1300 with delta configuration in accordance with some embodiments. For example, SDAP header 1300 may be with Delta Configuration. The SDAP header 1200 may be applied to data and transmitted in a TB (such as the UL TB 818 (FIG. 8)) and/or a transmission (such as the transmission 1114 (FIG. 11)).

The SDAP header 1300 may include a data/control field 1302. For example, D/C may refer to data/control. The data/control field 1302 may indicate whether the SDAP header 1300 is for data or control transmissions. The data/control field 1302 may indicate whether the SDAP header 1300 is attached to data or control information.

The SDAP header 1300 may further include a reserved field 1304. For example, R may refer to reserved and may be set to 1, thereby indicating delta configuration.

The SDAP header 1300 may include a QFI field 1306. The QFI field 1306 may indicate an RB to which a QFI is to be mapped. In the instances where an ad-hoc DRB is setup and/or configured, a value of the QFI field 1306 may be set to indicate the ad-hoc DRB. The value of QFI field 1306 may be a QoS Flow Indicator. The QFI field 1306 may indicate to a receiving device of the SDAP header 1300 to which RB the data in the transmission is to be directed.

The SDAP header 1300 may include one or more context ID fields. For example, the SDAP header 1300 includes a context ID field 1308 in the illustrated embodiment. The context ID fields may indicate preconfigured DRB settings to be utilized for a DRB to be setup, reconfigured or released. For example, Context ID may indicate ID of the preconfigured DRB settings to be used. UEs and base stations within a network may be preconfigured with DRB settings for different configurations, where a context ID within a context field may indicate one of the preconfigured configurations with preconfigured DRB settings. Each of the context ID fields may correspond to a DRB to be setup, reconfigured or released. For example, the context ID field 1308 may correspond to a first DRB to be setup, reconfigured or released. The configuration corresponding to the context ID field 1308 may be utilized as a base for the setup, reconfiguration or release.

The SDAP header 1300 may include one or more parameter fields 1310. The parameter fields 1310 may form a bitmap in some embodiments. The SDAP header 1300 includes parameter fields 1310 C7 through C13 in the illustrated embodiment. For example, each of the parameter fields 1310 may be associated with a corresponding parameter, where a parameter field can indicate whether the corresponding parameter is to be configured or reconfigured. For example, C0 . . . C13 may comprise a bitmap indicating the presence of certain parameters, e.g., C0 may indicate PDCP T-Reordering, if set to "1" it requires 1 octet for the timer value in milliseconds (ms). C1 may indicate RLC T-Reassembly, if set to "1" it requires 1 octet for the timer value in ms. C2 may indicate RLC acknowledged mode (AM), if set to "1" it requires 1 octet for sequence number (SN) Size.

The parameter fields 1310 may modify the configuration corresponding to the value of the context ID field 1308. For example, the context ID field 1308 may operate as a base for the configuration to be implemented for the ad-hoc DRB. The configuration for the DRB may start with the settings of the configuration corresponding to the value of the context ID. The configuration may be modified based on the parameter fields 1310 that indicate certain settings of the configuration are to be updated. The configuration corresponding to the context ID field 1308 may be modified with the settings corresponding to the parameter fields 1310.

The SDAP header 1300 may include one or more extension flags. For example, the SDAP header 1300 includes a first extension flag 1312, a second extension flag 1314, and a third extension flag 1320 in the illustrated embodiment. Each of the extension flags may correspond to a corresponding context ID field or a set of the parameter fields 1310. In some examples, the parameter fields 1310 may be grouped into sets of seven parameter fields, where one set is one row of the bitmap. The first extension flag 1312 corresponds to the context ID field 1308, the second extension flag 1314 corresponds to parameter fields C0 through C6, and the third extension flag 1320 corresponds to parameter fields C7 through C13 in the illustrated embodiment. The extension flags may indicate whether additional context IDs and/or additional parameter fields follow the corresponding context ID or set of parameter fields. For example, the first extension flag 1312 indicates whether additional context IDs and/or additional parameter fields follow the corresponding context ID field 1308, the second extension flag 1314 indicates whether additional parameter fields and/or value fields follow the corresponding parameters C0 through C6, and the third extension flag 1320 indicates whether additional parameter fields and/or value fields follow the corresponding parameters C7 through C13 in the illustrated embodiment. In some embodiments, Extension Flag value of 0 indicates bitmap ends, no additional parameter fields follow the corresponding parameter fields, and/or value fields follow the corresponding parameter fields and an Extension Flag value of 1 indicates another bitmap octet is following.

The SDAP header 1300 may further include one or more value fields. For example, the SDAP header 1300 includes a first value field 1316 and a second value field 1318 in the illustrated embodiment. Each of the value fields may be associated with a corresponding parameter field. In some embodiments, each of the value fields included in the SDAP header 1300 may correspond to a parameter field to be configured or reconfigured. The value fields may be arranged in order, such that the first value field in the SDAP header 1300 corresponds to the first parameter field to be configured or reconfigured. For example, the first value field 1316 may correspond to a first parameter field to be configured or reconfigured and the second value field 1318 may correspond to a last parameter field in the illustrated embodiment.

While one context ID, 14 parameter fields, and three extension flags are shown in the illustrated embodiment, it should be understood that more or less context IDs, parameter fields, and extension flags may be included in the SDAP header 1300 in other embodiments. For example, there may be one or more context IDs, parameter fields, and extension flags in other embodiments. The extension flags may indicate whether additional parameters fields and additional extension flags are included within the SDAP header 1300.

Approach #2: Ad-Hoc Radio Bearers and Inline Signalling Via New L2 Layer

Approach #2 may introduce a new layer for predefined/preconfigured RB settings and inline configuration purposes similar to approach #1. Instead of enhancing MAC CEs, a new optional self-contained protocol, also known as "Layer 2 Configuration Layer", is defined. Layer 2 configuration layer (L2CL) headers may contain the Context IDs similar to the SDAP headers in approach #1.

Figure 14:
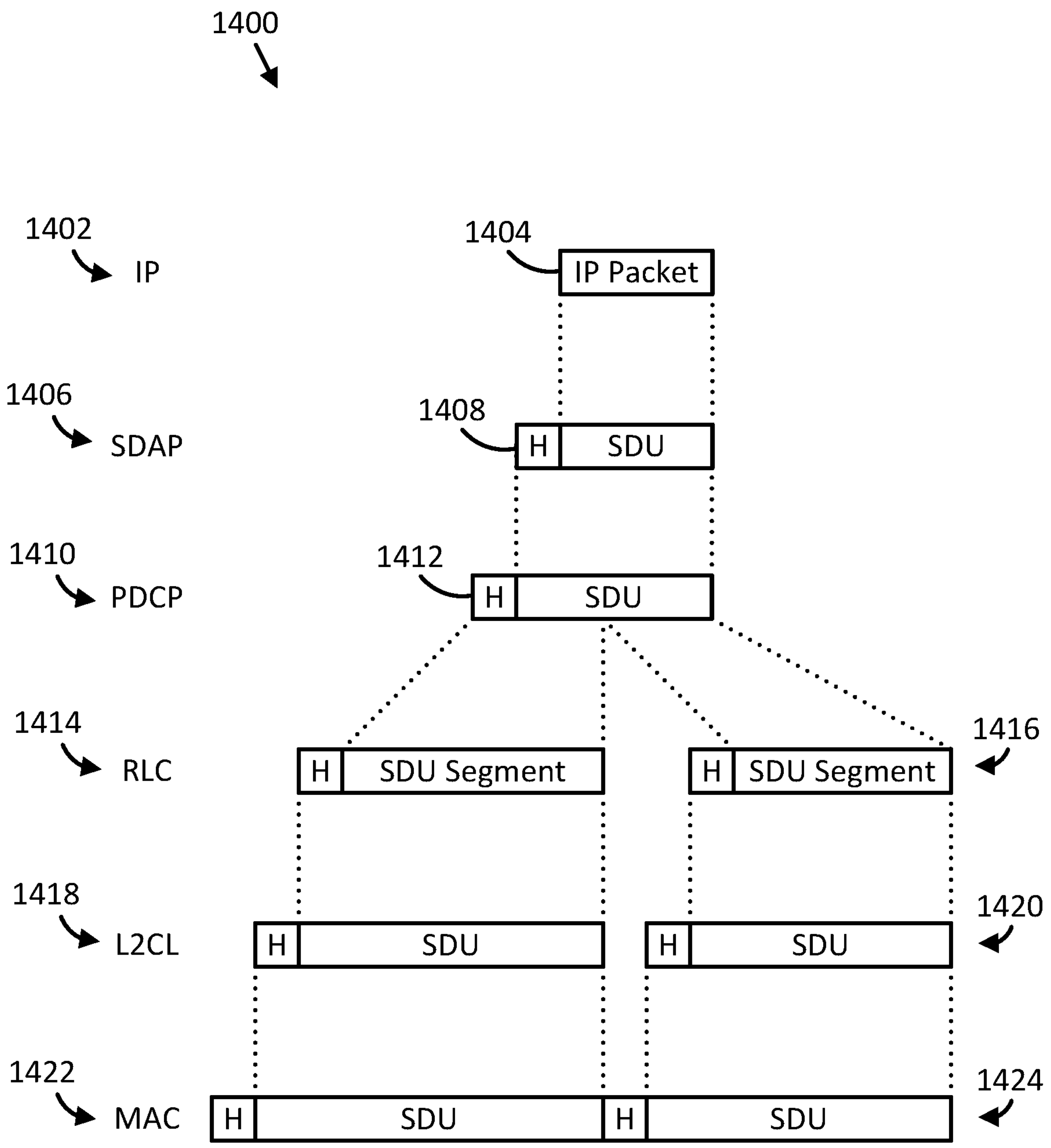
FIG. 14 illustrates an example layer arrangement in accordance with some embodiments.

FIG. 14 illustrates an example layer arrangement 1400 in accordance with some embodiments. For example, the layer arrangement 1400 may illustrate an L2CL with the layer arrangement 1400.

The layer arrangement 1400 may include an IP layer 1402. The IP layer 1402 may produce one or more IP packets 1404 that can be processed by the layers of network.

The layer arrangement 1400 may include an SDAP layer 1406. The SDAP layer 1406 may be located below the IP layer 1402. The SDAP layer 1406 may receive the IP packets 1404 from the IP layer 1402 and produce one or more PDUs 1408. The SDAP layer 1406 may further apply SDAP headers to the SDUs (the headers being indicated by an H block at the beginning of the SDUs), producing SDAP PDUs as a result.

The layer arrangement 1400 may include a PDCP layer 1410. The PDCP layer 1410 may be located below the SDAP layer 1406. The PDCP layer 1410 may receive the SDUs from the SDAP layer 1406 and produce one or more PDUs 1412. The PDCP layer 1410 may further apply PDCP headers to the SDUs (the headers being indicated by an H block at the beginning of the SDUs), producing PDCP PDUs as a result.

The layer arrangement 1400 may include an RLC layer 1414. The RLC layer 1414 may be located below the PDCP layer 1410. The RLC layer 1414 may receive the SDUs from the PDCP layer 1410 and produce one or more SDU segments 1416. The RLC layer 1414 may further apply RLC headers to the SDU segments 1416 (the headers being indicated by an H block at the beginning of the SDU segments 1416), producing RLC PDUs as a result.

The layer arrangement 1400 may include an L2CL 1418. The L2CL 1418 may be located below the RLC layer 1414. Further, the L2CL 1418 may be located above a MAC layer 1422. Accordingly, the L2CL 1418 may be located between the RLC layer 1414 and the MAC layer 1422. The L2CL 1418 may receive the SDU segments 1416 from the RLC layer 1414 and produce one or more PDUs 1420. The L2CL 1418 may further apply L2C headers to the SDUs (the headers being indicated by an H block at the beginning of the SDUs), producing L2CL PDUs as a result. The L2C headers may be any of the L2C headers described throughout this disclosure.

The layer arrangement 1400 may include a MAC layer 1422. The MAC layer 1422 may be located below the L2CL 1418. The MAC layer 1422 may receive the PDUs 1420 from the L2CL 1418 and produce one or more PDUs 1424. The MAC layer 1422 may further apply MAC headers to the SDUs (the headers being indicated by an H block at the beginning of the SDUs), producing MAC PDUs as a result.

The approach #2 is to have the L2CL be in charge of inline signalling per LC. For example, the New Layer is added to be in charge of inline signalling per LC. The L2C header is created after RLC PDU creation and may indicate a new context ID that requires ad-hoc bearer establishment in the receiver (RX) side.

Figure 15:
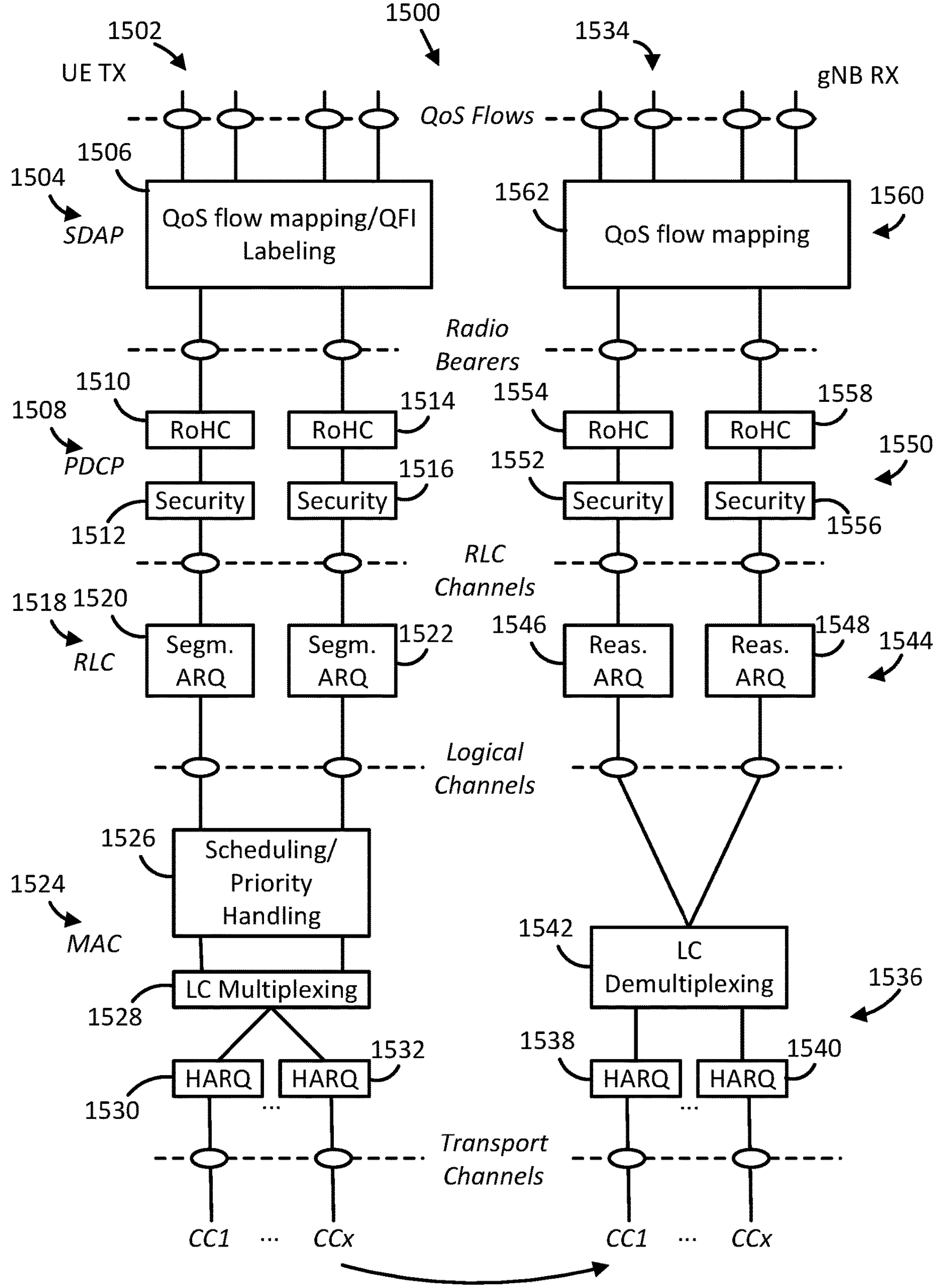
FIG. 15 illustrates an example QoS flow in accordance with some embodiments.

FIG. 15 illustrates an example QoS flow 1500 in accordance with some embodiments. In particular, the QoS flow 1500 illustrates QoS flow for transmissions from a UE (such as the UE 204 (FIG. 2)) to a base station (such as the gNB 2500 (FIG. 25)). As the UE is initiating the process of the transmission, the UE may be the originating device and the base station may be the receiving device in the illustrated example. It should be understood that the base station may be the originating device and the UE may be the receiving device in some other instances, where the base station may perform the operations described in relation to the UE in the illustrated example and the UE may perform the operations described in relation to base station in these other instances.

The QoS flow 1500 may include a UE transmission flow 1502. The UE transmission flow 1502 illustrates an example QoS flow of QoS flow packets for transmission from the UE.

The UE transmission flow 1502 may include an SDAP layer 1504. The SDAP layer 1504 may be a top layer of the UE transmission flow 1502. The SDAP layer 1504 may receive QoS flows. The SDAP layer 1504 may perform QoS flow DRB mapping and QFI labelling with the QoS flows, as indicated by 1506.

The UE transmission flow 1502 may include a PDCP layer 1508. The PDCP layer 1508 may be located below the SDAP layer 1504. The PDCP layer 1508 may receive the RBs from the SDAP layer 1504 and perform one or more operations with the RBs. The PDCP layer 1508 may perform operations such as RoHC and/or security operations. Separate operations may be performed for separate RBs, where the operations may be the same or different for the different RBs. For example, a first RoHC 1510 and a first security operation 1512 may be applied to a first RB, and a second RoHC 1514 and a second security operation 1516 may be applied to a second RB. The PDCP layer 1508 may route the RBs to corresponding RLC channels.

The UE transmission flow 1502 may include an RLC layer 1518. The RLC layer 1518 may be located below the PDCP layer 1508. The RLC layer 1518 may receive the RLC channels from the PDCP layer 1508. The RLC layer 1518 may produce RLC PDUs with the RLC channels and segment the SDUs. Further, the RLC layer 1518 may further provide automatic repeat request. The operations performed by the RLC layer 1518 may be performed in 1520 for the first DRB and 1522 for the second DRB.

The UE transmission flow 1502 may include a MAC layer 1524. The MAC layer 1524 may be located below the RLC layer 1518. The MAC layer 1524 may receive the LCs from the RLC layer 1518. The MAC layer 1524 may perform one or more operations with the LCs. In the illustrated embodiment, the MAC layer 1524 may perform a scheduling/priority handling operation 1526, an LC multiplexing operation 1528, and one or more HARQ operations corresponding to the CCs (a first HARQ operation 1530 and a second HARQ operation 1532 shown in the illustrated example) with the LCs. The MAC layer 1524 may direct the LC to component carriers (CCs) for transmission to a base station.

The QoS flow 1500 may further include a base station reception flow 1534. The base station reception flow 1534 may illustrate QoS flow of QoS flow packets received by a base station from a UE. In the particular embodiment, the base station reception flow 1534 illustrates an example QoS flow of QoS flow packets received from the UE transmission flow 1502. In particular, the UE transmission flow 1502 may provide signals via the CCs on transport channels to the base station reception flow 1534.

The base station reception flow 1534 may include a MAC layer 1536. The MAC layer 1536 may be a bottom layer of the base station reception flow 1534. The MAC layer 1536 may receive the CCs from the UE transmission flow 1502 and may perform one or more operations with the CCs. In the illustrated embodiment, the MAC layer 1536 may perform one or more HARQ operations corresponding to the CCs (a first HARQ operation 1538 and a second HARQ operation 1540 shown in the illustrated example), and an LC demultiplexing operation 1542 with the CCs. The MAC layer 1536 may map the CCs to LCs and produce RLC PDUs.

The base station reception flow 1534 may include an RLC layer 1544. The RLC layer 1544 may be located above the MAC layer 1536. The RLC layer 1544 may receive the LCs from the MAC layer 1536 and may perform one or more operations with the LCs. In the illustrated embodiment, the RLC layer 1544 may reassemble the RLC SDUs in 1546 and 1548 to produce PDCP PDUs and map the reassembled PDCP PDUs to RLC channels. Further, the RLC layer 1544 may perform automatic repeat request operations in 1546 and 1548.

The base station reception flow 1534 may include a PDCP layer 1550. The PDCP layer 1550 may be located above the RLC layer 1544. The PDCP layer 1550 may receive the PDCP PDUs from the RLC layer 1544. The PDCP layer 1550 may perform one or more operations on the PDCP PDUs. For example, the PDCP layer 1550 may perform operations, such as security operations and/or RoHC operations, to the PDCP PDUs. The PDCP layer 1550 may perform first security operations 1552 and first RoHC 1554 on a first DRB, and may perform second security operations 1556 and second RoHC 1558 on second DRB. The PDCP layer 1550 may route the RLC channels to one or more RBs. In the illustrated embodiment, the PDCP layer 1550 may route the RLC channels to one or more RBs.

The base station reception flow 1534 may include an SDAP layer 1560. The SDAP layer 1560 may be located above the PDCP layer 1550. Further, the SDAP layer 1560 may be the top layer of the base station reception flow 1534. The SDAP layer 1560 may receive the RBs from the PDCP layer 1550. The SDAP layer 1560 may perform one or more operations on the RBs. For example, the SDAP layer 1560 may perform a QoS flow mapping operation 1562. The QoS flow mapping operation 1562 may map each of the RBs to the proper QFI.

Figure 16:
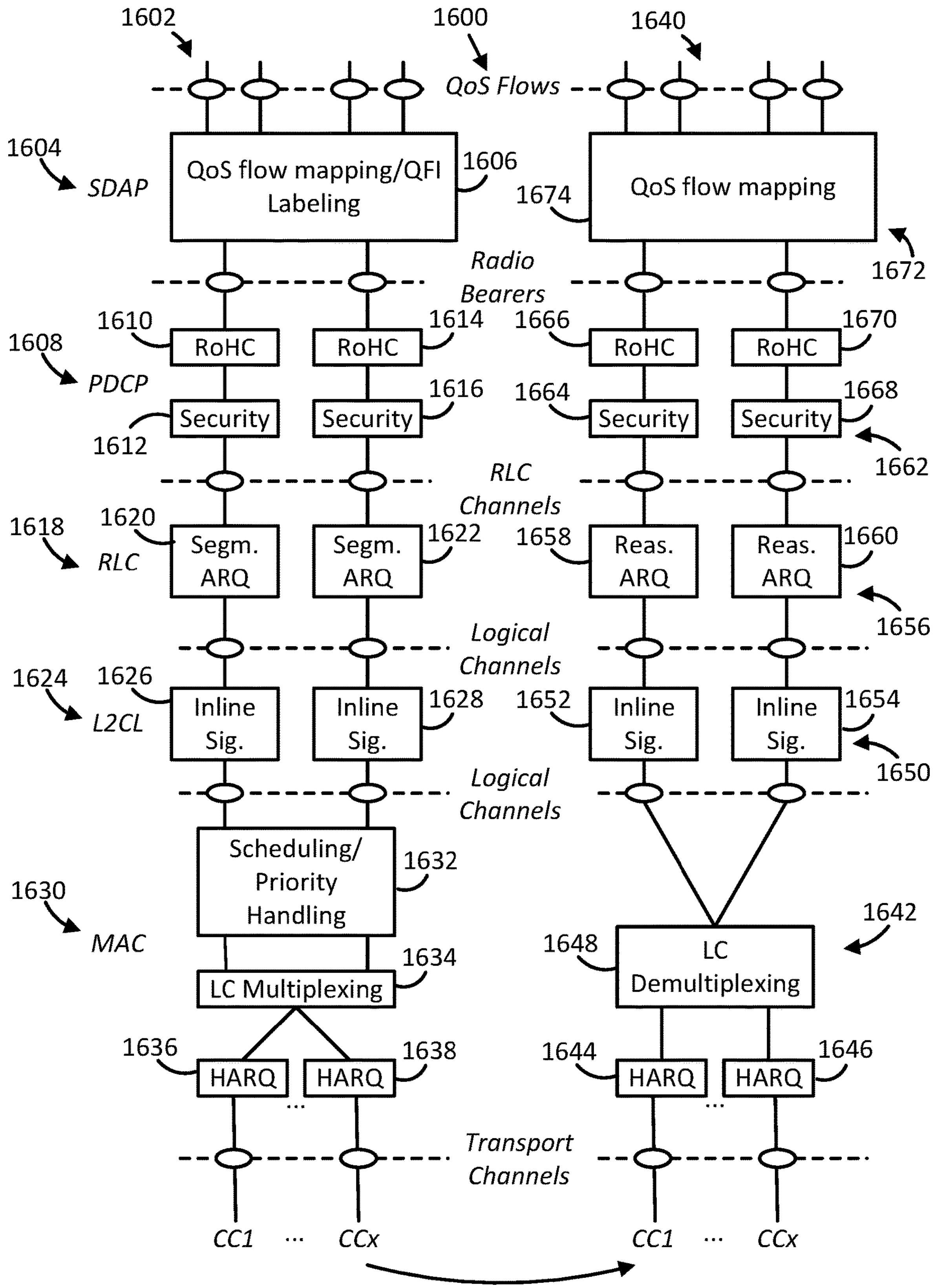
FIG. 16 illustrates an example QoS flow with a layer 2 configuration layer (L2CL) in accordance with some embodiments.

FIG. 16 illustrates an example QoS flow 1600 with an L2CL in accordance with some embodiments. In particular, the QoS flow 1600 illustrates QoS flow for transmissions from a UE (such as the UE 204 (FIG. 2) and/or the UE 2400 (FIG. 24)) to a base station (such as the gNB 2500 (FIG. 25)). The QoS flow 1600 may illustrate the L2CL arrangement in accordance with some embodiments. As the UE is initiating the process of the transmission, the UE may be the originating device and the base station may be the receiving device in the illustrated example. It should be understood that the base station may be the originating device and the UE may be the receiving device in some other instances, where the base station may perform the operations described in relation to the UE in the illustrated example and the UE may perform the operations described in relation to base station in these other instances.

The QoS flow 1600 may include a UE transmission flow 1602. The UE transmission flow 1602 illustrates an example QoS flow of QoS flow packets for transmission from the UE.

The UE transmission flow 1602 may include an SDAP layer 1604. The SDAP layer 1604 may be a top layer of the UE transmission flow 1602. The SDAP layer 1604 may receive QoS flows. The SDAP layer 1604 may perform QoS flow DRB mapping and QFI labelling with the QoS flows, as indicated by 1606.

The UE transmission flow 1602 may include a PDCP layer 1608. The PDCP layer 1608 may be located below the SDAP layer 1604. The PDCP layer 1608 may receive the RBs from the SDAP layer 1604 and perform one or more operations with the RBs. The PDCP layer 1608 may perform operations such as RoHC and/or security operations. Separate operations may be performed for separate RBs, where the operations may be the same or different for the different RBs. For example, a first RoHC 1610 and a first security operation 1612 may be applied to a first RB, and a second RoHC 1614 and a second security operation 1616 may be applied to a second RB. The PDCP layer 1608 may route the RBs to corresponding RLC channels.

The UE transmission flow 1602 may include an RLC layer 1618. The RLC layer 1618 may be located below the PDCP layer 1608. The RLC layer 1618 may receive the RLC channels from the PDCP layer 1608. The RLC layer 1618 may produce RLC PDUs with the RLC channels and segment the SDUs. Further, the RLC layer 1618 may further provide automatic repeat request. The operations performed by the RLC layer 1618 may be performed in 1620 for the first DRB and 1622 for the second DRB. The RLC layer 1618 may map the PDUs to LCs.

The UE transmission flow 1602 may include an L2CL 1624. The L2CL 1624 may be located below the RLC layer 1618. Further, the L2CL 1624 may be located above a MAC layer 1630. Accordingly, the L2CL 1624 may be located between the RLC layer 1618 and the MAC layer 1630. The L2CL 1624 may receive the SDUs from the RLC layer 1618 and may perform operations with the SDUs. For example, the L2CL 1624 may perform inline signalling 1626 with first LCs of the SDUs and inline signalling 1628 with second LCs of the SDUs. The L2CL 1624 may perform inline signalling per LC. For example, the L2CL 1624 may map the SDUs in accordance with a configuration for an ad-hoc radio bearer. The L2CL 1624 may further apply an L2C header to SDUs corresponding to the ad-hoc radio bearer to indicate a configuration for the SDUs. The L2CL 1624 may map the SDUs to logical channels in accordance with the ad-hoc radio bearer. The L2CL 1624 may produce L2CL PDUs.

The UE transmission flow 1602 may include a MAC layer 1630. The MAC layer 1630 may be located below the L2CL 1624. The MAC layer 1630 may receive the LCs from the L2CL 1624. The MAC layer 1630 may perform one or more operations with the LCs. In the illustrated embodiment, the MAC layer 1630 may perform a scheduling/priority handling operation 1632, an LC multiplexing operation 1634, and one or more HARQ operations corresponding to the CCs (a first HARQ operation 1636 and a second HARQ operation 1638 shown in the illustrated example) with the LCs. The MAC layer 1630 may direct the LC to component carriers (CCs) for transmission to a base station.

The QoS flow 1600 may further include a base station reception flow 1640. The base station reception flow 1640 may illustrate QoS flow of QoS flow packets received by a base station from a UE. In the particular embodiment, the base station reception flow 1640 illustrates an example QoS flow of QoS flow packets received from the UE transmission flow 1602. In particular, the UE transmission flow 1602 may provide signals via the CCs on transport channels to the base station reception flow 1640.

The base station reception flow 1640 may include a MAC layer 1642. The MAC layer 1642 may be a bottom layer of the base station reception flow 1640. The MAC layer 1642 may receive the CCs from the UE transmission flow 1602 and may perform one or more operations with the CCs. In the illustrated embodiment, the MAC layer 1642 may perform one or more HARQ operations corresponding to the CCs (a first HARQ operation 1644 and a second HARQ operation 1646 shown in the illustrated example), and an LC demultiplexing operation 1648 with the CCs. The MAC layer 1642 may map the CCs to LCs and produce MAC SDUs.

The base station reception flow 1640 may include an L2CL 1650. The L2CL 1650 may be located above the MAC layer 1642. Further, the L2CL 1650 may be located below an RLC layer 1656. Accordingly, the L2CL 1650 may be located between the MAC layer 1642 and the RLC layer 1656. The L2CL 1650 may receive the MAC SDUs (also known as L2CL PDUs) from the MAC layer 1642 and may perform operations with the SDUs. For example, the L2CL 1650 may perform inline signaling 1652 with first LCs of the SDUs and inline signalling 1654 with second LCs of the SDUs. The L2CL 1650 may perform inline signalling per LC. For example, the L2CL 1650 may identify a layer 2 configuration (L2C) header (such as the L2C header 1700 (FIG. 17), the L2C header 1800 (FIG. 18), and/or the L2C header 1900 (FIG. 19)) within the SDUs and may determine LC mapping for the ad-hoc radio bearer from the L2C header. The L2CL 1650 may map the SDUs in accordance with the LC mapping determined from the L2C header. Accordingly, the L2CL 1650 may map the SDUs to LCs in accordance with determined mapping.

The base station reception flow 1640 may include an RLC layer 1656. The RLC layer 1656 may be located above the L2CL 1650. The RLC layer 1656 may receive the LCs from the L2CL 1650 and may perform one or more operations with the LCs. In the illustrated embodiment, the RLC layer 1656 may reassemble the RLC PDUs in 1658 and 1660 to produce PDCP PDUs and map the reassembled PDCP PDUs to RLC channels. Further, the RLC layer 1656 may perform automatic repeat request operations in 1658 and 1660.

The base station reception flow 1640 may include a PDCP layer 1662. The PDCP layer 1662 may be located above the RLC layer 1656. The PDCP layer 1662 may receive the PDCP PDUs from the RLC layer 1656. The PDCP layer 1662 may perform one or more operations on the PDCP PDUs. For example, the PDCP layer 1662 may perform operations, such as security operations and/or RoHC operations, to the PDCP PDUs. The PDCP layer 1662 may perform first security operations 1664 and first RoHC 1666 on a first DRB, and may perform second security operations 1668 and second RoHC 1670 on second DRB. The PDCP layer 1662 may route the RLC channels to one or more RBs. In the illustrated embodiment, the PDCP layer 1662 may route the RLC channels to one or more RBs.

The base station reception flow 1640 may include an SDAP layer 1672. The SDAP layer 1672 may be located above the PDCP layer 1662. Further, the SDAP layer 1672 may be the top layer of the base station reception flow 1640. The SDAP layer 1672 may receive the RBs from the PDCP layer 1662. The SDAP layer 1672 may perform one or more operations on the RBs. For example, the SDAP layer 1672 may perform a QoS flow mapping operation 1674. The QoS flow mapping operation 1674 may map each of the RBs to the proper QFI.

FIG. 17 illustrates an example L2C header 1700 in accordance with some embodiments. In this example (referred to as Example 1), layer 2 configuration (L2C) header 1700 may carry Context IDs for DRB setup/reconfiguration/release. The L2C header 1700 may be transmitted by an originating device to a receiving device to indicate one or more DRBs to be setup, reconfigured or released. As an example, the L2C header 1700 may be included in a UL TB transmitted between an originating device and a receiving device (such as the UL TB 818 (FIG. 8), and/or the UL TB 1118 (FIG. 11)), where the L2C header 1700 may indicate a configuration of a DRB being utilized to transmit data in the UL TB.

The L2C header 1700 may include a configuration message type field 1702. The configuration message type field 1702 may indicate that a DRB is to be setup, reconfigured, or released. For example, configuration message (Msg) type may indicate DRB setup.

The L2C header 1700 may further include one or more context ID fields. For example, the L2C header 1700 includes a first context ID field 1704 and a second context ID field 1706 in the illustrated embodiment. The context ID fields may indicate preconfigured DRB settings to be utilized for a DRB to be setup, reconfigured or released. For example, context ID may indicate ID of the preconfigured DRB settings to be used. UEs and base stations within a network may be preconfigured with DRB settings for different configurations, where a context ID within a context field may indicate one of the preconfigured configurations with preconfigured DRB settings. Each of the context ID fields may correspond to a DRB to be setup, reconfigured or released. For example, the first context ID field 1704 may correspond to a first DRB to be setup, reconfigured or released and the second context ID field 1706 may correspond to a second DRB to be setup, reconfigured or released.

The L2C header 1700 may further include one or more extension flags. For example, the L2C header 1700 includes a first extension flag 1708 and a second extension flag 1710 in the illustrated embodiment. Each of the extension flags may correspond to a corresponding context ID field. For example, the first extension flag 1708 corresponds to the first context ID field 1704 and the second extension flag 1710 corresponds to the second context ID field 1706 in the illustrated embodiment. The extension flags may indicate whether another context ID field follows the corresponding context ID field. For example, the first extension flag 1708 indicates whether another context ID field follows the corresponding first context ID field 1704 and the second extension flag 1710 indicates whether another context ID field follows the corresponding second context ID field 1706 in the illustrated embodiment. In some embodiments, Extension Flag value of 0 indicates L2C header (for example, L2C header 1700) ends and/or no context ID fields follow the corresponding context ID field and an extension flag value of 1 indicates another context ID octet is following. In the illustrated embodiment, the second context ID field 1706 and the second extension flag 1710 are indicated in dashed lines to indicate the inclusion of the second context ID field 1706 and the second extension flag 1710 being included in the L2C header 1700 may depend on a value of the first extension flag 1708.

While two context ID fields and two extension flags are shown in the illustrated embodiment, it should be understood that more or less context ID fields and extension flags may be included in the L2C header 1700 in other embodiments. For example, there may be one or more context ID fields and extension flags in other embodiments. The extension flags may indicate whether additional context ID fields and additional extension flags are included within the L2C header 1700.

Figure 18:
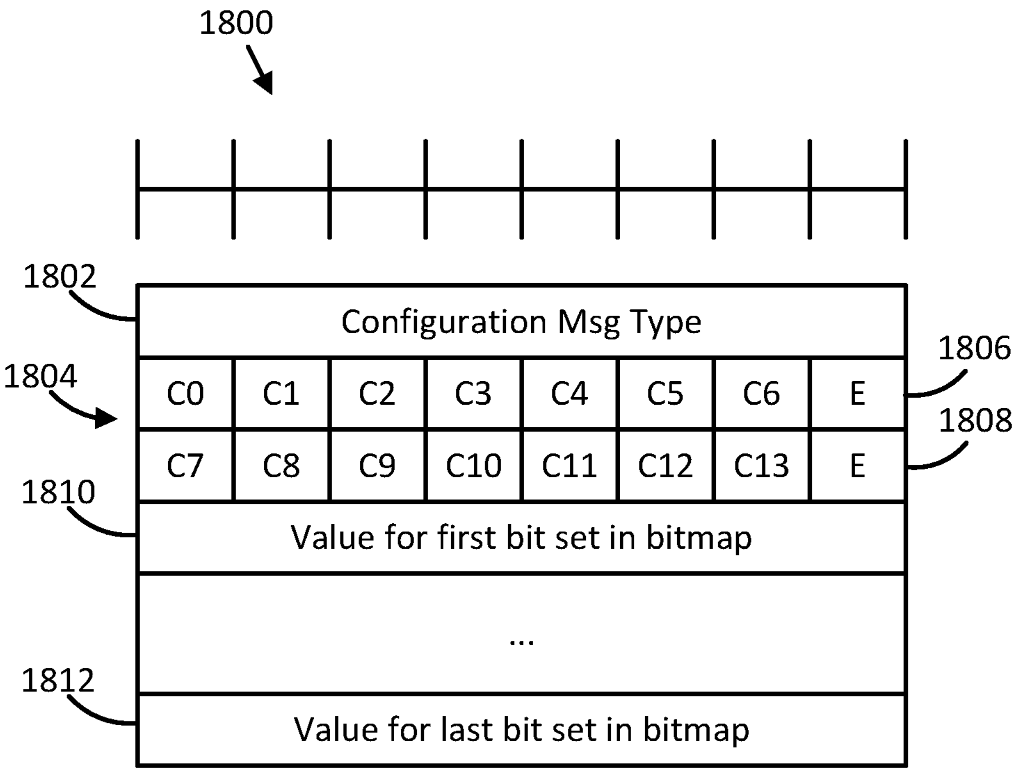
FIG. 18 illustrates another example L2C header in accordance with some embodiments.

FIG. 18 illustrates another example L2C header 1800 in accordance with some embodiments. In particular, FIG. 18 illustrates an example L2C header 1800 (which may be referred to as example 2) carrying small delta (re-)configurations. The L2C header 1800 may be valid for LC that carries them inline. The L2C header 1800 for small delta configurations and/or reconfigurations may allow particular parameters of a DRB to be configured or reconfigured without having to define a complete configuration for the DRB. As an example, the L2C header 1800 may be included in the UL TB transmitted between an originating device and a receiving device (such as the UL TB 818 (FIG. 8), and/or the UL TB 1118 (FIG. 11)), where the L2C header 1800 may indicate small delta configurations or reconfigurations of a DRB being utilized to transmit data in the UL TB.

The L2C header 1800 may include a configuration message type field 1802. The configuration message type field 1802 may indicate that a DRB is to have parameters configured or refigured. For example, configuration Msg type may indicate parameter reconfiguration.

The L2C header 1800 may include one or more parameter fields 1804. The parameter fields 1804 may form a bitmap in some embodiments. The L2C header 1800 includes parameter fields 1804 C0 through C13 in the illustrated embodiment. For example, each of the parameter fields 1804 may be associated with a corresponding parameter, where a parameter field can indicate whether the corresponding parameter is to be configured or reconfigured. For example, C0 . . . C6 may comprise a bitmap indicating the presence of certain parameters, e.g., C0 may indicate packet data convergence protocol (PDCP) T-Reordering, if set to "1" it requires 1 octet for the timer value in milliseconds (ms). C1 may indicate radio link control (RLC) T-Reassembly, if set to "1" it requires 1 octet for the timer value in ms. C2 may indicate RLC acknowledged mode (AM), if set to "1" it requires 1 octet for sequence number (SN) Size.

The L2C header 1800 may include one or more extension flags. For example, the L2C header 1800 includes a first extension flag 1806 and a second extension flag 1808 in the illustrated embodiment. Each of the extension flags may correspond to a corresponding set of parameter fields 1804. In some examples, the parameter fields may be grouped into sets of seven parameter fields, where one set is one row of the bitmap. The first extension flag 1806 corresponds to parameter fields C0 through C6 and the second extension flag 1808 corresponds to parameter fields C7 through C13. The extension flags may indicate whether additional parameter fields follow the corresponding set of parameter fields. For example, the first extension flag 1806 indicates whether additional parameter fields follow the corresponding parameters C0 through C6 and the second extension flag 1808 indicates whether additional parameter fields follow the corresponding parameters C7 through C13 in the illustrated embodiment. In some embodiments, extension flag value of 0 indicates bitmap ends and/or no additional parameter fields follow the corresponding parameter fields and an extension flag value of 1 indicates another bitmap octet is following.

The L2C header 1800 may further include one or more value fields. For example, the L2C header 1800 includes a first value field 1810 and a second value field 1812 in the illustrated embodiment. Each of the value fields may be associated with a corresponding parameter field. In some embodiments, each of the value fields included in the L2C header 1800 may correspond to a parameter field to be configured or reconfigured. The value fields may be arranged in order, such that the first value field in the L2C header 1800 corresponds to the first parameter field to be configured or reconfigured. For example, the first value field 1810 may correspond to a first parameter field to be configured or reconfigured and the second value field 1812 may correspond to a last parameter field in the illustrated embodiment.

While 14 parameter fields and two extension flags are shown in the illustrated embodiment, it should be understood that more or less parameter fields and extension flags may be included in the L2C header 1800 in other embodiments. For example, there may be one or more parameter fields and extension flags in other embodiments. The extension flags may indicate whether additional parameters fields and additional extension flags are included within the L2C header 1800.

Figure 19:
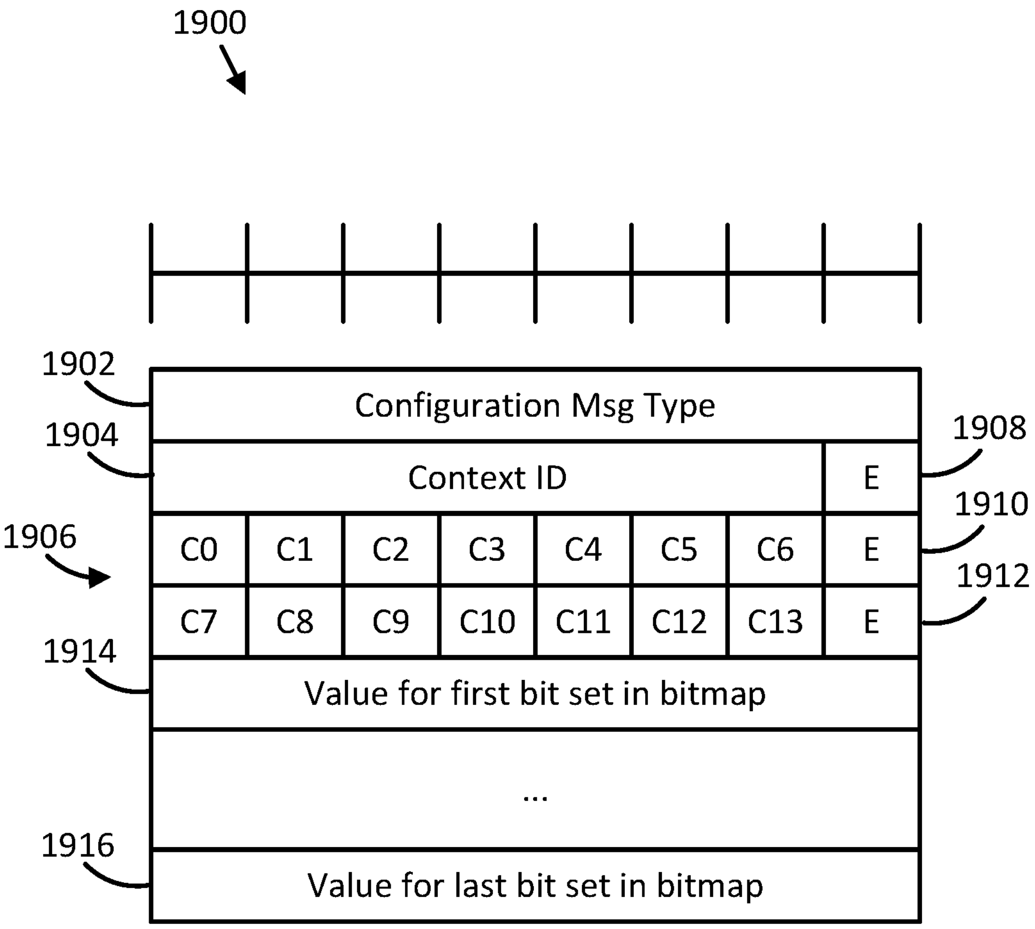
FIG. 19 illustrates an example L2C header with context identifiers (IDs) and delta configuration in accordance with some embodiments.

FIG. 19 illustrates an example L2C header 1900 with context IDs and delta configuration in accordance with some embodiments. For example, the example (which may be referred to as example 3) may be a L2C header 1900 may be carrying context IDs for DRB setup and delta (re-)configuration. The L2C header 1900 may have ad-hoc bearer setup while changing some parameters of the preloaded DRB configuration right from the start. The L2C header 1900 may be applied to data and transmitted in a TB (such as the UL TB 818 (FIG. 8)) and/or a transmission (such as the transmission 1114 (FIG. 11)).

The L2C header 1900 may include a configuration message type field 1902. The configuration message type field 1902 may indicate that a DRB setup and parameter reconfiguration is to be performed.

The L2C header 1900 may include one or more context ID fields. For example, the L2C header 1900 includes a context ID field 1904 in the illustrated embodiment. The context ID fields may indicate preconfigured DRB settings to be utilized for a DRB to be setup, reconfigured or released. For example, context ID may indicate ID of the preconfigured DRB settings to be used. UEs and base stations within a network may be preconfigured with DRB settings for different configurations, where a context ID within a context field may indicate one of the preconfigured configurations with preconfigured DRB settings. Each of the context ID fields may correspond to a DRB to be setup, reconfigured or released. For example, the context ID field 1904 may correspond to a DRB to be setup, reconfigured or released. The configuration corresponding to the context ID field 1904 may be utilized as a base for the setup, reconfiguration or release.

The L2C header 1900 may include one or more parameter fields 1906. The parameter fields 1906 may form a bitmap in some embodiments. The L2C header 1900 includes parameter fields 1906 C0 through C13 in the illustrated embodiment. For example, each of the parameter fields 1906 may be associated with a corresponding parameter, where a parameter field can indicate whether the corresponding parameter is to be configured or reconfigured. For example, C0 . . . C13 may comprise a bitmap indicating the presence of certain parameters, e.g., C0 may indicate PDCP T-Reordering, if set to "1" it requires 1 octet for the timer value in milliseconds (ms). C1 may indicate RLC T-Reassembly, if set to "1" it requires 1 octet for the timer value in ms. C2 may indicate RLC acknowledged mode (AM), if set to "1" it requires 1 octet for sequence number (SN) Size.

The parameter fields 1906 may modify the configuration corresponding to the value of the context ID field 1904. For example, the context ID field 1904 may operate as a base for the configuration to be implemented for the ad-hoc DRB. The configuration for the DRB may start with the settings of the configuration corresponding to the value of the context ID. The configuration may be modified based on the parameter fields 1906 that indicate certain settings of the configuration are to be updated. The configuration corresponding to the context ID field 1904 may be modified with the settings corresponding to the parameter fields 1906.

The L2C header 1900 may include one or more extension flags. For example, the L2C header 1900 includes a first extension flag 1908, a second extension flag 1910, and a third extension flag 1912 in the illustrated embodiment. Each of the extension flags may correspond to a corresponding context ID or a set of parameter fields 11906. In some examples, the parameter fields 1906 may be grouped into sets of seven parameter fields, where one set is one row of the bitmap. The first extension flag 1908 corresponds to the context ID field 1904, the second extension flag 1910 corresponds to parameter fields C0 through C6, and the third extension flag 1912 corresponds to parameter fields C7 through C13 in the illustrated embodiment. The extension flags may indicate whether additional context IDs and/or additional parameter fields follow the corresponding context ID or set of parameter fields. For example, the first extension flag 1908 indicates whether additional context IDs and/or additional parameter fields follow the context ID field 1904, the second extension flag 1910 indicates whether additional parameter fields and/or value fields follow the corresponding parameters C0 through C6, and the third extension flag 1912 indicates whether additional parameter fields and/or value fields follow the corresponding parameters C7 through C13 in the illustrated embodiment. In some embodiments, extension flag value of 0 indicates bitmap ends, no additional context IDs and/or no additional parameter fields follow the corresponding context ID and/or the corresponding parameter fields and an extension flag value of 1 indicates another context ID and/or another bitmap octet is following.

The L2C header 1900 may further include one or more value fields. For example, the L2C header 1900 includes a first value field 1914 and a second value field 1916 in the illustrated embodiment. Each of the value fields may be associated with a corresponding parameter field. In some embodiments, each of the value fields included in the L2C header 1900 may correspond to a parameter field to be configured or reconfigured. The value fields may be arranged in order, such that the first value field in the L2C header 1900 corresponds to the first parameter field to be configured or reconfigured. For example, the first value field 1914 may correspond to a first parameter field to be configured or reconfigured and the second value field 1916 may correspond to a last parameter field in the illustrated embodiment.

While one context ID, 14 parameter fields, and two extension flags are shown in the illustrated embodiment, it should be understood that more or less context IDs, parameter fields, and extension flags may be included in the L2C header 1900 in other embodiments. For example, there may be one or more context IDs, parameter fields, and extension flags in other embodiments. The extension flags may indicate whether additional context IDs, additional parameters fields, and additional extension flags are included within the L2C header 1900.

The L2CL and L2C header approaches may have one or more benefits. The benefits may include decoupling the MAC/RLC/PDCP functionality from predefined/preconfigured RB settings and inline configuration. Further, the benefits may include increasing the modularity, as it is a self-contained protocol aka. "Layer2 Configuration Layer". It can be an optional layer configured by the network (NW) only if UEs support it as per their UE capability and if supported by the NW.

Figure 20:
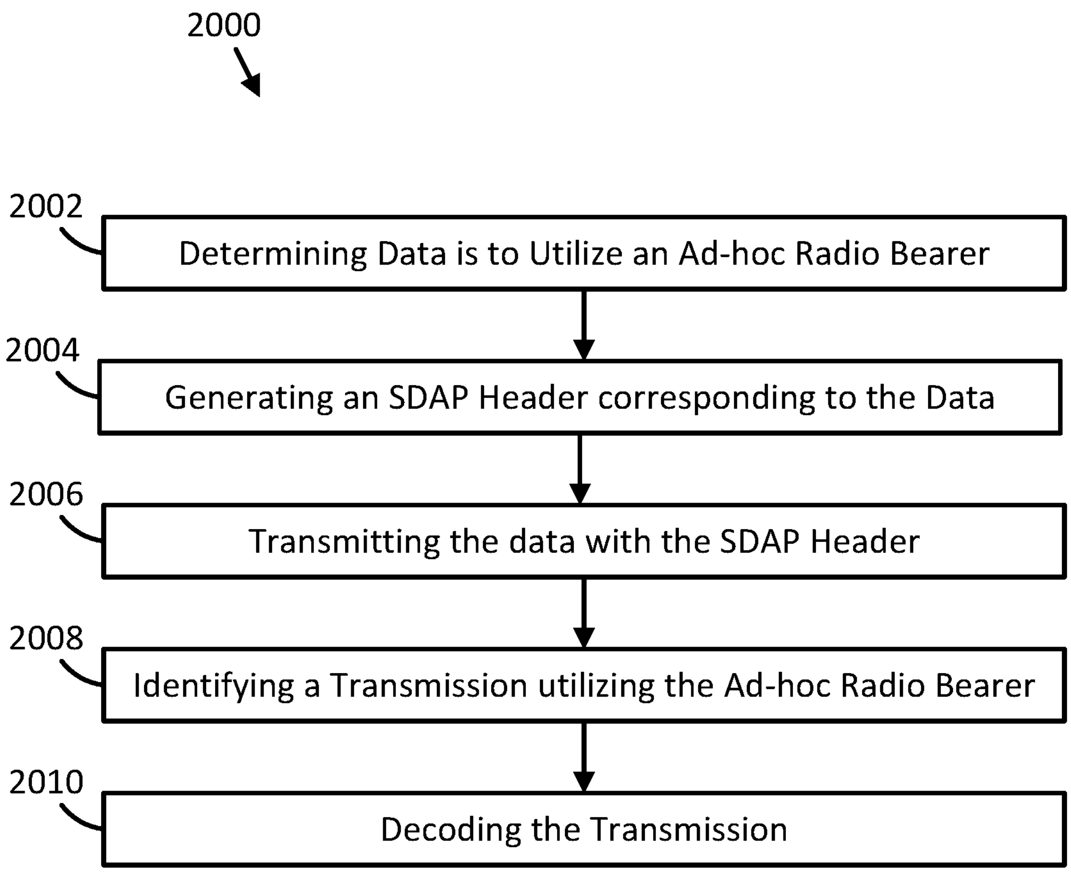
FIG. 20 illustrates an example procedure for an SDAP radio bearer configuration in accordance with some embodiments.

FIG. 20 illustrates an example procedure 2000 for an SDAP radio bearer configuration in accordance with some embodiments. In particular, the procedure 2000 may be performed by an originating device to indicate a configuration of an ad-hoc radio to a receiving device. In some instances, the originating device may be a UE (such as the UE 204 (FIG. 2) and/or the UE 2400 (FIG. 24) and the receiving device may be a base station (such as the gNB 2500 (FIG. 25)). In other instances, the originating device may be a base station and the receiving device may be a UE.

The procedure 2000 may include determining data is to utilize an ad-hoc radio bearer in 2002. In particular, the originating device may determine data to be transmitted to the receiving device is to utilize an ad-hoc radio bearer.

The procedure 2000 may include generating an SDAP header corresponding to the data in 2004. In particular, the originating device may generate an SDAP header corresponding to the data. The SDAP header may include a QFI and the QFI corresponding to the ad-hoc radio bearer. In some embodiments, generating the SDAP header may include performing QFI labelling and inline signalling in an SDAP layer of the originating device. The SDAP layer may be located between a MAC layer and a RLC layer of the originating device.

In some embodiments, the SDAP header may include a context ID to indicate preconfigured DRB settings to be used for the ad-hoc radio bearer. In some instances, the preconfigured DRB settings may be first preconfigured DRB settings. The SDAP header may further include an extension flag to indicate whether the SDAP header includes an additional context ID to indicate second preconfigured DRB settings for configuration of an additional ad-hoc radio bearer.

In some embodiments, the SDAP header may include a bitmap to indicate one or more parameters of the ad-hoc radio bearer are to be changed and/or one or more values corresponding to the one or more parameters to be changed. In some of these embodiments, the parameters may include PDCP T-reordering, RLC T-reassembly, or RLC AM. In some of these embodiments, the bitmap may include one or more bitmap octets, and the bitmap may include a first bitmap octet. The bitmap may further include an extension flag to indicate whether a second bitmap octet follows the first bitmap octet within the bitmap. In some of these embodiments, the SDAP header may further include a context ID to indicate preconfigured DRB settings to be utilized as a base for the ad-hoc radio bearer.

The procedure 2000 may include transmitting the data with the SDAP header in 2006. For example, the originating device may transmit the data with the SDAP header to the receiving device to indicate a configuration of the ad-hoc radio bearer. In some embodiments, the data and the SDAP header may be transmitted to the receiving device in a transport block. The data may be encoded with settings of the ad-hoc radio bearer in some embodiments. In some embodiments, the data may be transmitted on the ad-hoc radio bearer being indicated to be setup or reconfigured.

The procedure 2000 may include identifying a transmission utilizing the ad-hoc radio bearer in 2008. For example, the originating device may identify a transmission for the receiving device utilizing the ad-hoc radio bearer based on the transmission of the data with the SDAP header. In some embodiments, 2008 may be omitted.

The procedure 2000 may include decoding the transmission in 2010. For example, the originating may decode the transmission identified in 2008 in accordance with the configuration of the ad-hoc radio bearer.

While the procedure 2000 is illustrated in a certain order, it should be understood that one or more of the elements may be performed in a different order and/or one or more of the elements may be performed concurrently. Further, it should be understood that one or more of the elements may be omitted and/or the procedure 2000 may be performed as part of a larger procedure.

Figure 21:
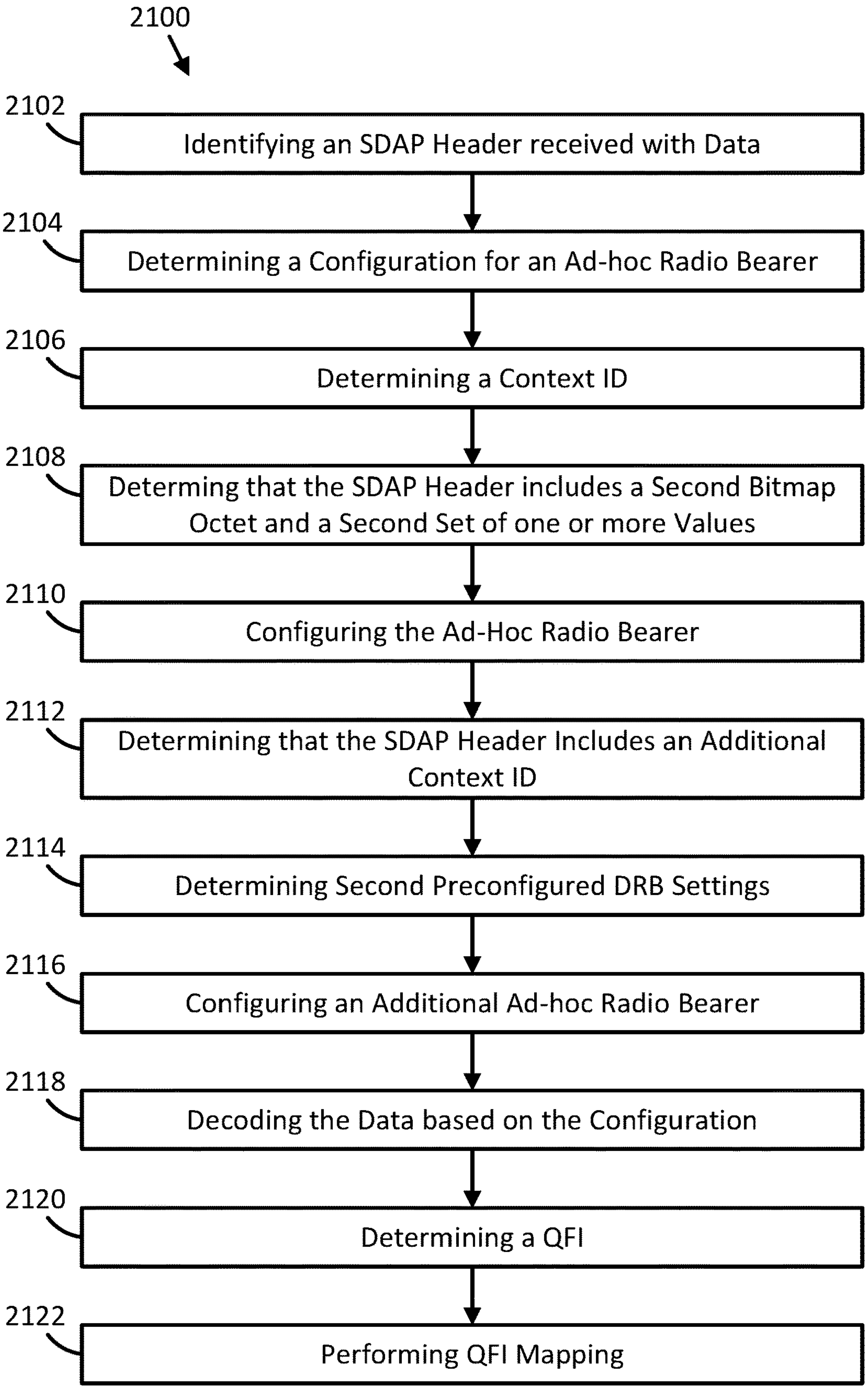
FIG. 21 illustrates an example procedure for an SDAP radio bearer configuration in accordance with some embodiments.

FIG. 21 illustrates an example procedure 2100 for an SDAP radio bearer configuration in accordance with some embodiments. In particular, the procedure 2100 may be performed by a receiving device to configure an ad-hoc radio bearer. In some instances, the originating device may be a UE (such as the UE 204 (FIG. 2) and/or the UE 2400 (FIG. 24)) and the receiving device may be a base station (such as the gNB 2500 (FIG. 25)). In other instances, the originating device may be a base station and the receiving device may be a UE.

The procedure 2100 may include identifying an SDAP header received with data in 2102. For example, receiving device may identify an SDAP header received with data from the originating device. In some embodiments, the SDAP header and the data are received in a transport block.

In some embodiments, the SDAP header may include a bitmap to indicate one or more parameters for the ad-hoc radio bearer and one or more values corresponding to the one or more parameters. The one or more parameters include PDCP T-reordering, RLC T-reassembly, or RLC AM. In some of these embodiments, the bitmap may include one or more bitmap octets, where the bitmap includes a first bitmap octet. The one or more parameters may be a first set of one or more parameters, and the one or more values may be a first set of one or more values. In some of these embodiments, the SDAP header may include a context ID to indicate preconfigured DRB settings to be utilized as a base for the ad-hoc radio bearer.

The procedure 2100 may include determining a configuration for an ad-hoc radio bearer in 2104. For example, the receiving device may determine a configuration for an ad-hoc radio bearer based on the SDAP header.

The procedure 2100 may include determining a context ID in 2106. For example, the receiving device may determine a context ID from the SDAP header. In some embodiments, determining the configuration may include determining preconfigured DRB settings for configuration of the ad-hoc radio bearer based on the context ID. In some embodiments, the preconfigured DRB settings may be first preconfigured DRB settings. In some embodiments, 2106 may be omitted.

The procedure 2100 may include determining that the SDAP header includes a second bitmap octet and a second set of one or more values in 2108. For example, the receiving device may include determining, based on an extension flag in the SDAP header, that the SDAP header includes a second bitmap octet and a second set of one or more values corresponding to a second set of one or more parameters corresponding to the second bitmap octet. In some embodiments, 2108 may be omitted.

The procedure 2100 may include configuring the ad-hoc radio bearer in 2110. For example, the receiving device may configure the ad-hoc radio bearer in accordance with the configuration determined in 2104. In some embodiments, configuring the ad-hoc radio bearer may include determining preconfigured DRB settings for configuration of the ad-hoc radio bearer based on the context ID determined in 2106. In some embodiments, configuring the ad-hoc radio bearer includes reconfiguring the one or more parameters from the SDAP header for the ad-hoc radio bearer with the one or more values from the SDAP header. In some embodiments, configuring the ad-hoc radio bearer may further include reconfiguring the second set of one or more parameters for the ad-hoc radio bearer with the second set of one or more values.

The procedure 2100 may include determining that the SDAP header includes an additional context ID in 2112. For example, the receiving device may determine that the SDAP header includes an additional context ID for configuration of an additional ad-hoc radio bearer based on an extension flag included in the SDAP header. In some embodiments, 2112 may be omitted.

The procedure 2100 may include determining second preconfigured DRB settings in 2114. For example, the receiving device may determine second preconfigured DRB settings for configuration of the additional ad-hoc radio bearer based on the additional context ID. In some embodiments, 2114 may be omitted.

The procedure 2100 may include configuring the additional ad-hoc radio bearer in 2116. For example, the receiving device may configure the additional ad-hoc radio bearer in accordance with the second preconfigured DRB settings. In some embodiments, 2116 may be omitted.

The procedure 2100 may include decoding the data based on the configuration in 2118. For example, the receiving device may decode the data based on the configuration for the ad-hoc radio bearer. In some embodiments, 2118 may be omitted.

The procedure 2100 may include determining a QFI in 2120. For example, the receiving device may determine a QFI from the SDAP header identified in 2102. In some embodiments, 2120 may be omitted.

The procedure 2100 may include performing QFI mapping in 2122. For example, the receiving device may perform QFI mapping based on the QFI determined in 2120 and inline signalling in an SDAP layer located between a MAC layer and an RLC layer. In some embodiments, 2122 may be omitted.

While the procedure 2100 is illustrated in a certain order, it should be understood that one or more of the elements may be performed in a different order and/or one or more of the elements may be performed concurrently. Further, it should be understood that one or more of the elements may be omitted and/or the procedure 2100 may be performed as part of a larger procedure.

Figure 22:
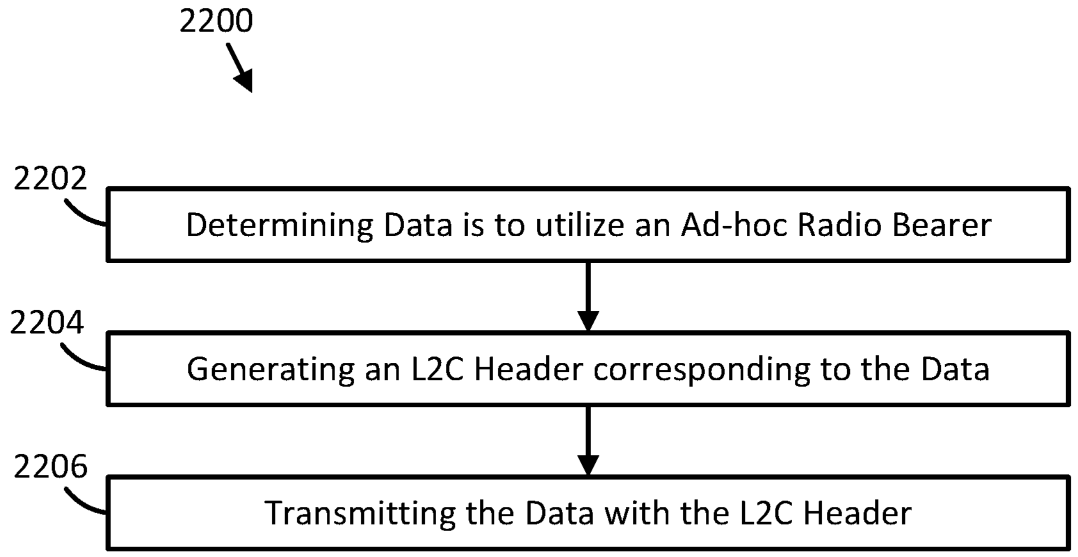
FIG. 22 illustrates an example procedure for an L2C radio bearer configuration in accordance with some embodiments.

FIG. 22 illustrates an example procedure 2200 for an L2C radio bearer configuration in accordance with some embodiments. In particular, the procedure 2000 may be performed by an originating device to indicate a configuration of an ad-hoc radio to a receiving device. In some instances, the originating device may be a UE (such as the UE 204 (FIG. 2) and/or the UE 2400 (FIG. 24)) and the receiving device may be a base station (such as the gNB 2500 (FIG. 25)). In other instances, the originating device may be a base station and the receiving device may be a UE.

The procedure 2200 may include determining data is to utilize an ad-hoc radio bearer in 2202. For example, the originating device may determine data to be transmitted to the receiving device is to utilize an ad-hoc radio bearer. In some embodiments, determining the data is to utilize the ad-hoc radio bearer includes determining the data is to utilize the ad-hoc radio bearer based at least in part on QoS requirements for the data, application end-to-end latency related to the data, privacy or security needs for the data, an amount of congestion related to the data, offloading capabilities related to the data, or RF conditions related to the data.

The procedure 2200 may include generating an L2C header corresponding to the data in 2204. For example, the originating device may generate an L2C header corresponding to the data. The L2C header may be generated by an L2C layer located between a MAC layer and a RLC layer.

In some embodiments, the L2C header may include a context ID to indicate preconfigured DRB settings to be utilized for the ad-hoc radio bearer. In some of these embodiments, the preconfigured DRB settings are first preconfigured DRB settings. The L2C header may further include an extension flag to indicate whether the L2C header includes an additional context ID to indicate second preconfigured DRB settings for configuration of an additional ad-hoc radio bearer.

In some embodiments, the L2C header may include a bitmap to indicate one or more parameters for the ad-hoc radio bearer and one or more values corresponding to the one or more parameters. The one or more parameters may include PDCP T-reordering, RLC T-assembly, or RLC AM. In some of these embodiments, the bit may include one or more bitmap octets and may include a first bitmap octet. The bitmap may include an extension flag to indicate whether a second bitmap octet follows the first bitmap octet within the bitmap. In some of these embodiments, the L2C header may further include a context ID to indicate preconfigured DRB settings to be utilized as a base for the ad-hoc radio bearer.

The procedure 2200 may include transmitting the data with the L2C header in 2206. For example, the originating device may transmit the data with the L2C header to the receiving device to indicate a configuration of the ad-hoc radio bearer. In some embodiments, the data and the L2C header may be transmitted to the receiving device in a transport block. The data may be encoded with settings of the ad-hoc radio bearer in some embodiments. In some embodiments, the data may be transmitted on the ad-hoc radio bearer being indicated to be setup or reconfigured.

While the procedure 2200 is illustrated in a certain order, it should be understood that one or more of the elements may be performed in a different order and/or one or more of the elements may be performed concurrently. Further, it should be understood that one or more of the elements may be omitted and/or the procedure 2200 may be performed as part of a larger procedure.

Figure 23:
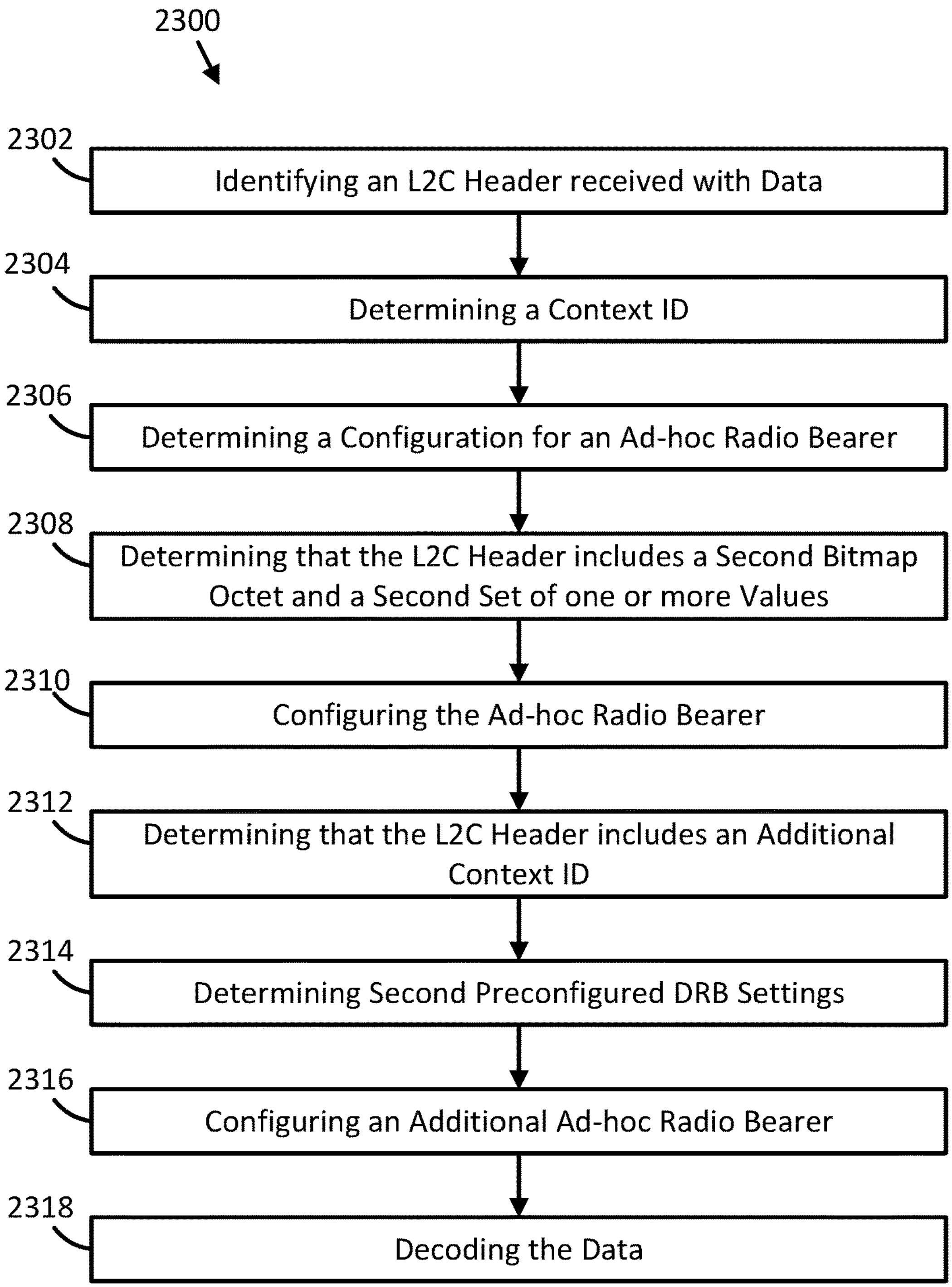
FIG. 23 illustrates an example procedure for an L2C radio bearer configuration in accordance with some embodiments.

FIG. 23 illustrates an example procedure 2300 for an L2C radio bearer configuration in accordance with some embodiments. In particular, the procedure 2300 may be performed by a receiving device to configure an ad-hoc radio bearer. In some instances, the originating device may be a UE (such as the UE 204 (FIG. 2) and/or the UE 2400 (FIG. 24)) and the receiving device may be a base station (such as the gNB 2500 (FIG. 25)). In other instances, the originating device may be a base station and the receiving device may be a UE.

The procedure 2300 may include identifying an L2C header received with data in 2302. For example, the receiving device may identify an L2C header received with data from an originating device. The L2C header may be to be processed by an L2CL located between a MAC layer and an RLC layer. In some embodiments, the data and the L2C header are received in a transport block.

In some embodiments, the L2C header may include a bitmap to indicate one or more parameters for the ad-hoc radio bearer and one or more values corresponding to the one or more parameters. The one or more parameters may include PDCP T-reordering, RLC T-reassembly, or RLC AM. In some embodiments, the bitmap may include one or more bitmap octets and may include a first bitmap octet. In some of these embodiments, the one or more parameters may be a first set of one or more parameters and the one or more values may be a first set of one or more values. In some of these embodiments, the L2C header may further include a context ID to indicate preconfigured DRB settings to be utilized as a base for the ad-hoc radio bearer.

The procedure 2300 may include determining a context ID in 2304. For example, the receiving device may determine a context ID from the L2C header. In some embodiments, 2304 may be omitted.

The procedure 2300 may include determining a configuration for an ad-hoc radio bearer in 2306. For example, the receiving device may determine a configuration for an ad-hoc radio bearer based on the L2C header. In some embodiments, determining the configuration may include determining preconfigured DRB settings for configuration of the ad-hoc radio bearer based on the context ID determined in 2304.

The procedure 2300 may include determining that the L2C header includes a second bitmap octet and a second set of one or more values in 2308. For example, the receiving device may determine, based on an extension flag in the L2C header, that the L2C header includes a second bitmap octet and a second set of one or more values corresponding to a second set of one or more parameters corresponding to the second bitmap octet. In some embodiments, 2308 may be omitted.

The procedure 2300 may include configuring the ad-hoc radio bearer in 2310. For example, the receiving device may configure the ad-hoc radio bearer in accordance with the configuration determining in 2306. In some embodiments, configuring the ad-hoc radio bearer may include reconfiguring the one or more parameters for the ad-hoc radio bearer with the one or more values corresponding to the one or more parameters indicated by the bitmap. In some embodiments, configuring the ad-hoc radio bearer may include reconfiguring the second set of one or more parameters for the ad-hoc radio bearer determined in 2308 with the second set of one or more values.

The procedure 2300 may include determining that the L2C header includes an additional context ID in 2312. For example, the receiving device may determine that the L2C header includes an additional context ID for configuration of an additional ad-hoc radio bearer based on an extension flag included in the L2C header. In some embodiments, 2312 may be omitted.

The procedure 2300 may include determining second preconfigured DRB settings in 2314. For example, the receiving device may determine second preconfigured DRB settings for configuration of the additional ad-hoc radio bearer based on the context ID. In some embodiments, 2314 may be omitted.

The procedure 2300 may include configuring an additional ad-hoc radio bearer in 2316. For example, the receiving device may configure the additional ad-hoc radio bearer in accordance with the second preconfigured DRB settings determining in 2314. In some embodiments, 2316 may be omitted.

The procedure 2300 may include decoding the data in 2318. For example, the receiving device may decode the data in accordance with the configuration determined in 2306. In some embodiments, 2318 may be omitted.

FIG. 24 illustrates an example UE 2400 in accordance with some embodiments. The UE 2400 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices. In some embodiments, the UE 2400 may be a RedCap UE or NR-Light UE.

The UE 2400 may include processors 2404, RF interface circuitry 2408, memory/storage 2412, user interface 2416, sensors 2420, driver circuitry 2422, power management integrated circuit (PMIC) 2424, antenna structure 2426, and battery 2428. The components of the UE 2400 may be implemented as integrated circuits (ICs), portions thereof, discrete electronic devices, or other modules, logic, hardware, software, firmware, or a combination thereof. The block diagram of FIG. 24 is intended to show a high-level view of some of the components of the UE 2400. However, some of the components shown may be omitted, additional components may be present, and different arrangement of the components shown may occur in other implementations.

The components of the UE 2400 may be coupled with various other components over one or more interconnects 2432, which may represent any type of interface, input/output, bus (local, system, or expansion), transmission line, trace, optical connection, etc. that allows various circuit components (on common or different chips or chipsets) to interact with one another.

The processors 2404 may include processor circuitry such as, for example, baseband processor circuitry (BB) 2404A, central processor unit circuitry (CPU) 2404B, and graphics processor unit circuitry (GPU) 2404C. The processors 2404 may include any type of circuitry or processor circuitry that executes or otherwise operates computer-executable instructions, such as program code, software modules, or functional processes from memory/storage 2412 to cause the UE 2400 to perform operations as described herein.

In some embodiments, the baseband processor circuitry 2404A may access a communication protocol stack 2436 in the memory/storage 2412 to communicate over a 3GPP compatible network. In general, the baseband processor circuitry 2404A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 2408.

The baseband processor circuitry 2404A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The memory/storage 2412 may include one or more non-transitory, computer-readable media that includes instructions (for example, communication protocol stack 2436) that may be executed by one or more of the processors 2404 to cause the UE 2400 to perform various operations described herein. The memory/storage 2412 include any type of volatile or non-volatile memory that may be distributed throughout the UE 2400. In some embodiments, some of the memory/storage 2412 may be located on the processors 2404 themselves (for example, L1 and L2 cache), while other memory/storage 2412 is external to the processors 2404 but accessible thereto via a memory interface. The memory/storage 2412 may include any suitable volatile or non-volatile memory such as, but not limited to, dynamic random access memory (DRAM), static random access memory (SRAM), eraseable programmable read only memory (EPROM), electrically eraseable programmable read only memory (EEPROM), Flash memory, solid-state memory, or any other type of memory device technology.

The RF interface circuitry 2408 may include transceiver circuitry and radio frequency front module (RFEM) that allows the UE 2400 to communicate with other devices over a radio access network. The RF interface circuitry 2408 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 2426 and proceed to filter and amplify (with a low-noise amplifier) the signal. The signal may be provided to a receiver of the transceiver that down-converts the RF signal into a baseband signal that is provided to the baseband processor of the processors 2404.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 2426.

In various embodiments, the RF interface circuitry 2408 may be configured to transmit/receive signals in a manner compatible with NR access technologies.

The antenna 2426 may include antenna elements to convert electrical signals into radio waves to travel through the air and to convert received radio waves into electrical signals. The antenna elements may be arranged into one or more antenna panels. The antenna 2426 may have antenna panels that are omnidirectional, directional, or a combination thereof to enable beamforming and multiple input, multiple output communications. The antenna 2426 may include microstrip antennas, printed antennas fabricated on the surface of one or more printed circuit boards, patch antennas, phased array antennas, etc. The antenna 2426 may have one or more panels designed for specific frequency bands including bands in FR1 or FR2.

The user interface circuitry 2416 includes various input/output (I/O) devices designed to enable user interaction with the UE 2400. The user interface 2416 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays (LCDs), LED displays, quantum dot displays, projectors, etc.), with the output of characters, graphics, multimedia objects, and the like being generated or produced from the operation of the UE 2400.

The sensors 2420 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 2422 may include software and hardware elements that operate to control particular devices that are embedded in the UE 2400, attached to the UE 2400, or otherwise communicatively coupled with the UE 2400. The driver circuitry 2422 may include individual drivers allowing other components to interact with or control various input/output (I/O) devices that may be present within, or connected to, the UE 2400. For example, driver circuitry 2422 may include a display driver to control and allow access to a display device, a touchscreen driver to control and allow access to a touchscreen interface, sensor drivers to obtain sensor readings of sensor circuitry 2420 and control and allow access to sensor circuitry 2420, drivers to obtain actuator positions of electro-mechanic components or control and allow access to the electro-mechanic components, a camera driver to control and allow access to an embedded image capture device, audio drivers to control and allow access to one or more audio devices.

The PMIC 2424 may manage power provided to various components of the UE 2400. In particular, with respect to the processors 2404, the PMIC 2424 may control power-source selection, voltage scaling, battery charging, or DC-to-DC conversion.

In some embodiments, the PMIC 2424 may control, or otherwise be part of, various power saving mechanisms of the UE 2400. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 2400 may power down for brief intervals of time and thus save power. If there is no data traffic activity for an extended period of time, then the UE 2400 may transition off to an RRC Idle state, where it disconnects from the network and does not perform operations such as channel quality feedback, handover, etc. The UE 2400 goes into a very low power state and it performs paging where again it periodically wakes up to listen to the network and then powers down again. The UE 2400 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 2428 may power the UE 2400, although in some examples the UE 2400 may be mounted deployed in a fixed location, and may have a power supply coupled to an electrical grid. The battery 2428 may be a lithium ion battery, a metal-air battery, such as a zinc-air battery, an aluminum-air battery, a lithium-air battery, and the like. In some implementations, such as in vehicle-based applications, the battery 2428 may be a typical lead-acid automotive battery.

FIG. 25 illustrates an example gNB 2500 in accordance with some embodiments. The gNB 2500 may include processors 2504, RF interface circuitry 2508, core network (CN) interface circuitry 2512, memory/storage circuitry 2516, and antenna structure 2526.

The components of the gNB 2500 may be coupled with various other components over one or more interconnects 2528.

The processors 2504, RF interface circuitry 2508, memory/storage circuitry 2516 (including communication protocol stack 2510), antenna structure 2526, and interconnects 2528 may be similar to like-named elements shown and described with respect to FIG. 24.

The CN interface circuitry 2512 may provide connectivity to a core network, for example, a 5th Generation Core network (5GC) using a 5GC-compatible network interface protocol such as carrier Ethernet protocols, or some other suitable protocol. Network connectivity may be provided to/from the gNB 2500 via a fiber optic or wireless backhaul. The CN interface circuitry 2512 may include one or more dedicated processors or FPGAs to communicate using one or more of the aforementioned protocols. In some implementations, the CN interface circuitry 2512 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 may include a method of operating an originating device, comprising determining data to be transmitted to a receiving device is to utilize an ad-hoc radio bearer, generating a service data adaptation protocol (SDAP) header corresponding to the data, the SDAP header including a quality of service flow identifier (QFI) and the QFI corresponding to the ad-hoc radio bearer, and transmitting the data with the SDAP header to the receiving device to indicate a configuration of the ad-hoc radio bearer.

Example 2 may include the method of example 1, wherein generating the SDAP header includes performing QFI labelling and inline signalling in an SDAP layer of the originating device, the SDAP layer being located between a medium access control (MAC) layer and a radio link control (RLC) layer of the originating device.

Example 3 may include the method of example 1, wherein the SDAP header further includes a context identifier (ID) to indicate preconfigured data radio bearer (DRB) settings to be used for the ad-hoc radio bearer.

Example 4 may include the method of example 3, wherein the preconfigured DRB settings are first preconfigured DRB settings, and wherein the SDAP header further includes an extension flag to indicate whether the SDAP header includes an additional context ID to indicate second preconfigured DRB settings for configuration of an additional ad-hoc radio bearer.

Example 5 may include the method of example 1, wherein the SDAP header further includes a bitmap to indicate one or more parameters of the ad-hoc radio bearer are to be changed and one or more values corresponding to the one or more parameters to be changed.

Example 6 may include the method of example 5, wherein the parameters include packet data convergence protocol (PDCP) T-reordering, radio link control (RLC) T-reassembly, or RLC acknowledged mode (AM).

Example 7 may include the method of example 5, wherein the bitmap includes one or more bitmap octets, wherein the bitmap includes a first bitmap octet, and wherein the bitmap includes an extension flag to indicate whether a second bitmap octet follows the first bitmap octet within the bitmap.

Example 8 may include the method of example 5, wherein the SDAP header further includes a context identifier (ID) to indicate preconfigured data radio bearer (DRB) settings to be utilized as a base for the ad-hoc radio bearer.

Example 9 may include the method of example 1, wherein the method further comprises identifying a transmission from the receiving device utilizing the ad-hoc radio bearer based on the transmission of the data with the SDAP header, and decoding the transmission in accordance with the configuration of the ad-hoc radio bearer.

Example 10 may include the method of example 1, wherein the data and the SDAP header are transmitted to the receiving device in a transport block.

Example 11 may include the method of example 1, wherein the originating device is a user equipment (UE), and wherein the receiving device is a base station.

Example 12 may include the method of example 1, wherein the originating device is a base station, and wherein the receiving device is a user equipment (UE).

Example 13 may include a method of operating a receiving device, comprising identifying a service data adaptation protocol (SDAP) header received with data from an originating device, determining a configuration for an ad-hoc radio bearer based on the SDAP header, and configuring the ad-hoc radio bearer in accordance with the configuration.

Example 14 may include the method of example 13, further comprising determining a quality of service flow identifier (QFI) from the SDAP header, and performing QFI mapping based on the QFI and inline signalling in an SDAP layer located between a medium access control (MAC) layer and a radio link control (RLC) layer.

Example 15 may include the method of example 13, further comprising determining a context ID from the SDAP header, wherein determining the configuration includes determining preconfigured data radio bearer (DRB) settings for configuration of the ad-hoc radio bearer based on the context ID.

Example 16 may include the method of example 15, wherein the preconfigured DRB settings are first preconfigured DRB settings, and wherein the method further comprises determining that the SDAP header includes an additional context ID for configuration of an additional ad-hoc radio bearer based on an extension flag included in the SDAP header, determining second preconfigured DRB settings for configuration of the additional ad-hoc radio bearer based on the additional context ID, and configuring the additional ad-hoc radio bearer in accordance with the second preconfigured DRB settings.

Example 17 may include the method of example 13, wherein the SDAP header includes a bitmap to indicate one or more parameters for the ad-hoc radio bearer and one or more values corresponding to the one or more parameters, wherein configuring the ad-hoc radio bearer includes reconfiguring the one or more parameters for the ad-hoc radio bearer with the one or more values.

Example 18 may include the method of example 17, wherein the one or more parameters include packet data convergence protocol (PDCP) T-reordering, radio link control (RLC) T-reassembly, or RLC acknowledged mode (AM).

Example 19 may include the method of example 17, wherein the bitmap includes one or more bitmap octets, wherein the bitmap includes a first bitmap octet, wherein the one or more parameters is a first set of one or more parameters, wherein the one or more values is a first set of one or more values, and wherein the method further comprises determining, based on an extension flag in the SDAP header, that the SDAP header includes a second bitmap octet and a second set of one or more values corresponding to a second set of one or more parameters corresponding to the second bitmap octet, wherein configuring the ad-hoc radio bearer further includes reconfiguring the second set of one or more parameters for the ad-hoc radio bearer with the second set of one or more values.

Example 20 may include the method of example 17, wherein the SDAP header further includes a context identifier (ID) to indicate preconfigured data radio bearer (DRB) settings to be utilized as a base for the ad-hoc radio bearer.

Example 21 may include the method of example 13, wherein the SDAP header and the data are received in a transport block.

Example 22 may include the method of example 13, wherein the receiving device is a base station, and wherein the originating device is a user equipment (UE).

Example 23 may include the method of example 13, wherein the receiving device is a user equipment (UE), and wherein the originating device is a base station.

Example 24 may include a method of operating an originating device, comprising determining data to be transmitted to a receiving device is to utilize an ad-hoc radio bearer, generating a layer 2 configuration (L2C) header corresponding to the data, the L2C header generated by an L2C layer (L2CL) located between a medium access control (MAC) layer and a radio link control (RLC) layer, and transmitting the data with the L2C header to the receiving device to indicate a configuration of the ad-hoc radio bearer.

Example 25 may include the method of example 24, wherein the L2C header includes a context identifier (ID) to indicate preconfigured data radio bearer (DRB) settings to be utilized for the ad-hoc radio bearer.

Example 26 may include the method of example 25, wherein the preconfigured DRB settings are first preconfigured DRB settings, wherein the L2C header further includes an extension flag to indicate whether the L2C header includes an additional context ID to indicate second preconfigured DRB settings for configuration of an additional ad-hoc radio bearer.

Example 27 may include the method of example 24, wherein the L2C header further includes a bitmap to indicate one or more parameters for the ad-hoc radio bearer and one or more values corresponding to the one or more parameters.

Example 28 may include the method of example 27, wherein the one or more parameters include packet data convergence protocol (PDCP) T-reordering, radio link control (RLC) T-reassembly, or RLC acknowledged mode (AM).

Example 29 may include the method of example 27, wherein the bitmap includes one or more bitmap octets, wherein the bitmap includes a first bitmap octet, and wherein the bitmap includes an extension flag to indicate whether a second bitmap octet follows the first bitmap octet within the bitmap.

Example 30 may include the method of example 27, wherein the L2C header further includes a context identifier (ID) to indicate preconfigured data radio bearer (DRB) settings to be utilized as a base for the ad-hoc radio bearer.

Example 31 may include the method of example 24, wherein determining the data is to utilize the ad-hoc radio bearer includes determining the data is to utilize the ad-hoc radio bearer based at least in part on quality of service (QoS) requirements for the data, application end-to-end latency related to the data, privacy or security needs for the data, a size of the data, an amount of congestion related to the data, offloading capabilities related to the data, or radio frequency (RF) conditions related to the data.

Example 32 may include the method of example 24, wherein the data and the L2C header are transmitted to the receiving device in a transport block.

Example 33 may include the method of example 24, wherein the originating device is a user equipment (UE), and wherein the receiving device is a base station.

Example 34 may include the method of example 24, wherein the originating device is a base station, and wherein the receiving device is a user equipment (UE).

Example 35 may include a method of operating a receiving device, comprising identifying a layer 2 configuration (L2C) header received with data from an originating device, the L2C header to be processed by an L2C layer (L2CL) located between a medium access control (MAC) layer and a radio link control (RLC) layer, determining a configuration for an ad-hoc radio bearer based on the L2C header, and configuring the ad-hoc radio bearer in accordance with the configuration.

Example 36 may include the method of example 35, further comprising decoding the data in accordance with the configuration.

Example 37 may include the method of example 35, further comprising determining a context ID from the L2C header, wherein determining the configuration includes determining preconfigured data radio bearer (DRB) settings for configuration of the ad-hoc radio bearer based on the context ID.

Example 38 may include the method of example 37, wherein the preconfigured DRB settings are first preconfigured data radio bearer settings, and wherein the method further comprises determining that the L2C header includes an additional context ID for configuration of an additional ad-hoc radio bearer based on an extension flag included in the L2C header, determining second preconfigured DRB settings for configuration of the additional ad-hoc radio bearer based on the context ID, and configuring the additional ad-hoc radio bearer in accordance with the second preconfigured DRB settings.

Example 39 may include the method of example 35, wherein the L2C header includes a bitmap to indicate one or more parameters for the ad-hoc radio bearer and one or more values corresponding to the one or more parameters, wherein configuring the ad-hoc radio bearer includes reconfiguring the one or more parameters for the ad-hoc radio bearer with the one or more values.

Example 40 may include the method of example 39, wherein the one or more parameters include packet data convergence protocol (PDCP) T-reordering, radio link control (RLC) T-reassembly, or RLC acknowledged mode (AM).

Example 41 may include the method of example 39, wherein the bitmap includes one or more bitmap octets, wherein the bitmap includes a first bitmap octet, wherein the one or more parameters is a first set of one or more parameters, wherein the one or more values is a first set of one or more values, and wherein the method further comprises determining, based on an extension flag in the L2C header, that the L2C header includes a second bitmap octet and a second set of one or more values corresponding to a second set of one or more parameters corresponding to the second bitmap octet, wherein configuring the ad-hoc radio bearer further includes reconfiguring the second set of one or more parameters for the ad-hoc radio bearer with the second set of one or more values.

Example 42 may include the method of example 39, wherein the L2C header further includes a context identifier (ID) to indicate preconfigured data radio bearer (DRB) settings to be utilized as a base for the ad-hoc radio bearer.

Example 43 may include the method of example 35, wherein the data and the L2C header are received in a transport block.

Example 44 may include the method of example 35, wherein the receiving device is a base station, and wherein the originating device is a user equipment (UE).

Example 45 may include the method of example 35, wherein the receiving device is a user equipment (UE), and wherein the originating device is a base station.

Example 46 may include an apparatus comprising means to perform one or more elements of a method described in or related to any of examples 1-45, or any other method or process described herein.

Example 47 may include one or more non-transitory computer-readable media comprising instructions to cause an electronic device, upon execution of the instructions by one or more processors of the electronic device, to perform one or more elements of a method described in or related to any of examples 1-45, or any other method or process described herein.

Example 48 may include an apparatus comprising logic, modules, or circuitry to perform one or more elements of a method described in or related to any of examples 1-45, or any other method or process described herein.

Example 49 may include a method, technique, or process as described in or related to any of examples 1-45, or portions or parts thereof.

Example 50 may include an apparatus comprising: one or more processors and one or more computer-readable media comprising instructions that, when executed by the one or more processors, cause the one or more processors to perform the method, techniques, or process as described in or related to any of examples 1-45, or portions thereof.

Example 51 may include a signal as described in or related to any of examples 1-45, or portions or parts thereof.

Example 52 may include a datagram, information element, packet, frame, segment, PDU, or message as described in or related to any of examples 1-45, or portions or parts thereof, or otherwise described in the present disclosure.

Example 53 may include a signal encoded with data as described in or related to any of examples 1-45, or portions or parts thereof, or otherwise described in the present disclosure.

Example 54 may include a signal encoded with a datagram, IE, packet, frame, segment, PDU, or message as described in or related to any of examples 1-45, or portions or parts thereof, or otherwise described in the present disclosure.

Example 55 may include an electromagnetic signal carrying computer-readable instructions, wherein execution of the computer-readable instructions by one or more processors is to cause the one or more processors to perform the method, techniques, or process as described in or related to any of examples 1-45, or portions thereof.

Example 56 may include a computer program comprising instructions, wherein execution of the program by a processing element is to cause the processing element to carry out the method, techniques, or process as described in or related to any of examples 1-45, or portions thereof.

Example 57 may include a signal in a wireless network as shown and described herein.

Example 58 may include a method of communicating in a wireless network as shown and described herein.

Example 59 may include a system for providing wireless communication as shown and described herein.

Example 60 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory computer-readable media having instructions stored thereon, wherein the instructions, when executed, cause processing circuitry to:

identify data to be transmitted to a receiving device utilizing an ad-hoc radio bearer; and generate, for transmission with the data, a service data adaptation protocol (SDAP) header corresponding to the data, the SDAP header including a quality of service flow identifier (QFI) and the QFI corresponding to the ad-hoc radio bearer, the SDAP header to indicate a configuration of the ad-hoc radio bearer for transmitting the data, wherein to generate the SDAP header includes to perform QFI labelling and inline signaling in an SDAP layer of an originating device, the SDAP layer being located between a medium access control (MAC) layer and a radio link control (RLC) layer.

2. The one or more non-transitory computer-readable media of claim 1, wherein the data is encoded with settings for the ad-hoc radio bearer.

3. The one or more non-transitory computer-readable media of claim 1, wherein the data is transmitted on the ad-hoc radio bearer.

4. The one or more non-transitory computer-readable media of claim 1, wherein the SDAP header further includes a context identifier (ID) to indicate preconfigured data radio bearer (DRB) settings to be used for the ad-hoc radio bearer.

5. The one or more non-transitory computer-readable media of claim 4, wherein the preconfigured DRB settings are first preconfigured DRB settings, and wherein the SDAP header further includes an extension flag to indicate whether the SDAP header includes an additional context ID to indicate second preconfigured DRB settings for configuration of an additional ad-hoc radio bearer.

6. The one or more non-transitory computer-readable media of claim 1, wherein the SDAP header further includes a bitmap to indicate one or more parameters of the ad-hoc radio bearer are to be changed and one or more values corresponding to the one or more parameters to be changed.

7. The one or more non-transitory computer-readable media of claim 6, wherein the bitmap includes one or more bitmap octets, wherein the bitmap includes a first bitmap octet, and wherein the bitmap includes an extension flag to indicate whether a second bitmap octet follows the first bitmap octet within the bitmap.

8. The one or more non-transitory computer-readable media of claim 6, wherein the SDAP header further includes a context identifier (ID) to indicate preconfigured data radio bearer (DRB) settings to be utilized as a base for the ad-hoc radio bearer.

9. An apparatus, comprising:

processing circuitry to:

identify a service data adaptation protocol (SDAP) header received with data from an originating device;

determine a configuration for an ad-hoc radio bearer based on the SDAP header, the ad-hoc radio bearer for transmission of the data;

configure the ad-hoc radio bearer in accordance with the configuration for transmission of the data;

determine a quality of service flow identifier (QFI) from the SDAP header; and perform QFI mapping based on the QFI and inline signalling in an SDAP layer located between a medium access control (MAC) layer and a radio link control (RLC) layer; and interface circuitry coupled to the processing circuitry, the interface circuitry to receive the SDAP header with the data.

10. The apparatus of claim 9, wherein the processing circuitry is further to:

decode the data based on the configuration for the ad-hoc radio bearer.

11. The apparatus of claim 9, wherein the processing circuitry is further to:

determine a context ID from the SDAP header, wherein to determine the configuration includes to determine preconfigured data radio bearer (DRB) settings for configuration of the ad-hoc radio bearer based on the context ID.

12. The apparatus of claim 11, wherein the preconfigured DRB settings are first preconfigured DRB settings, and wherein the processing circuitry is further to:

determine that the SDAP header includes an additional context ID for configuration of an additional ad-hoc radio bearer based on an extension flag included in the SDAP header;

determine second preconfigured DRB settings for configuration of the additional ad-hoc radio bearer based on the additional context ID; and configure the additional ad-hoc radio bearer in accordance with the second preconfigured DRB settings.

13. The apparatus of claim 9, wherein the SDAP header includes a bitmap to indicate one or more parameters for the ad-hoc radio bearer and one or more values corresponding to the one or more parameters, wherein to configure the ad-hoc radio bearer includes to reconfigure the one or more parameters for the ad-hoc radio bearer with the one or more values.

14. The apparatus of claim 13, wherein the bitmap includes one or more bitmap octets, wherein the bitmap includes a first bitmap octet, wherein the one or more parameters is a first set of one or more parameters, wherein the one or more values is a first set of one or more values, and wherein the processing circuitry is further to:

determine, based on an extension flag in the SDAP header, that the SDAP header includes a second bitmap octet and a second set of one or more values corresponding to a second set of one or more parameters corresponding to the second bitmap octet, wherein to configure the ad-hoc radio bearer further includes to reconfigure the second set of one or more parameters for the ad-hoc radio bearer with the second set of one or more values.

15. A method comprising:

identifying data to be transmitted to a receiving device utilizing an ad-hoc radio bearer; and generating, for transmission with the data, a service data adaptation protocol (SDAP) header corresponding to the data, the SDAP header including a quality of service flow identifier (QFI) and the QFI corresponding to the ad-hoc radio bearer, the SDAP header to indicate a configuration of the ad-hoc radio bearer for transmitting the data, wherein generating the SDAP header includes performing QFI labelling and inline signaling in an SDAP layer of an originating device, the SDAP layer being located between a medium access control (MAC) layer and a radio link control (RLC) layer.

16. The method of claim 15, wherein the data is encoded with settings for the ad-hoc radio bearer.

17. The method of claim 15, wherein the data is transmitted on the ad-hoc radio bearer.

18. The method of claim 15, wherein the SDAP header further includes a context identifier (ID) to indicate preconfigured data radio bearer (DRB) settings to be used for the ad-hoc radio bearer.

19. The method of claim 18, wherein the preconfigured DRB settings are first preconfigured DRB settings, and wherein the SDAP header further includes an extension flag to indicate whether the SDAP header includes an additional context ID to indicate second preconfigured DRB settings for configuration of an additional ad-hoc radio bearer.

20. The method of claim 15, wherein the SDAP header further includes a bitmap to indicate one or more parameters of the ad-hoc radio bearer are to be changed and one or more values corresponding to the one or more parameters to be changed.

* * * * *